United States Patent
Huffman et al.

(10) Patent No.: US 12,140,480 B2
(45) Date of Patent: Nov. 12, 2024

(54) TIME-TEMPERATURE EXPOSURE INDICATOR WITH DELAYED THRESHOLD RESPONSE

(71) Applicant: Temptime Corporation, Morris Plains, NJ (US)

(72) Inventors: Brian S. Huffman, Belle Mead, NJ (US); Thi N. Do, West Orange, NJ (US); Janine Grazaitis Klages, Budd Lake, NJ (US)

(73) Assignee: TEMPTIME CORPORATION, Morris Plains, NJ (US)

( * ) Notice: Subject to any disclaimer, the term of this patent is extended or adjusted under 35 U.S.C. 154(b) by 365 days.

(21) Appl. No.: 17/115,275

(22) Filed: Dec. 8, 2020

(65) Prior Publication Data

US 2022/0178761 A1    Jun. 9, 2022

(51) Int. Cl.
*G01K 1/024* (2021.01)
*G01K 3/00* (2006.01)

(52) U.S. Cl.
CPC .............. *G01K 1/024* (2013.01); *G01K 3/005* (2013.01)

(58) Field of Classification Search
CPC ............................... G01K 1/024; G01K 3/005
See application file for complete search history.

(56) References Cited

U.S. PATENT DOCUMENTS

| | | | | |
|---|---|---|---|---|
| 3,839,141 A | * | 10/1974 | McKinnon | C09D 131/04 428/514 |
| 4,428,321 A | * | 1/1984 | Arens | G01K 3/04 252/962 |
| 5,057,434 A | * | 10/1991 | Prusik | B65D 79/02 436/2 |
| 5,476,792 A | * | 12/1995 | Ezrielev | G01K 3/04 374/E11.006 |
| 5,667,303 A | * | 9/1997 | Arens | G01K 3/04 374/102 |
| 5,709,472 A | | 1/1998 | Prusik et al. | |
| 6,042,264 A | | 3/2000 | Prusik et al. | |
| 6,614,728 B2 | | 9/2003 | Spevacek | |
| 6,741,523 B1 | * | 5/2004 | Bommarito | G01K 3/04 374/102 |
| 7,290,925 B1 | * | 11/2007 | Skjervold | G01N 31/229 374/162 |

(Continued)

FOREIGN PATENT DOCUMENTS

DE    69817138 T2    6/2004
GB    2601221 A    5/2022

(Continued)

OTHER PUBLICATIONS

17115275_Dec. 12, 2023_WO_2007012132_A1_H.pdf, Feb. 1, 2007.*

(Continued)

*Primary Examiner* — Gail Kaplan Verbitsky
(74) *Attorney, Agent, or Firm* — K&L Gates LLP

(57) ABSTRACT

Environmental indicators for monitoring a predetermined environmental exposure, for example, an historical heat exposure such as a cumulative ambient heat exposure and/or a peak ambient heat exposure, may include an environmental indicator material. The environmental indicator may be configured to attach to a host product for monitoring the predetermined environmental exposure of the host product.

41 Claims, 14 Drawing Sheets

(56) References Cited

U.S. PATENT DOCUMENTS

| | | | |
|---|---|---|---|
| 7,517,146 B2 | 4/2009 | Smith et al. | |
| 8,122,844 B2 * | 2/2012 | Smith | G01K 11/16 374/161 |
| 8,671,871 B2 * | 3/2014 | Huffman | G01K 1/02 374/162 |
| 8,695,528 B2 * | 4/2014 | Boyaci | G01K 3/04 374/162 |
| 8,911,861 B2 * | 12/2014 | Parker | G01K 11/165 428/323 |
| 8,968,662 B2 * | 3/2015 | Haarer | G01K 3/04 374/102 |
| 9,546,911 B2 | 1/2017 | Huffman et al. | |
| 9,954,911 B2 | 4/2018 | Sharma | |
| 11,241,902 B1 * | 2/2022 | Smith | G01K 3/04 |
| 2003/0053377 A1 | 3/2003 | Spevacek | |
| 2007/0158624 A1 * | 7/2007 | Weder | C09K 9/02 252/582 |
| 2008/0056329 A1 * | 3/2008 | Smith | G01K 11/06 374/E11.006 |
| 2009/0050049 A1 * | 2/2009 | Craig | G01K 1/02 374/E11.006 |
| 2011/0080763 A1 * | 4/2011 | Siau | G11C 16/3431 365/210.1 |
| 2012/0079981 A1 * | 4/2012 | Huffman | G01K 1/02 116/207 |
| 2013/0287059 A1 * | 10/2013 | Selman | G01K 3/04 374/102 |
| 2014/0211827 A1 * | 7/2014 | Rohr | G01K 3/04 374/102 |
| 2016/0069812 A1 * | 3/2016 | Prusik | G01K 3/04 116/207 |
| 2019/0346415 A1 * | 11/2019 | Abdo | G01K 3/04 |
| 2024/0068886 A1 * | 2/2024 | Huffman | G01K 3/04 |

FOREIGN PATENT DOCUMENTS

| | | | | |
|---|---|---|---|---|
| GB | 2604009 A | * | 8/2022 | G01K 1/024 |
| JP | 2000351951 A | * | 12/2000 | C09J 7/385 |
| JP | 2008260147 A | * | 10/2008 | |
| WO | WO8301834 A1 | * | 5/1983 | |
| WO | WO-9628714 A1 | * | 9/1996 | G01K 3/04 |
| WO | WO-9934221 A2 | * | 7/1999 | G01F 1/6845 |
| WO | WO-2004039683 A1 | * | 5/2004 | B65D 65/14 |
| WO | WO-2005040300 A1 | * | 5/2005 | C09K 5/063 |
| WO | WO-2007012132 A1 | * | 2/2007 | G01K 1/02 |
| WO | WO-2012176881 A1 | * | 12/2012 | C08L 23/24 |
| WO | WO-2013170273 A2 | * | 11/2013 | G01K 1/02 |
| WO | 2020/231921 A1 | | 11/2020 | |
| WO | WO-2023084315 A1 | * | 5/2023 | |

OTHER PUBLICATIONS

17115275_Dec. 12, 2023_GB_2604009_A_H.pdf,Aug. 24, 2022.*
17115275_Dec. 12, 2023_WO_9628714_A1_H.pdf,Sep. 19, 1996.*
17115275_Jun. 17, 2024_WO_2023084315_A1_H.pdf,May 19, 2023.*
Office Action dated Aug. 22, 2022 issued for Belgian Patent Application No. 2021/5946.
O'Leary et al. "Copolymers of poly(n-alkyl acrylates): synthesis, characterization, and monomer reactivity ratios", Polymer 2004 45 pp. 6575-6585.
Greenberg et al. "Side Chain Crystallization of n-Alkyl Polymethacrylates and Polyacrylates" J. Am. Chem. Soc., 1954, 76 (24), pp. 6280-6285.
Combined Search and Examination Report dated Jun. 7, 2022 issued for United Kingdom Patent Application No. GB2117606.0.

* cited by examiner

Test Sample Layout in Each Picture: Composition 11 (left side) vs. Composition 15 (right side)

Test Sample Layout in Each Picture: Composition 11 (left side) vs. Composition 15 (right side)

TIME-TEMPERATURE EXPOSURE INDICATOR WITH DELAYED THRESHOLD RESPONSE

FIELD

This disclosure is generally directed to the field of environmental indicators, including an ascending time-temperature exposure indicator with a predetermined delayed response time when exposed to a predetermined threshold temperature. The disclosed ascending time-temperature exposure indicator may comprise a mixture of a synthetic polymeric material and a wax material.

BACKGROUND

Many commercial products are temperature-sensitive or perishable and may lose efficacy or quality if they experience excessive ambient heat exposure before they are used. Examples of heat-sensitive commercial products include certain pharmaceuticals, medical products, and foodstuffs as well as some industrial products. Temperature indicators are known which can provide a simple visual indication of the historical exposure of a host product to heat, e.g., cumulative or peak heat exposure. An indicator provided close to or on the product package is exposed over time to temperatures close to those experienced by the product itself. The visual indication can be used to provide a signal of whether a product may have lost quality, or freshness. Some temperature indicators can integrate over time historical temperature exposure to various conditions in a predictable, quantitative manner and can be used to indicate the useful shelf life of temperature-sensitive or perishable host products, or for other purposes. Product may also be sensitive or perishable in response to other environmental factors, such as humidity, radiation, oxygen exposure, exposure to biologic materials of certain types, etc.

Known temperature indicators based on chemical, or electrochemical, or other physical changes in an indicator material may be less expensive than electrical or computer tracking devices, and can function without power sources and over a long time period. They can provide a color change at a predetermined end point to indicate possible loss of quality or freshness of the host product. The color change can be displayed in a suitable label, or the like, to be read optically, for example, visually by a human viewer or by an electronic device such as a bar code scanner or cell phone. The color change can be chromatic or achromatic or provided by another visually detectable optical parameter change. The temperature-response parameters of the temperature indicator can be configured to correlate with a deterioration characteristic of the host product to coordinate the color change appropriately with the likely condition of the host product over time. Other types of environmental exposure indicators may behave in a similar fashion in response to exposure to humidity, oxygen, radiation, biologics, or other types of environmental factors that may affect host product acceptability.

Also, temperature-sensitive or perishable products, for example, vaccines and sensitive medications, as well as some foodstuffs and other products including some industrial products can have their quality or safety compromised by relatively brief exposures to a temperature in excess of a predetermined threshold. Various devices are known for monitoring such temperature exposures, including those in U.S. Pat. Nos. 7,517,146; 5,709,472; and 6,042,264. Some other temperature indicators employ diffusion technology, for example, U.S. Pat. Nos. 6,741,523; 6,614,728; and 5,667,303; and U.S. Patent Application Publication No. 2003/0053377. In addition to diffusion, other types of temperature or heat exposure indicators also rely on other kinds of movement of an indicator material in response to an environmental exposure. In some cases, it may be desirable to detect exposure to temperature for at least a predetermined time. U.S. Pat. Nos. 9,546,911 and 8,671,871 provide a peak temperature exposure indicator that shows when the indicator or host product has been exposed to a threshold temperature for at least a certain period of time. This delay is provided by allowing a melting material carrying a colored dye to wick along a channel. If the temperature falls to a point below the threshold, the material may re-solidify and stop the material from moving along the channel. Accordingly the indicator only indicates exposure when the material has moved at least a predetermined distance along the channel. Examples of products providing this feature include Zebra Technologies Corp.'s LIMITmarker F series indicators.

All of the above types of environmental indicators may be enhanced, for example, by adding other features, e.g., using example approaches described in the present disclosure.

SUMMARY

Disclosed herein are environmental indicators for monitoring a predetermined environmental exposure, such as an exposure to a specific temperature of interest, for at least a predetermined exposure time of the environmental indicator or of a host product that the environmental indicator is associated with. The environmental indicators may be an ascending time-temperature exposure indicator apparatus. The specific temperature of interest may be a predetermined threshold temperature that a host product would frequently be exposed to during its storage, transportation, and/or use.

Aspects of the subject matter described herein may be useful alone or in combination with one or more other aspects described herein. In an aspect of the present disclosure, an ascending time-temperature exposure indicator apparatus includes a substrate. The ascending time-temperature exposure indicator apparatus also includes a transport element supported by the substrate. The ascending time-temperature exposure indicator apparatus further includes a thermally sensitive indicator element supported by the substrate. The indicator element comprises a solid indicator material. The indicator material further includes a mixture of a synthetic polymeric material and a wax material. The indicator material is configured to move along the transport element when melted. The indicator material is configured to melt in response to exposure to temperatures at or above a predetermined threshold temperature. The predetermined threshold temperature is in a range of from about −10° C. to about 70° C., from about 0° C. to about 60° C., from about 2° C. to about 20° C., from about 5° C. to about 15° C., or from about 9° C. to about 11° C.; or is about 10° C. The transport element and the indicator element are configured so that exposure to at least the predetermined threshold temperature for at least a predetermined exposure time results in at least a predetermined amount of movement of the indicator material along the transport element. In an embodiment, the movement of the indicator material along the transport element is reversible. In another embodiment, the movement of the indicator material along the transport element is irreversible.

In another aspect of the present disclosure, which may be used in combination with any other aspect or combination of aspects listed herein, the synthetic polymeric material comprises a polymer having side chain crystallinity (SCC).

In another aspect of the present disclosure, which may be used in combination with any other aspect or combination of aspects listed herein, the synthetic polymeric material comprises a blend of two or more polymers having side chain crystallinity (SCC).

In another aspect of the present disclosure, which may be used in combination with any other aspect or combination of aspects listed herein, the polymer having side chain crystallinity (SCC) is a polymer or a copolymer having at least one crystallizable side chain selected from the group consisting of a $C_{4-30}$ aliphatic group; a $C_{6-30}$ aromatic group; a linear aliphatic group having at least 10 carbon atoms; a combination of at least one aliphatic group and at least one aromatic group, the combination having from 7 carbon atoms to about 30 carbon atoms; a $C_{10}$-$C_{22}$ acrylate; a $C_{10}$-$C_{22}$ methacrylate; an acrylamide; a methacrylamide; a vinyl ether; a vinyl ester; a fluorinated aliphatic group having at least 6 carbon atoms; and a p-alkyl styrene group wherein the alkyl group has from about 8 carbon atoms to about 24 carbon atoms.

In another aspect of the present disclosure, which may be used in combination with any other aspect or combination of aspects listed herein, the polymer having side chain crystallinity (SCC) is a polymer or a copolymer having crystallizable side chains of $C_{10}$-$C_{22}$ acrylate or $C_{10}$-$C_{22}$ methacrylate.

In another aspect of the present disclosure, which may be used in combination with any other aspect or combination of aspects listed herein, the wax material comprises at least one of an alkane wax, an alkyl ester, a natural wax, or a modified natural wax.

In another aspect of the present disclosure, which may be used in combination with any other aspect or combination of aspects listed herein, the wax material comprises at least one of an undecane, a dodecane, a tridecane, a tetradecane, a pentadecane, a hexadecane, a heptadecane, an octadecane, a nonadecane, an eicosane, a heneicosane, a hexanoic acid, ethyl lactate, a paraffin wax, a microcrystalline wax, carnauba wax, beeswax, Chinese wax, shellac wax, spermaceti, tallow, palm wax, soy wax, 15 lanolin, wool grease, a waxy polymer, a waxy copolymer, a polyolefin, polyethylene, polypropylene, an ethylene-vinyl acetate copolymer, an ethylene-acrylic acid copolymer, and combinations thereof.

In another aspect of the present disclosure, which may be used in combination with any other aspect or combination of aspects listed herein, the wax material comprises at least one of an alkane wax selected from the group consisting of an undecane, a dodecane, a tridecane, a tetradecane, a pentadecane, a hexadecane, a heptadecane, an octadecane, a nonadecane, an eicosane, a heneicosane, and combinations thereof.

In another aspect of the present disclosure, which may be used in combination with any other aspect or combination of aspects listed herein, the wax material is a blend of two alkane waxes.

In another aspect of the present disclosure, which may be used in combination with any other aspect or combination of aspects listed herein, the wax material is a blend of hexadecane and pentadecane in a weight ratio of hexadecane to pentadecane from 40:60 to 1:95.

In another aspect of the present disclosure, which may be used in combination with any other aspect or combination of aspects listed herein, the weight ratio of hexadecane to pentadecane is about 15:85.

In another aspect of the present disclosure, which may be used in combination with any other aspect or combination of aspects listed herein, a ratio of the synthetic polymeric material to the wax material is in a range from 50:50 to 60:40.

In another aspect of the present disclosure, which may be used in combination with any other aspect or combination of aspects listed herein, the ratio of the synthetic polymeric material to the wax material is in the range from 52:48 to 58:42.

In another aspect of the present disclosure, which may be used in combination with any other aspect or combination of aspects listed herein, the ratio of the synthetic polymeric material to the wax material is about 55:45.

In another aspect of the present disclosure, which may be used in combination with any other aspect or combination of aspects listed herein, the predetermined threshold temperature is in a range of from about 8° C. to about 12° C.

In another aspect of the present disclosure, which may be used in combination with any other aspect or combination of aspects listed herein, the predetermined threshold temperature is about 10° C.

In another aspect of the present disclosure, which may be used in combination with any other aspect or combination of aspects listed herein, the predetermined exposure time for the indicator material to reach the predetermined amount of movement along the transport element at the predetermined threshold temperature is in a range of about 0.1-20 hours.

In another aspect of the present disclosure, which may be used in combination with any other aspect or combination of aspects listed herein, the predetermined threshold temperature is about 10° C., and the predetermined exposure time for the indicator material to reach the predetermined amount of movement along the transport element at the predetermined threshold temperature is in a range of about 4-8 hours.

In another aspect of the present disclosure, which may be used in combination with any other aspect or combination of aspects listed herein, the indicator material further comprises an optically distinctive material, so that movement of the indicator material along the channel element can be determined by observing the optically distinctive material.

In another aspect of the present disclosure, which may be used in combination with any other aspect or combination of aspects listed herein, the optically distinctive material is selected from the group consisting of colorants, dyes, pigments, fluorescent materials, optical phase modifying materials, liquid crystals, infrared-reflecting materials, ultraviolet-reflecting materials, infrared-absorbing materials, ultraviolet-absorbing materials, optically refractive materials, optically diffractive materials, holographic materials and mixtures thereof.

In another aspect of the present disclosure, which may be used in combination with any other aspect or combination of aspects listed herein, the apparatus has a stop temperature, which when the indicator material returns to the stop temperature after being exposed to a temperature at or above the predetermined threshold temperature, movement of the indicator material along the transport element stops. The predetermined threshold temperature is equal to or greater than the stop temperature. The predetermined threshold temperature is about 0.5 to 10° C. higher than the stop temperature. The predetermined threshold temperature is about 0.5 to 5° C. higher than the stop temperature.

In another aspect of the present disclosure, which may be used in combination with any other aspect or combination of aspects listed herein, the predetermined threshold temperature is about 10° C. and the stop temperature is in the range of about 5-9° C.

In another aspect of the present disclosure, which may be used in combination with any other aspect or combination of aspects listed herein, the predetermined threshold temperature is about 10° C. and the stop temperature is in the range of about 6-8° C.

In another aspect of the present disclosure, which may be used in combination with any other aspect or combination of aspects listed herein, the stop temperature is about 7° C.

In another aspect of the present disclosure, which may be used in combination with any other aspect or combination of aspects listed herein, the stop temperature is about 8° C.

In another aspect of the present disclosure, which may be used in combination with any other aspect or combination of aspects listed herein, the mixture of the synthetic polymeric material and the wax material is a homogenous mixture having a major melting peak temperature, and the major melting peak temperature is of about 0.1-6° C., about 0.3-5° C., or preferably about 0.1-2° C. lower than the predetermined threshold temperature.

In another aspect of the present disclosure, which may be used in combination with any other aspect or combination of aspects listed herein, the synthetic polymeric material and wax material are miscible.

In another aspect of the present disclosure, which may be used in combination with any other aspect or combination of aspects listed herein, the predetermined threshold temperature is about 10° C. and the major melting peak temperature of the homogeneous mixture is in the range of from about 8.0° C. to about 9.9° C.

In another aspect of the present disclosure, which may be used in combination with any other aspect or combination of aspects listed herein, the major melting peak temperature of the homogenous mixture is in the range of from about 8.1° C. to about 9.8° C.

In another aspect of the present disclosure, which may be used in combination with any other aspect or combination of aspects listed herein, the polymer having SCC has a melting peak temperature of about 0.1-10° C., or preferably about 0.5-5° C. lower than the predetermined threshold temperature.

In another aspect of the present disclosure, which may be used in combination with any other aspect or combination of aspects listed herein, the predetermined threshold temperature is about 10° C. and the polymer having SCC has a melting peak temperature of about 7.0-9.9° C.

In another aspect of the present disclosure, which may be used in combination with any other aspect or combination of aspects listed herein, the predetermined threshold temperature is about 10° C. and the polymer having SCC has a melting peak temperature of about 8.0-9.6° C.

In another aspect of the present disclosure, which may be used in combination with any other aspect or combination of aspects listed herein, the predetermined threshold temperature is about 10° C. and the polymer having SCC has a melting peak temperature of about 8.8-9.5° C.

In another aspect of the present disclosure, which may be used in combination with any other aspect or combination of aspects listed herein, a total weight of the indicator material is in a range of from about 3.0 mg to about 8.0 mg.

In another aspect of the present disclosure, which may be used in combination with any other aspect or combination of aspects listed herein, the total weight of the indicator material is in the range of from about 4.0 mg to about 5.5 mg.

In another aspect of the present disclosure, which may be used in combination with any other aspect or combination of aspects listed herein, the time-temperature indicator material, when not previously exposed to a temperature above the predetermined threshold temperature, does not reach the predetermined amount of movement when exposed to a high temperature of up to about 35° C. higher than the predetermined threshold temperature for up to about 5 minutes, or even up to about 28 minutes.

In another aspect of the present disclosure, which may be used in combination with any other aspect or combination of aspects listed herein, the time-temperature indicator material, when not previously exposed to a temperature above the predetermined threshold temperature, does not reach the predetermined amount of movement when exposed to a high temperature of up to about 30° C. higher than the predetermined threshold temperature for up to about 5 minutes, or even up to about 28 minutes.

In another aspect of the present disclosure, which may be used in combination with any other aspect or combination of aspects listed herein, the time-temperature indicator material, when not previously exposed to a temperature above the predetermined threshold temperature, does not reach the predetermined amount of movement when exposed to a high temperature of up to about 45° C. higher than the predetermined threshold temperature for up to about 5 minutes, or even up to 25 minutes.

In another aspect of the present disclosure, which may be used in combination with any other aspect or combination of aspects listed herein, predetermined threshold temperature is about 10° C., and the indicator material, when not previously exposed to a temperature above the predetermined threshold temperature, does not reach the predetermined amount of movement when exposed to a high temperature of about 25° C. for up to about 1 minute, up to about 5 minutes, up to about 10 minutes, up to about 20 minutes, up to about 30 minutes, or even for up to about 54 minutes.

In another aspect of the present disclosure, which may be used in combination with any other aspect or combination of aspects listed herein, the time-temperature indicator material, when not previously exposed to a temperature above the predetermined threshold temperature, does not reach the predetermined amount of movement when exposed to a high temperature of up to about 25° C. higher than the predetermined threshold temperature for up to about 5 minutes, or even up to about 40 minutes.

In another aspect of the present disclosure, which may be used in combination with any other aspect or combination of aspects listed herein, the time-temperature indicator device has (i) a thermal responsiveness property according to the indicator material being thermally inactive below the stop temperature and being thermally responsive at or above the predetermined threshold temperature and (ii) a movement property according to the indicator material being configured to move in response to exposure to the predetermined threshold temperature and configured to stop moving at the stop temperature discussed above.

In another aspect of the present disclosure, which may be used in combination with any other aspect or combination of aspects listed herein, the time-temperature indicator device does not have hysteresis. The time-temperature indicator device maintains its thermal responsiveness property and its movement property when pre-exposed to a high temperature of up to about 30° C. higher than the predetermined threshold temperature for up to about 20 minutes, up to about 10 minutes, up to about 5 minutes, up to about 1 minute, or up to about 0.1 minute.

In another aspect of the present disclosure, which may be used in combination with any other aspect or combination of aspects listed herein, a pre-exposure of the time-temperature indicator device to a high temperature of up to about 30° C. higher than the predetermined threshold temperature for up to about 20 minutes, up to about 10 minutes, up to about 5 minutes, or up to about 1 minutes, does not materially change the response time for the indicator material to reach the predetermined amount of movement along the transport element when subsequently exposed to the predetermined threshold temperature. The response time falls approximately in the same range as the predetermined exposure time. In one embodiment an indicator exposed to 25° C. for 1 minute, when returned to 10° C., has almost the same response time as an indicator that has not been exposed to the higher temperature.

In another aspect of the present disclosure, which may be used in combination with any other aspect or combination of aspects listed herein, the predetermined threshold temperature is about 10° C., and the time-temperature indicator device maintains its thermal responsiveness property and its movement property when exposed to a temperature of about 25° C. for up to about 1 minute.

In another aspect of the present disclosure, which may be used in combination with any other aspect or combination of aspects listed herein, the predetermined threshold temperature is about 10° C., and the predetermined exposure time for the indicator material to reach the predetermined amount of movement along the transport element at the predetermined threshold temperature is in a range of about 4-8 hours. A pre-exposure of the time-temperature indicator device to a high temperature of up to about 30° C. higher than the predetermined threshold temperature for up to about 20 minutes, up to about 10 minutes, up to about 5 minutes, or up to about 1 minutes, does not materially change the response time for the indicator material to reach the predetermined amount of movement along the transport element at the predetermined threshold temperature. The response time falls approximately in the same range as the predetermined exposure time in a range of about 4-8 hours.

In another aspect of the present disclosure, which may be used in combination with any other aspect or combination of aspects listed herein, the indicator material does not traverse the predetermined amount of movement along the transport element at or below the predetermined stop temperature absent a pre-exposure of the ascending time-temperature indicator apparatus to a temperature at or above the predetermined threshold temperature.

In another aspect of the present disclosure, which may be used in combination with any other aspect or combination of aspects listed herein, the indicator material does not traverse the predetermined amount of movement along the transport element at or below the predetermined stop temperature within about 1 day, 2 days, 3 days or 20 days, absent a pre-exposure of the ascending time-temperature indicator apparatus to a temperature at or above the predetermined threshold temperature.

In another aspect of the present disclosure, which may be used in combination with any other aspect or combination of aspects listed herein, the predetermined threshold temperature is about 10° C., the indicator material does not traverse the predetermined amount of movement along the transport element at a temperature up to about 7° C. or about 8° C. absent a pre-exposure of the time-temperature indicator apparatus to a temperature at or above the predetermined threshold temperature.

In another aspect of the present disclosure, which may be used in combination with any other aspect or combination of aspects listed herein, the indicator material does not traverse the predetermined amount of movement along the transport element within 24 hours at a temperature of about 3° C. or 5° C. below the predetermined threshold temperature absent a pre-exposure of the time-temperature indicator apparatus to a temperature at or above the predetermined threshold temperature.

In another aspect of the present disclosure, which may be used in combination with any other aspect or combination of aspects listed herein, the indicator material does not traverse the predetermined amount of movement along the transport element at a temperature of about 1° C. lower the predetermined threshold temperature absent a pre-exposure of the time-temperature indicator apparatus to a temperature at or above the predetermined threshold temperature.

In another aspect of the present disclosure, which may be used in combination with any other aspect or combination of aspects listed herein, the indicator material does not traverse the predetermined amount of movement along the transport element at a temperature of about 2° C. lower the predetermined threshold temperature absent a pre-exposure of the time-temperature indicator apparatus to a temperature at or above the predetermined threshold temperature.

In another aspect of the present disclosure, which may be used in combination with any other aspect or combination of aspects listed herein, the transport element comprises a capillary member, and the transport element and the indicator material are configured so that the melted indicator material diffuses along the capillary member.

In another aspect of the present disclosure, which may be used in combination with any other aspect or combination of aspects listed herein, the capillary member is a narrow hollow tube that guides and facilitates the indicator material flow along the capillary member and thus the transport element through capillary attraction.

In another aspect of the present disclosure, which may be used in combination with any other aspect or combination of aspects listed herein, the capillary member is a textured surface with one or more surface grooves and/or capillary channels that guide and facilitate the indicator material flow along the capillary member and thus the transport element through capillary attraction.

In another aspect of the present disclosure, which may be used in combination with any other aspect or combination of aspects listed herein, the capillary member may be made of a hydrophobic material selected from the group consisting of hydrophobic polymers and copolymers of olefins, ethylene, propylene, vinyl chloride, carbonates, urethanes, acrylics, vinyls, vinyl chlorides, vinylidene chlorides, styrenes, amides, imides, esters, ethers, fluorocarbons and combination thereof.

In another aspect of the present disclosure, which may be used in combination with any other aspect or combination of aspects listed herein, the transport element comprises a wick member, and the transport element and the indicator material are configured so that the melted indicator material diffuses along the wick member.

In another aspect of the present disclosure, which may be used in combination with any other aspect or combination of aspects listed herein, the wick member is made from a material selected from the group consisting of filter paper; pulverized filter paper; fine silica gel; porous films containing polytetrafluoroethylene resin or silica gel; TESLIN® microporous synthetic sheet; non-woven, spun bonded materials including non-woven, spun-bonded high-densitypolyethylene, polypropylene and polyester; and non-woven, spun-bonded blends of any two or more such polymers.

In another aspect of the present disclosure, which may be used in combination with any other aspect or combination of aspects listed herein, an ascending time-temperature exposure indicator device, comprises a substrate; a transport element supported by the substrate; and a thermally sensitive indicator element supported by the substrate. Additionally, the indicator element comprises a solid indicator material, the indicator material is configured to move along the transport element when melted. The indicator material is configured to be a solid below a predetermined threshold temperature of about 10° C. The indicator material is configured to melt and move along the transport element in response to exposure to a temperature at or above the predetermined threshold temperature. The transport element and the indicator element are configured so that exposure to at least the predetermined threshold temperature for at least a predetermined exposure time in a range of 4-8 hours results in at least a predetermined amount of movement of the indicator material along the transport element, and exposure of the melted indicator material to a temperature at or below a stop temperature in a range of 6-8° C. causes the indicator material to stop moving along the transport element.

In another aspect of the present disclosure, which may be used in combination with any other aspect or combination of aspects listed herein, the transport element and the indicator element are configured so that exposure of the ascending time-temperature exposure indicator device to the predetermined threshold temperature for the predetermined exposure time results in the predetermined amount of movement of the indicator material along the transport element.

In another aspect of the present disclosure, which may be used in combination with any other aspect or combination of aspects listed herein, a time-temperature exposure indicator label for monitoring time exposure of a host product to a predetermined threshold temperature, the time-temperature exposure indicator label comprises a substrate; a human or machine-readable dataform on the substrate; a transport element supported by the substrate; and a thermally sensitive indicator element supported by the substrate. The indicator element comprises a solid indicator material. The indicator material is configured to move along the transport element when melted. The indicator material is configured to melt in response to exposure to a temperature at or above the predetermined threshold temperature. The predetermined threshold temperature is in a range of from about −10° C. to about 70° C. The indicator material further comprises a mixture of a synthetic polymeric material and a wax material. The transport element and the indicator element are configured so that exposure of the host product to the predetermined threshold temperature for the predetermined exposure time results in a predetermined amount of movement of the melted indicator material along the transport element.

In another aspect of the present disclosure, which may be used in combination with any other aspect or combination of aspects listed herein, the time-temperature indicator label further includes an adhesive backing layer contacting the substrate on a side opposite the transport element and the indicator element.

In another aspect of the present disclosure, which may be used in combination with any other aspect or combination of aspects listed herein, the time-temperature indicator label further comprises a protective liner positioned against the adhesive backing layer on a side opposite the substrate.

In another aspect of the present disclosure, which may be used in combination with any other aspect or combination of aspects listed herein, a batch of ascending time-temperature exposure indicators, comprises: a unifying container, a plurality of at least 50 time-temperature exposures indicators physically coupled to, such as contained in or attached to, the unifying container. Each time-temperature exposure indicator comprises, respectively: a substrate; a transport element supported by the substrate; and a thermally sensitive indicator element supported by the substrate, the indicator element comprising a solid indicator material. The indicator material is configured to move along the transport element when melted. The indicator material is configured to melt and move along the transport element in response to exposure to the predetermined threshold temperature. The transport element and the indicator element are configured so that exposure to the predetermined threshold temperature for the predetermined exposure time results in a change of indicator state, for example, by exhibiting a predetermined amount of movement of the indicator material along the transport element. In response to exposure at the predetermined temperature, at least 90% of the plurality of indicators change indicator state at the predetermined exposure time. A change of indicator state may be a change of reflectivity, a change in transparency, a change in hue, a change in apparent color, and combinations thereof.

In another aspect of the present disclosure, which may be used in combination with any other aspect or combination of aspects listed herein, the predetermined temperature is 10° C. and the predetermined exposure time is in a range of 4 to 8 hours. In response to exposure to the predetermined threshold temperature of 10° C., at least 90% of the batch of the time-temperature exposure indicators change indicator state within the predetermined exposure time in a range of 4 to 8 hours.

In another aspect of the present disclosure, which may be used in combination with any other aspect or combination of aspects listed herein, a method of manufacturing time-temperature exposure indicators comprises: producing a batch of at least about 50 indicators, for example about 200, about 250 or up to about 10000 or more indicators, by providing a substrate for each indicator; providing a transport element on the substrate; and providing an indicator element on the substrate. Additionally, the indicator element comprises an indicator material in solid form. The indicator material is configured to melt and move along the transport element in response to exposure to a temperature at or above a predetermined threshold temperature. The transport element and the indicator element are configured so that exposure to the predetermined threshold temperature for a predetermined exposure time in a range of, such as from 4 to 8 hours, results in a change of indicator state. The change of indicator state can be by exhibiting a predetermined amount of movement of the indicator material along the transport element. For each batch of time-temperature exposure indicators, at least 90% of the time-temperature exposure indicators change indicator state during the predetermined exposure time range when exposed to the predetermined threshold temperature.

In another aspect of the present disclosure, which may be used in combination with any other aspect or combination of aspects listed herein, providing the indicator element further comprises providing the indicator material in melted form and allowing it to cool and solidify on the substrate to form the solid indicator material.

These and other features are disclosed in greater detail in the accompanying figures and the Detailed Description below.

BRIEF DESCRIPTION OF THE DRAWINGS

Some embodiments of the present disclosure, and ways of making and of using one or more embodiments of the present disclosure, are described in detail herein and by way of example, with reference to the several views of the accompanying drawing (which are not necessarily drawn to scale with regard to any internal or external structures shown) and in which like reference characters designate like elements throughout the several views, and in which.

DETAILED DESCRIPTION

Figure 1:
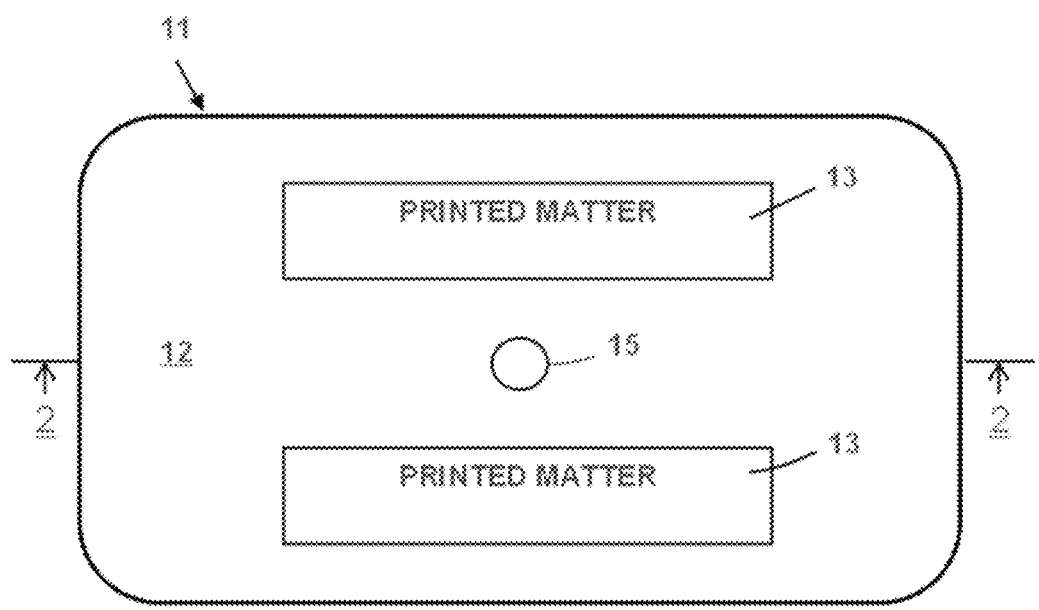
FIG. 1 is a plan view of one embodiment of an ascending time-temperature exposure indicator apparatus according to the present disclosure.

A need exists for an environmental indicator that may monitor one or more modes of environmental exposure of the environmental indicator or a host product that the environmental indicator is attached to, in particular, exposure to a specific temperature of interest for at least a predetermined exposure time, and which has enhanced properties and/or new properties. The present disclosure is generally directed to such improved temperature exposure indicators.

For example, some of the example indicators described in the present disclosure may be used to monitor whether perishable products have been properly refrigerated. Such product may be compromised if a refrigerator is not operating properly, or if the products are removed from refrigeration for too long an interval. Typical medical grade refrigerators have operation temperatures typically ranging from 0° C. to about 8° C. depending on applications and usually can be set up in narrower ranges such as about 5-7° C. or even 5-6.5° C. Typical household refrigerators have operation temperatures typically ranging from 0° C. to about 8° C., or from about 1° C. to about 8° C. However, the temperature may vary somewhat based on the location in the refrigerator, how often the door is opened, and how well the refrigerator is maintained.

In particular, some of the exposure indicators described herein may be provided with a novel thermally sensitive indicator material comprising a mixture of a synthetic polymeric material and a wax material. This material may permit such indicators to have longer delay times, sharper onset temperature, more accurate and tighter distribution of behavior, increased run-out temperature, and stop temperatures that are closer to the predetermined threshold temperature, as well as other desirable properties. The indicators may be provided on labels, and also in batches that have particularly uniform response properties.

The ascending time-temperature exposure indicator apparatus can provide a change of indicator state such as a color change at a predetermined end point to indicate possible loss of quality or freshness of the host product. The color change can be displayed in a suitable label, or the like, to be read optically, for example, visually by a human viewer or by an electronic device such as a bar code scanner or cell phone. A conventional approach is to rely on the movement of a colored dye, although other approaches may be employed. The color change can be chromatic or achromatic or provided by another visually detectable optical parameter change. It will be appreciated that other forms of indication, such as electrical conductivity, invisible UV-responsive indicator materials, and the like, may also be used to indicate the state change of the indicator.

The indicator apparatus may show how long (or a host product) has been exposed to a predetermined threshold temperature based on the mechanism of a positional displacement of one or more indicator materials. This displacement may be the result of temperature dependent diffusion, the melting of a solid indicator material or its precursor, allowing it to flow, the melting of a meltable solid plug, allowing a liquid to be released, the breaking of a container caused by freezing of its contents, or other approaches. Some specific examples are given below. The response time of the temperature indicator can be configured to correlate with a deterioration characteristic of the host product to coordinate the color change appropriately with the likely condition of the host product, e.g., by tuning the melting point of the indicator material by adjusting its composition, by changing the distance the material needs to move when melted to indicator exposure, or by changing the viscosity of the material or nature of the path through which the material moves, thereby adjusting the speed at which it moves.

In one example, the ascending time-temperature exposure indicator apparatus may include a substrate, a transport element supported by the substrate and a thermally sensitive indicator element supported by the substrate. When the indicator is initially provided, indicator element comprises a solid indicator material, e.g., a mixture of a synthetic polymeric material and a wax material. The indicator material is configured to melt at a predetermined temperature threshold, and then move along the transport element when melted. The melted material is chosen so that it takes a predetermined amount of time to move along the transport element at or about the predetermined threshold temperature, and so that the indicator changes indicator state at the predetermined amount of time.

The predetermined threshold temperature may be chosen at any suitable range depending on the applications. For example ranges may be chosen to show whether a product has been removed from a freezer, or a refrigerator, or exposed to another higher temperature. Example predetermined threshold temperatures may be about −10° C. to about 80° C., and preferably from about 0° C. to about 70° C., from about 0° C. to about 60° C., from about 1° C. to about 30° C., from about 2° C. to about 20° C., from about 5° C. to about 15° C., from about 8° C. to about 12° C., or from about 9° C. to about 11° C., e.g., about 10° C. Predetermined threshold temperature around 10° C. may be used to show removal from refrigeration. The transport element and the indicator element are configured so that exposure to at least the predetermined threshold temperature for at least a predetermined exposure time results in at least a predetermined amount of movement of the indicator material along the transport element.

The indicator material may include a synthetic polymeric material, e.g., a polymer having side chain crystallinity (SCC). Two or more SCC polymers may be blended in order to tune the properties of the material. In an example embodiment, the polymer having side chain crystallinity (SCC) is a polymer or a copolymer having at least one crystallizable side chain selected from the group consisting of a $C_{4-30}$ aliphatic group; a $C_{6-30}$ aromatic group; a linear aliphatic group having at least 10 carbon atoms; a combination of at least one aliphatic group and at least one aromatic group, the combination having from 7 carbon atoms to about 30 carbon atoms; a $C_{10}$-$C_{22}$ acrylate; a $C_{10}$-$C_{22}$ methacrylate; an acrylamide; a methacrylamide; a vinyl ether; a vinyl ester; a fluorinated aliphatic group having at least 6 carbon atoms; and a p-alkyl styrene group wherein the alkyl group has from about 8 carbon atoms to about 24 carbon atoms. Examples of such synthetic polymeric material is described in detail in U.S. Pat. Nos. 9,546,911 and 8,671,871, which are fully incorporated herein by reference for all purposes.

The synthetic SCC polymer may be selected so that it is solid at or below the stop temperature and is, or can become, a viscous liquid when at or above the predetermined threshold temperature. Such synthetic SCC polymer is meltable, and can also be hydrophobic, if desired. The synthetic SCC polymer may have a molecular weight of at least about 1,000 Da. In an example embodiment, the synthetic SCC polymer can have desirably sharp transitions from a solid state to a liquid state. When the indicator returns to a temperature at or below the stop temperature, the material may re-solidify, and thus stop moving.

The wax material may be at least one of an alkane wax, an alkyl ester, a natural wax, or a modified natural wax. In an example embodiment, the wax material comprises at least one of an undecane, a dodecane, a tridecane, a tetradecane, a pentadecane, a hexadecane, a heptadecane, an octadecane, a nonadecane, an eicosane, a heneicosane, a hexanoic acid, ethyl lactate, a paraffin wax, a microcrystalline wax, carnauba wax, beeswax, Chinese wax, shellac wax, spermaceti, tallow, palm wax, soy wax, 15 lanolin, wool grease, a waxy polymer, a waxy copolymer, a polyolefin, polyethylene, polypropylene, an ethylene-vinyl acetate copolymer, an ethylene-acrylic acid copolymer, and combinations thereof. In some disclosed examples the wax material is a blend of two alkane waxes. For example, the wax material may be a blend of hexadecane and pentadecane in a weight ratio of hexadecane to pentadecane from about 40:60 to about 1:95, from about 30:70 to about 10:90, from about 20:80 to about 10:90, or more preferably about 15:85. Other ranges may be chosen to tune the properties of the material. It will be appreciated that other combinations and proportions may also be employed. While other materials with the similar melting and flow properties as these wax materials might be employed, waxes like those disclosed herein generally tend to be stable, safe, have low volatility, and are easy to use in the manufacturing process.

In an example embodiment, a ratio of the synthetic polymeric material to the wax material is in a range from about 10:90 to about 90:10, from about 20:80 to about 80:20, from about 30:70 to about 70:30, from about 40:60 to about 60:40, from about 50:50 to about 60:40 and preferably from about 52:48 to about 58:42, e.g., about 55:45.

In an example embodiment, the predetermined exposure time for the indicator material to reach the predetermined amount of movement along the transport element at the predetermined threshold temperature is in a range of about 0.1-48 hours or even up to 72 hours or longer, about 1-24 hours, about 2-15 hours, about 2-10 hours, about 3-9 hours, or about 4-8 hours.

In an example embodiment, the predetermined threshold temperature is about 10° C., which corresponds to removal from a typical refrigerator unit, and the predetermined exposure time for the indicator material to reach the predetermined amount of movement along the transport element at the predetermined threshold temperature is in a range of about 4-8 hours. Other thresholds may be chosen, depending on the properties of the materials or host products being monitored and particular applications.

In an example embodiment, the indicator material further comprises an optically distinctive material, so that movement of the indicator material along the channel element can be determined by observing the optically distinctive material. For example, the optically distinctive material may from the group consisting of colorants, dyes, pigments, fluorescent materials, optical phase modifying materials, liquid crystals, infrared-reflecting materials, ultraviolet-reflecting materials, infrared-absorbing materials, ultraviolet-absorbing materials, optically refractive materials, optically diffractive materials, holographic materials and mixtures thereof.

In an example embodiment, the apparatus has a stop temperature. When the indicator material returns to the stop temperature after being exposed to a temperature at or above the predetermined threshold temperature, movement of the indicator material along the transport element stops. Usually, it is desirable that the stop temperature should be close to the predetermined threshold temperature, e.g., stop temperature is in a range of about 0.1 to 10° C., about 0.5 to 9.9° C., or about 0.5 to 5° C. lower than the predetermined threshold temperature. For example, in one example application, the predetermined threshold temperature is about 10° C. and the stop temperature is in the range of about 5-9° C., or more preferably in the range of about 6-8° C. Alternatively, the stop temperature might be about 6° C., about 7° C. or about 8° C.

In an example embodiment, the mixture of the synthetic polymeric material and the wax material is a homogenous mixture having a major melting peak temperature, and the major melting peak temperature is of about 0.1-10° C., about 0.1-6° C., about 0.5-5° C., about 0.5-3° C., or about 0.1-2° C. lower than the predetermined threshold temperature.

In an example embodiment, the synthetic polymeric material and wax material are miscible.

In an example embodiment, the predetermined threshold temperature is about 10° C. and the major melting peak temperature of the homogeneous mixture is in the range of from about 8.0° C. to about 9.9° C., or from about 8.1° C. to about 9.8° C.

In an example embodiment, the polymer having SCC has a single melting peak temperature of about 0.1-10° C. lower than the predetermined threshold temperature. In an example application, the predetermined threshold temperature is about 10° C. and the polymer having SCC has a single melting peak temperature of about 5.0-10.0° C., about 7.0-9.9° C., about 8.0-9.6° C., or about 8.5-9.6° C., about 8.6-9.5° C., or about 8.8-9.4° C.

In an example embodiment, a total weight of the indicator material deposited on the transport element is in a range of from about 2.0 to about 9.0 mg, from about 3.0 to about 8.0 mg, preferably from about 4.0 to about 5.5 mg, or from about 4.2 to about 5.2 mg.

In an example embodiment, the time-temperature indicator material, when not previously exposed to a temperature above the predetermined threshold temperature, does not reach the predetermined amount of movement when exposed to a high temperature of up to about 35° C. higher than the predetermined threshold temperature for up to about 5 minutes, or even up to about 28 minutes.

In an example embodiment, the time-temperature indicator material, when not previously exposed to a temperature above the predetermined threshold temperature, does not reach the predetermined amount of movement when exposed to a high temperature of up to about 30° C. higher than the predetermined threshold temperature for up to about 5 minutes, or even up to about 28 minutes.

In an example embodiment, the time-temperature indicator material, when not previously exposed to a temperature above the predetermined threshold temperature, does not reach the predetermined amount of movement when exposed to a high temperature of up to about 45° C. higher than the predetermined threshold temperature for up to about 5 minutes, or even up to 25 minutes.

In an example embodiment, the predetermined threshold temperature is about 10° C., and the indicator material, when not previously exposed to a temperature above the predetermined threshold temperature, does not reach the predetermined amount of movement when exposed to a high temperature of about 25° C. for up to about 1 minute, up to about 5 minutes, up to about 10 minutes, up to about 20 minutes, up to about 30 minutes, or even up to about 54 minutes.

In an example embodiment, the time-temperature indicator material, when not previously exposed to a temperature above the predetermined threshold temperature, does not reach the predetermined amount of movement when exposed to a high temperature of up to about 25° C. higher than the predetermined threshold temperature for up to about 5 minutes, or even up to about 40 minutes.

In an example embodiment, the time-temperature indicator device has (i) a thermal responsiveness property according to the indicator material being thermally inactive below the stop temperature and being thermally responsive at or above the predetermined threshold temperature and (ii) a movement property according to the indicator material being configured to move in response to exposure to the predetermined threshold temperature and configured to stop moving at the stop temperature discussed above.

In an example embodiment, the time-temperature indicator device does not have hysteresis. The time-temperature indicator device maintains its thermal responsiveness property and its movement property when pre-exposed to a high temperature of up to about 30° C. higher than the predetermined threshold temperature for up to about 20 minutes, up to about 10 minutes, up to about 5 minutes, up to about 1 minute, or up to about 0.1 minute.

In an example embodiment, a pre-exposure of the time-temperature indicator device to a high temperature of up to about 30° C. higher than the predetermined threshold temperature for up to about 20 minutes, up to about 10 minutes, up to about 5 minutes, or up to about 1 minutes, does materially not change the response time for the indicator material to reach the predetermined amount of movement along the transport element at the predetermined threshold temperature. The results will vary depending on the exact formulation used, but with proper formulation, the response time may still be materially the same as the predetermined exposure time. In one embodiment an indicator exposed to 25° C., a 15 degrees over threshold, for 1 minute, when returned to 10° C., has almost the same response time as an indicator that has not been exposed to the higher temperature. This might correspondence to natural variations in storage temperature, e.g., opening of refrigerator doors, or the like. Other combinations of high temperature exposure resistance may be obtained by varying the exact formulation, e.g., the melting point of the constituent materials, their viscosity/wickability when melted, and their proportion. It will be appreciated, that for any formulation there are temperature thresholds, and over threshold exposure times which will prevent the device from having a normal temperature response when returned to the base threshold temperature.

In an example embodiment, the predetermined threshold temperature is about 10° C., and the time-temperature indicator device maintains its thermal responsiveness property and its movement property when exposed to a temperature of about 25° C. for up to about 1 minute, up to about 5 minutes, or up to about 20 minutes.

In an example embodiment, the predetermined threshold temperature is about 10° C., and the predetermined exposure time for the indicator material to reach the predetermined amount of movement along the transport element at the predetermined threshold temperature is in a range of about 4-8 hours. Depending on the exact formulation, a pre-exposure of the time-temperature indicator device to a high temperature of up to about 30° C. higher than the predetermined threshold temperature for up to about 20 minutes, up to about 10 minutes, up to about 5 minutes, or up to about 1 minutes, may not materially change the response time for the indicator material to reach the predetermined amount of movement along the transport element at the predetermined threshold temperature. For example, in one embodiment an indicator exposed to 25° C. for 1 minute, when returned to 10° C., has almost the same 4-8 hour response time as an indicator that has not been exposed to the higher temperature.

In an example embodiment, the indicator material does not traverse the predetermined amount of movement along the transport element below the predetermined stop temperature absent a pre-exposure of the time-temperature indicator apparatus to a temperature at or above the predetermined threshold temperature.

In an example embodiment, the indicator material does not traverse the predetermined amount of movement along the transport element below the predetermined stop temperature within 72 hours absent a pre-exposure of the time-temperature indicator apparatus to a temperature at or above the predetermined threshold temperature.

In an example embodiment, the predetermined threshold temperature is about 10° C., the indicator material does not traverse the predetermined amount of movement along the transport element at a temperature up to about 7° C. absent a pre-exposure of the time-temperature indicator apparatus to a temperature at or above the predetermined threshold temperature.

In an example embodiment, the indicator material does not traverse the predetermined amount of movement along the transport element within 24 hours at a temperature below the predetermined threshold temperature absent a pre-exposure of the time-temperature indicator apparatus to a temperature at or above the predetermined threshold temperature.

In an example embodiment, the indicator material does not traverse the predetermined amount of movement along the transport element at a temperature about 1° C. lower the predetermined threshold temperature absent a pre-exposure of the time-temperature indicator apparatus to a temperature at or above the predetermined threshold temperature.

In an example embodiment, the indicator material does not traverse the predetermined amount of movement along the transport element at a temperature about 2° C. lower the predetermined threshold temperature absent a pre-exposure of the time-temperature indicator apparatus to a temperature at or above the predetermined threshold temperature.

In an example embodiment, the indicator material, when in the liquid state, can transport itself in contact with, on, or through the transport element. Transport of the indicator material can be effected by material flow, or in another suitable manner. The transport element can be configured to enable self-transport, or self-flow, of the liquid indicator material, for example, by being porous and/or wettable by the indicator material, or through capillary mechanism.

In an example embodiment, the transport element comprises a capillary member, and the transport element and the indicator material are configured so that the melted indicator material diffuses along the capillary member.

In an example embodiment, the capillary member is a narrow hollow tube that guides and facilitates the indicator material to flow along the capillary member and thus the transport element through capillary attraction.

In an example embodiment, the capillary member is a textured surface with one or more surface grooves and/or capillary channels that guide and facilitate the indicator material flow along the capillary member and thus the transport element through capillary attraction.

In an example embodiment, the capillary member may be made of a hydrophobic material selected from the group consisting of hydrophobic polymers and copolymers of olefins, ethylene, propylene, vinyl chloride, carbonates, urethanes, acrylics, vinyls, vinyl chlorides, vinylidene chlorides, styrenes, amides, imides, esters, ethers, fluorocarbons and combination thereof.

In an example embodiment, the transport element comprises a wick member, and the transport element and the indicator material are configured so that the melted indicator material diffuses along the wick member.

In an example embodiment, the wick member is made from a material selected from the group consisting of filter paper; pulverized filter paper; fine silica gel; porous films containing polytetrafluoroethylene resin or silica gel; TESLIN® microporous synthetic sheet; non-woven, spun bonded materials including non-woven, spun-bonded high-density-polyethylene, polypropylene and polyester; and non-woven, spun-bonded blends of any two or more such polymers.

In an example embodiment, a positional displacement of the indicator material is a displacement with respect to the transport element. In an embodiment, the transport element may be absorbent, and the indicator material is absorbable by the transport element. In another embodiment, the transport element comprises a capillary member, and the transport element and the indicator material are configured so that the melted indicator material diffuses along the capillary member.

In another aspect of the present disclosure, an ascending time-temperature exposure indicator device, comprises a substrate; a transport element supported by the substrate; and a thermally sensitive indicator element supported by the substrate. Additionally, the indicator element comprises a solid indicator material, the indicator material is configured to move along the transport element when melted. The indicator material is configured to be a solid below a predetermined threshold temperature of about 10° C. The indicator material is configured to melt and move along the transport element in response to exposure to a temperature at or above the predetermined threshold temperature. The transport element and the indicator element are configured so that exposure to at least the predetermined threshold temperature for at least a predetermined exposure time in a range of 4-8 hours results in at least a predetermined amount of movement of the indicator material along the transport element, and exposure of the melted indicator material to a temperature at or below a stop temperature in a range of 6-8° C. causes the indicator material to stop moving along the transport element.

In an example embodiment, the transport element and the indicator element are configured so that exposure of the time-temperature exposure indicator device to the predetermined threshold temperature for the predetermined exposure time results in the predetermined amount of movement of the indicator material along the transport element.

In an example embodiment, a time-temperature exposure indicator label for monitoring time exposure of a host product to a predetermined threshold temperature, the time-temperature exposure indicator label comprises a substrate; a human or machine-readable dataform on the substrate; a transport element supported by the substrate; and a thermally sensitive indicator element supported by the substrate. The indicator element comprises a solid indicator material. The indicator material is configured to move along the transport element when melted. The indicator material is configured to melt in response to exposure to a temperature at or above the predetermined threshold temperature. The predetermined threshold temperature is in a range of from about −10° C. to about 70° C. The indicator material further comprises a mixture of a synthetic polymeric material and a wax material. The transport element and the indicator element are configured so that exposure of the host product to the predetermined threshold temperature for the predetermined exposure time results in a predetermined amount of movement of the melted indicator material along the transport element.

In an example embodiment, the time-temperature indicator label may include an adhesive backing layer contacting the substrate on a side opposite the transport element and the indicator element. The time-temperature indicator label may further include a protective liner positioned against the adhesive backing layer on a side opposite the substrate. In an example embodiment, rolls of indicator labels may be provided to customers who use a label printer such as the Zebra ZT610 Printer, to print 2D barcodes on the surface of the indicators so that the indicators can be read with a Zebra scanner and log and store the indicator status electronically. The indicator can also be used separately by printing other text on the indicator surface during manufacture.

In another aspect of the present disclosure, a batch of ascending time-temperature exposure indicators, comprises: a unifying container, a plurality of at least 50 time-temperature exposures indicators physically coupled to, such as contained in or attached to, the unifying container. Each time-temperature exposure indicator comprises, respectively: a substrate; a transport element supported by the substrate; and a thermally sensitive indicator element supported by the substrate. Additionally, the indicator element comprises a solid indicator material. The indicator material is configured to move along the transport element when melted. The indicator material is configured to melt and move along the transport element in response to exposure to the predetermined threshold temperature. The transport element and the indicator element are configured so that exposure to the predetermined threshold temperature for a predetermined exposure time results in a change of indicator state, for example, by exhibiting a predetermined amount of movement of the indicator material along the transport element. In response to exposure at the predetermined threshold temperature, at least 90% of the plurality of indicators change indicator state at the predetermined exposure time.

In an example embodiment, the predetermined threshold temperature is 10° C. and the predetermined exposure time is in a range of 4 to 8 hours, and wherein in response to exposure to the predetermined threshold temperature of 10° C., at least 90% of the batch of the time-temperature exposure indicators change indicator state within the predetermined exposure time in a range of 4 to 8 hours.

In another aspect of the present disclosure, a method of manufacturing time-temperature exposure indicators comprises: producing a batch of at least about 50 indicators, for example about 200, about 250 or up to about 10000 or more indicators, by providing a substrate for each indicator; providing a transport element on the substrate; and providing an indicator element on the substrate. Additionally, the indicator element comprises an indicator material in solid form. The indicator material is configured to melt and move along the transport element in response to exposure to a temperature at or above a predetermined threshold temperature. The transport element and the indicator element are configured so that exposure to the predetermined threshold temperature for an exposure time in a predetermined exposure time range, such as from 4 to 8 hours, results in a change of indicator state. The change of indicator sate can be by exhibiting a predetermined amount of movement of the indicator material along the transport element. For each batch of time-temperature exposure indicators, at least 90% of the time-temperature exposure indicators change indicator state during the predetermined exposure time range when exposed to the predetermined threshold temperature.

In an example embodiment, providing the indicator element further comprises providing the indicator material in melted form and allowing it to cool and solidify on the substrate to form the solid indicator material.

In an example embodiment, some host products may frequently be exposed to a specific temperature of interest during their use, transportation, storage or other handlings. The host products do not immediately loss their quality or freshness when exposed to the specific temperature of interest, but would loss quality or freshness after a specific amount of exposure time to the specific temperature of interest. It is therefore of interest for the manufacturers, retailers or consumers of the host products to monitor the exposure time of the host products to the specific temperature of interest. The ascending time-temperature exposure indicator apparatus of the present disclosure addresses these needs. The ascending time-temperature exposure indicator apparatus can monitor the exposure of the host product to the specific temperature of interest such as a predetermined threshold temperature, with a delayed threshold response. For example, the ascending time-temperature exposure indicator apparatus will have a change of indicator state when exposed to the predetermined threshold temperature for a predetermined exposure time.

In an example embodiment, the indicator material may be inactive or in solid form below the stop temperature and being thermally responsive at or above the predetermined threshold temperature to record reversibly or preferably irreversibly with respect to the response time of exposure to a temperature at or above the predetermined threshold temperature, preferably at the predetermined threshold temperature. The indicator material may be a meltable solid at or below the stop temperature, and melts to be a viscous liquid at or above the predetermined threshold temperature and begins to flow.

The indicator material may have a wide range of molten viscosity, for example, in the range of about 20-100,000 cP. The viscosity of the indicator material decreases with increasing temperature throughout a temperature range of from about −10° C. to about 70° C., from about 0° C. to about 70° C., from about 2° C. to about 20° C., or from about 5° C. to about 15° C. The indicator material may have a viscosity activation energy above 10 kcal/mol. The predetermined threshold temperature may be in a range of from about −60° C. to about 70° C., from about −20° C. to about 60° C., from about −10° C. to about 50° C., from about 0° C. to about 40° C., from about 5° C. to about 20° C., from about 6° C. to about 15° C., and preferably from about 8° C. to about 12° C.

The indicator material can include an optically detectable indicator material. The thermal response of the indicator material to exposure temperatures can be an optically readable positional displacement of the indicator material or another suitable thermal response that provides a reversible, semi-reversible or an irreversible record of the exposure at or above the predetermined threshold temperature, preferably at the predetermined threshold temperature. The positional displacement can correlate with the characteristics of the host product such as quality or freshness during the exposure, optionally with a qualitative, semi-quantitative or quantitative relationship. Some useful indicator materials can provide a positional displacement in response to temperatures at or above the predetermined threshold temperature that is progressive, measurable and consistent during a time period of interest such as the predetermined exposure time.

Some examples of temperature indicators of the present disclosure may be based on the mechanism of the positional displacement of an indicator material that are found in U.S. Pat. Nos. 9,546,911 and 8,671,871, which are fully incorporated herein by reference for all purposes. The present disclosure may achieve longer delay times, and much tighter performance than the indicators disclosed previously.

Optionally, the indicator material further comprises an optically distinctive material. The optically distinctive material may be a regular dye that can provide an intense color under normal lighting conditions. An intense color can help provide a strong end point signal with good contrast between an end point condition and a prior condition of the indicator. An ascending time-temperature exposure indicator apparatus embodiment of the present disclosure employing such an indicator material can provide a useful alerting signal or warning signal. The positional displacement of the regular dye is the same as that of the indicator material and can be detected under normal lighting conditions. Alternative approaches may also be employed, for example, the indicator material might be colorless and interact with another material to change color once it has moved into contact with the other material.

The ascending time-temperature exposure indicator apparatus can have an optical reading direction for a viewer or an optical device to read the state of the ascending time-temperature exposure indicator apparatus. The state of the ascending time-temperature exposure indicator apparatus can be read by detecting a positional displacement of the indicator material that occurs in response to exposure to a temperature at or above the predetermined threshold temperature. The positional displacement can be predictable and/or measurable. The positional displacement can relate quantitatively to the cumulative temperature exposure at or above the predetermined threshold temperature. In some embodiments of the present disclosure, multiple positional displacements of the indicator material of a particular ascending time-temperature exposure indicator apparatus that occur at different times as a result of continuing or continual exposure to a temperature at or above the predetermined threshold temperature, can be read optically.

The positional displacement can be a flow of the liquid indicator material induced by melting of the indicator material in response to a temperature change. The positional displacement can take any desired positional form that provides a spatial displacement of some or all of the indicator material that can be read or observed by an optical reading device or a human viewer and detected as a displacement indicative of a change of state of the ascending time-temperature exposure indicator apparatus. For example, the positional displacement can be a flow of liquid indicator material. The flow of liquid indicator material can be linear or two-dimensional. The flow can be transverse to the optical reading direction or opposite to the optical reading direction or can proceed in multiple directions. Alternatively, the flow can spread out across an area from a source. For example, the flow can be along an elongated transport element that supports the indicator material. Alternatively the flow can be through a porous material and can occupy a volume presenting a viewing window transverse to the direction of flow.

The ascending time-temperature exposure indicator apparatus may be in a round button-like shape. The moving indicator element comprises a ring of indicator material, the transport element comprises a disc-shaped wick, the ring of indicator material extending around the perimeter of the disc-shaped wick, at or near the outer peripheral edge of wick, and the ascending time-temperature exposure indicator apparatus comprises a viewing window disposed approximately centrally of the ring of indicator material wherein the indicator material, when liquid, can flow inwardly of the ring towards the viewing window.

In a non-limiting example, the ascending time-temperature exposure indicator apparatus can include a reservoir of the indicator material. The ascending time-temperature exposure indicator apparatus can include a mask to conceal the reservoir of the indicator material and can prevent the indicator material from being read or viewed in the optical reading direction. The mask can be provided by an opaque layer or region of the ascending time-temperature exposure indicator apparatus covering the reservoir in a viewing direction. In some embodiment, no mask is present. A transport element can extend away from the reservoir. Optionally, the ascending time-temperature exposure indicator apparatus can include a scale to demark progress of the indicator material with respect to the transport element.

In an embodiment, the indicator material flows in a first direction toward a viewing surface of the ascending time-temperature exposure indicator apparatus. The transport element has a first end and a second end in the first direction. The ascending time-temperature exposure indicator apparatus comprises a reservoir of the indicator material positioned at the first end of the transport element in the first direction and marks to mark the position of the reservoir in the optical reading direction. The ascending time-temperature exposure indicator apparatus does not include a mask to conceal the reservoir of the indicator material to ensure that the viewable surface covers the entire transport element from the first end to the second end of the transport element in the first direction, so that the positional displacement of the indicator material is visible along the entire transport element.

Various structural configurations of existing environmental indicator are described and illustrated in U.S. Pat. Nos. 9,546,911 and 8,671,871, which are fully incorporated herein by reference for all purposes.

Figure 2:
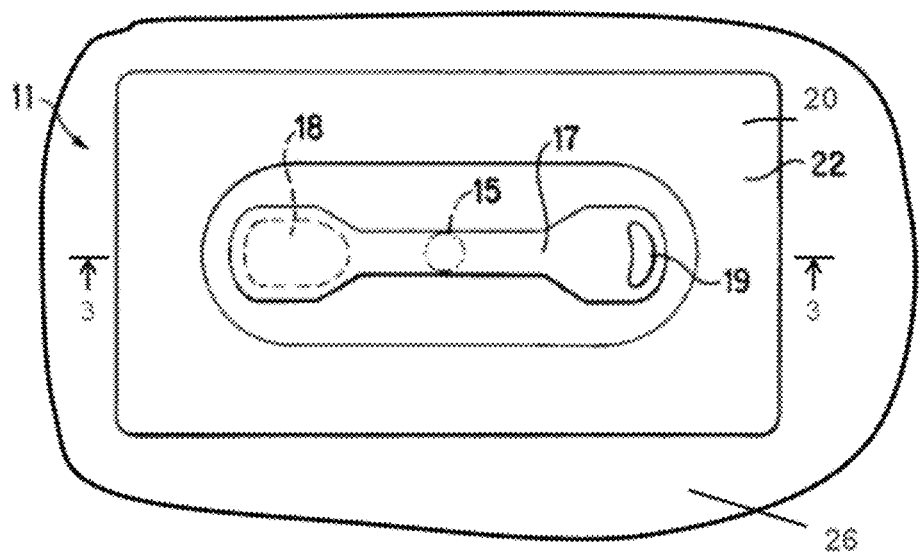
FIG. 2 is a further plan view of the ascending time-temperature exposure indicator apparatus shown in FIG. 1 with an upper layer of the ascending time-temperature exposure indicator apparatus removed, wherein the ascending time-temperature exposure indicator apparatus is shown attached to a host product after removal of a protective liner.
Figure 3:
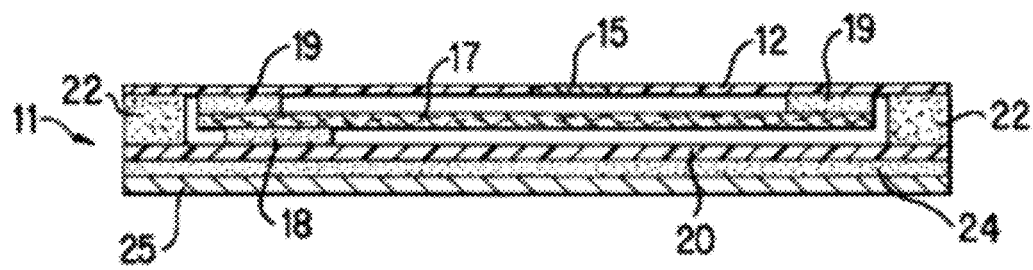
FIG. 3 is a sectional view on the line 3-3 of FIG. 2.

An example of one possible construction of the ascending time-temperature exposure indicator apparatus embodiment of the present disclosure is shown in FIGS. 1-3 of the accompanying drawings. Other possible constructions will be known or apparent to a person of ordinary skill in the art, in light of this disclosure, or will become known or apparent in the future, as the art develops.

Referring now to FIGS. 1-3 of the drawings, the illustrated ascending time-temperature exposure indicator apparatus, referenced 11, is configured as a thin label suitable for application to a host product, or a host product package or container. The ascending time-temperature exposure indicator apparatus 11 includes an upper layer 12 which can be clear or opaque. Upper layer 12 can be, for example, a printable sheet or film of plastic material on which is applied printed information, referenced as 13, for example, directions for use of ascending time-temperature exposure indicator apparatus 11. Other ascending time-temperature exposure indicator apparatus embodiments of the present disclosure can be configured without such an upper layer, if desired.

As used herein, "over", "overlaying", "under", and "beneath" and similar directional terms are used for convenience to the orientation of an ascending time-temperature exposure indicator apparatus as shown in the drawings. A person of ordinary skill in the art will understand that an ascending time-temperature exposure indicator apparatus can have any desired orientation in practice and may move through a variety of different orientations during its life. In general, unless the context indicates otherwise, "over" and "overlaying" can refer to a direction toward a notional viewer or optical reading device, and "under" or "beneath" can refer to a direction opposite to the optical reading or viewing direction.

As shown, ascending time-temperature exposure indicator apparatus 11 has a generally rectangular shape, with rounded corners. As will be understood, ascending time-temperature exposure indicator apparatus 11 can have other suitable shapes, for example, circular, oval, angular, square, triangular, polygonal, hexagonal and strip-like.

Upper layer 12 has a window 15 overlooking a wick member 17 at an intermediate location along the length of wick member 17, or at another location, if desired, for example, at one end of wick member 17. Wick member 17 is an example of an indicator transport element that can be employed in some ascending time-temperature exposure indicator apparatus embodiments of the present disclosure. Window 15 can function as a viewing port for optically reading or displaying the indicator signal generated by ascending time-temperature exposure indicator apparatus 11, in an optical reading direction which can be generally downward, or at a downward angle, as viewed in FIG. 3 toward upper layer 12.

As shown in FIGS. 2 and 3, upper layer 12 can have any desired structure and configuration. For example, upper layer 12 can be a sheet or film of a flexible, printable plastic material. Suitable materials for upper layer 12 include polyethylene, polypropylene, a polycarbonate, a polyester, a polyamide, a polyurethane, a polyvinyl chloride, a cellulosic, a cellophane, and other plastic materials. If desired, upper layer 12 can be a laminate of two or more materials, for example a lidding film. To facilitate attachment of upper layer 12 to other components of ascending time-temperature exposure indicator apparatus 11, upper layer 12 can be formed of a material suitable for heat-sealing to bottom layer 20, if desired. Optionally, upper layer 12 can bear a heat-sensitive coating on its underside to facilitate heat sealing. Also, upper layer 12 can be untreated, or can be treated on one or both surfaces to increase printability, if desired.

The ascending time-temperature exposure indicator apparatus 11 generates an indicator signal from an indicator element which includes wicking member 17 and an indicator material. The indicator material can be solid and unresponsive when below a stop temperature and liquid at or above a predetermined threshold temperature, the predetermined threshold temperature is equal to or greater than the stop temperature. When in a liquid state, the indicator material can advance or move along wicking member 17 which functions as a transport element for the fluid indicator material.

In practicing the present disclosure, the indicator material can have a viscosity which is temperature related in a suitable manner so that the positional displacement or transport, of the indicator material along a transport element such as wicking member 17 relates to a desired integral of temperature over time in the liquid state. The relationship can be quantitative and predictable, and, optionally, can be measurable and/or quantitatively demarked on the ascending time-temperature exposure indicator apparatus, for example, by a scale. For example, the indicator material viscosity can have a simple mathematical relationship to temperature. As already stated, the viscosity of the indicator material can decline with increasing temperature.

The relationship of the viscosity of the indicator material to temperature, in a temperature range of interest, can provide a smooth curve when plotted as a graph, which curve, desirably, is free of inflexions and discontinuities. The temperature range of interest can be from the step temperature to an arbitrary maximum temperature, which can be the highest temperature the ascending time-temperature exposure indicator apparatus is likely to encounter in normal use, for example, about 50° C., about 60° C. or about 70° C., or another suitable temperature.

The indicator material can have a temperature-related viscosity profile, or algorithm, which provides a rate of transport at a temperature, or within a temperature range, which is useful for monitoring the intended host product. The rate of transport can vary with temperature.

For example, the indicator material can have temperature-related viscosity characteristics that yield a rate of transport at a temperature of interest, or a temperature range of interest, that is such as to provide a conveniently detectable displacement of the indicator material at the end of a particular exposure at the temperature of interest, or in the temperature range of interest. The temperature exposure can be such as to be sufficient to induce a change in the host product that is to be monitored, for example, a loss of quality. The temperature range can be a range in which the host product can suffer a loss of quality, or other deleterious effects, in ordinary commercial circumstances, for example, the distribution, of a host product from a supplier to end users. The commercial circumstances can sometimes include conditions of storage by the end users prior to consumption or use of the host product.

The indicator material can have a viscosity, or viscosity profile, at a particular temperature, or a temperature range, that provides a rate of transport of the indicator material that is convenient for detection over a time period relevant to the host product, for example, about 1 hour, about 2 to about 10 hours, about 5 to about 9 hours, about 4 to about 8 hours, a day, a week, a month, or more. The time period can relate to the time from the manufacture of the host product to its end use, including a possible storage period, or periods during distribution and handling, or can be determined in another suitable manner.

As illustrated in FIGS. 2 and 3, wick member 17 has a "dogbone", or dumbbell, shape and is secured beneath upper layer 12 in the optical reading direction. Wick member 17 can have any suitable configuration which provides a flow path, or flow paths, for the indicator material. For example, wick member can have an elongated shape, as shown, or an arcuate shape, or a ring-like shape, or can be configured as a longitudinal strip. Wick member 17 can be affixed to the underside of upper layer 12 in any suitable manner, for example, by adhesive contact areas 19 (only the right hand one of which is shown in FIG. 2) located at the extremities of wick member 17. Alternatively, wick member 17 can be secured or located in ascending time-temperature exposure indicator apparatus 11 by attachment to, or contact with, other structure.

As shown in FIGS. 2 and 3, a reservoir 18 of initially solid indicator material is located in contact with wick member 17 at the left-hand end of wick member 17, as viewed in FIGS. 2 and 3. Alternatively, reservoir 18 can be disposed at another suitable location. Reservoir 18 can be, for example, a bead-like mass of solid indicator material deposited on wick member 17 in contact with the wick material. Other configurations of wick member 17 and dispositions of one or more reservoirs 18 are possible, some of which are described herein. However, reservoir 18 need not be in physical contact with wick member 17 provided that the indicator material can contact wick member 17 when liquid. For example, reservoir 18 can constitute a solid mass of indicator material that deforms, drips or drops to contact wick member 17, when the indicator material melts, if desired.

Wick member 17 is constructed to permit travel, or positional displacement, of liquid indicator material along wick member 17 toward window 15 for optical detection of the indicator material at window 15, or in optical alignment with window 15. For example, wick member 17, can be formed of a porous and absorbent material, such as filter paper, that permits the indicator material, when liquid, to permeate along wick member 17.

Suitable wick member materials include: various opaque or transparent papers, such as different grades of filter paper, including fine-pored and coarse-pored papers, non-woven fibrous materials formed of natural or synthetic fibers; pulverized filter paper; fine silica gel; porous films containing polytetrafluoroethylene resin or silica gel; TESLIN® microporous synthetic sheet (PPG Industries, Pittsburgh, Pa.); non-woven, spun bonded materials, including non-woven, spun-bonded high-density-polyethylene, polypropylene, and polyester; other non-woven, spun-bonded synthetic polymers; and non-woven, spun-bonded blends of any two or more such polymers.

Any suitable spacing can be employed between reservoir 18 and window 15, for example, a spacing of from about 1 mm to about 50 mm, or from about 3 mm to about 25 mm, or from about 5 mm to about 15 mm. Such spacings are illustrative of spacings that can be provided in the ascending time-temperature exposure indicator apparatus embodiments of the present disclosure between a reservoir of indicator material and an optical reading location, for example, window 15. The spacing can constitute a distance to be traveled by indicator material to provide an indicator signal. The spacing can be determined based on various parameters, for example, the rate of travel of the indicator material, the time-temperature response profile of the host product, the expected ambient temperature conditions, and the like.

In an ascending time-temperature exposure indicator apparatus embodiments of the present disclosure, the time for indicator material to permeate from a reservoir such as reservoir 18 to a window such as window 15 can relate to the viscosity of the indicator material when liquid. The permeation time can also relate to the exposure of the indicator material to temperatures at or above the predetermined threshold temperature.

As already noted, some other possible arrangements for configuring the indicator material with a transport element include providing a plurality of reservoirs 18 each including solid indicator material. For example, a reservoir 18 can be provided at each end of wick member 17, equidistant from window 15. Such a configuration of two or more reservoirs can supply liquid indicator material in two flows to arrive nearly simultaneously at a viewing window such as window 15, filling the window more quickly than would a single flow. Such an ascending time-temperature exposure indicator apparatus can have a sharper end point wherein the time from commencement of an indicator signal when indicator material first appears at the viewing window, to display of a complete or full signal, when the viewing window is filled with indicator material, is shorter.

As shown in FIGS. 1 and 2, when read together, to facilitate reading of a clear indicator signal in window 15, by concealing unnecessary information, upper layer 12 can be opaque in a region extending over reservoir 18, or over reservoir 18 and the portion of wick member 17 along which the indicator material travels to reach window 15, if desired. The entire extent of upper layer 12, can be opaque, if desired, with the exception of window 15.

The clarity of the indicator signal can be enhanced by employing optically contrasting materials for wick member 17 and the indicator material. For example, wick member 17 can be white, or another light color, and the indicator material can be a dark or an intense color, for example black, red, green, orange or blue. Any other suitable color combinations can be employed, if desired. For example, the wick member can be dark colored and the indicator material can be light. An indicator signal which changes from light to dark may be more readily understood as an alert to a possible loss of quality. One or more background components optically contrasting with the indicator material can be provided at the viewing location, if desired.

In some embodiments, the indicator material may include an optically distinctive material selected from the group consisting of colorants, dyes, pigments, fluorescent materials, optical phase modifying materials, liquid crystals, infrared-reflecting materials, ultraviolet-reflecting materials, infrared-absorbing materials, ultraviolet-absorbing materials, optically refractive materials, optically diffractive materials, holographic materials and mixtures thereof. The indicator material can further generate another kind of optical signal, such as a bright appearance of a predetermined color when exposed to specific light wavelengths such as UV lights and special camera flashes or scanner light sources while being invisible/undetectable under normal lighting conditions. In alternative embodiments, the material may be electrically conductive and close a circuit when it reaches a certain point with enough material, or insulative, and open the circuit when it moves beyond a certain point with enough material.

Again referring to FIGS. 2 and 3, ascending time-temperature exposure indicator apparatus 11 also includes a bottom layer 20 which, in various embodiments, can be a sheet or film formed of a plastics material, for example one of the materials described for upper layer 12. Bottom layer 20 can be formed of the same material as upper layer 12 or of a different material or materials. Bottom layer 20 can be opaque, if desired, to conceal the inner components of the indicator device. Bottom layer 20 can be sealed to the upper layer 12 in a suitable pattern that surrounds wick member 17 and the indicator material in reservoir 18. For example, bottom layer 20 can be adhered to upper layer 12 with adhesive or by heat sealing to form a perimeter seal extending around wick member 17 and reservoir 18. If desired, bottom layer 20 can form a pouch seemingly enclosing the operational elements of the indicator apparatus.

As shown in FIG. 3, the outer surface of bottom layer 20 can be coated with an adhesive layer 24 of pressure-sensitive adhesive, or other suitable adhesive, to permit attachment of ascending time-temperature exposure indicator apparatus 11 to a host product or a host product container or associated package or the like (none of which are shown). A removable release liner 25 can cover and protect adhesive layer 24 prior to attachment of ascending time-temperature exposure indicator apparatus 11 to a host product, or an associated package or the like.

FIG. 2 shows ascending time-temperature exposure indicator apparatus 11 adhered to an outer surface of a host product 26 by means of adhesive layer 24 (not visible in FIG. 2), after removal of release liner 25 (also not visible in FIG. 2). Structure 26 can alternatively indicate a package containing a host product.

The indicator element can have a thermal response algorithm that relates quantitatively to a time-temperature quality characteristic of the intended host product. The thermal response algorithm can be determined, and/or is defined, by the response of the indicator material to the temperature conditions it encounters when in the liquid state. Various embodiments of the present disclosure include a host product and an environmental indicator according to the present disclosure, such as ascending time-temperature exposure indicator apparatus 11, which is associated with the host product and which has a time-related thermal response algorithm that is related to the time-temperature quality characteristic of the host product.

One use of the ascending time-temperature exposure indicator apparatus 11 shown in the drawings will now be described, for illustrative purposes. The exemplary embodiment of ascending time-temperature exposure indicator apparatus 11 employs a white wick member 17, and a red-dyed indicator material, wherein the indicator material has a stop temperature of 7° C. and a predetermined threshold temperature of 10° C. These parameters are intended to be merely illustrative and indicator materials with other colors, other optically distinctive material, and other temperature characteristics can be employed pursuant to this description.

In this example, the red-dyed indicator material flows along wick member 17. The positional displacement of the red dye is the same as that of the indicator material. The red-dyed indicator material is initially placed in reservoir 18.

While the ascending time-temperature exposure indicator apparatus 11 remains below the stop temperature of the indicator material, the indicator material remains solid and does not travel along wick member 17. Transparent window 15, which provides a view of wick member 17, accordingly has a white appearance provided by white wick member 17. The appearance can be determined visually, or by a camera, or in another suitable manner, by optically reading wick member 17 through viewing window 15 in the optical reading direction.

At ambient temperatures at the predetermined threshold temperature, the red-dyed indicator material becomes a viscous liquid that migrates or flows along wick member 17 and can quantitatively record the time-temperature exposure at the predetermined threshold temperature. Thus, when experiencing a temperature at the predetermined threshold temperature, the ascending time-temperature exposure indicator apparatus 11 self-activates because the indicator material becomes a flowable viscous liquid that begins to migrate or flow.

Depending upon the indicator material employed, at intermediate temperatures between the stop temperature and the predetermined threshold temperature, in some embodiments, the indicator material can advance very slowly along wick member 17. The rate, or rates, of advance at intermediate temperatures can be slower than at temperatures at the predetermined threshold temperature. For example, the advance at intermediate temperatures can be so slow as to be immaterial to the monitoring of temperature exposure at the predetermined threshold temperature. Alternatively, the advance at intermediate temperatures can be useful for monitoring a host product parameter that is subject to slow change at intermediate temperatures, and to more rapid change at higher temperatures at the predetermined temperature.

The liquid indicator material has a viscosity which determines the rate of transport of the indicator material along wick member 17. The rate of transport of liquid indicator material on a wick member also can be referred to as the "wicking rate". The viscosity can vary with temperature. For example, the viscosity can decrease with temperature so that at higher temperatures the indicator material moves more quickly with respect to wick member 17, or another suitable transport element. At lower temperatures, the viscosity is higher, and the indicator material moves more slowly. Thus, the indicator material displacement can be indicative of the duration of the exposure to different temperatures and the indication is cumulative because the indicator material cannot retreat. If the ambient temperature falls below the stop temperature, the indicator material solidifies, remaining stationary, until the temperature rises again.

The temperature-related viscosity profile of the indicator material can determine the total positional displacement, or degree of advance, of the indicator material with respect to wick member 17, or another suitable transport element, under a given pattern of time-related temperature conditions. The ascending time-temperature exposure indicator apparatus embodiments of the present disclosure can employ indicator materials having a temperature-related viscosity profile that provides a predictable displacement in response to a desired cumulative exposure to the predetermined threshold temperature over time. The viscosity of the indicator material, and the distance traveled by the indicator material with respect to the transport element can vary with temperature, in a consistent manner, to provide a quantitative record of cumulative time-temperature exposure, according to the nature of the indicator material employed.

The liquid indicator material can advance a fixed distance in response to a particular cumulative time-temperature exposure at the predetermined threshold temperature of ascending time-temperature exposure indicator apparatus 11. The fixed distance can be the distance from reservoir 18 to window 15, a particular distance along a graduated displacement scale (not shown) that can be marked on ascending time-temperature exposure indicator apparatus 11, or another fixed distance.

The particular cumulative time-temperature exposure value for which an ascending time-temperature exposure indicator apparatus embodiment can be calibrated, or otherwise provided, can be determined by the heat-response characteristics of the host product. The ascending time-temperature exposure indicator apparatus can signal when the exposure value has been reached as a result of ambient conditions experienced by the ascending time-temperature exposure indicator apparatus. The indicator material can advance to provide a particular displacement indicative of the sum over time that the ascending time-temperature exposure indicator apparatus and the indicator material are exposed to the predetermined threshold temperature.

The indicator material can be selected in accordance with the temperature-response properties of a host product to be monitored, so that indicator material can fill window 15 substantially or completely following an exposure to a predetermined threshold temperature likely to cause a loss of host product quality.

Exposure to the predetermined threshold temperature causes the indicator material to continue to migrate along wick member 17 until it reaches window 15, changing the appearance of window 15 from white to red under normal lighting conditions, and signaling that an end point has been reached. The appearance change of window 15 from white to red can indicate that the exposure to the predetermined threshold temperature experienced by a host product with which the indicator apparatus is associated may have impaired the quality of the host product.

Once the appearance of wick member 17 at window 15 has changed, cooling of ascending time-temperature exposure indicator apparatus 11 below the stop temperature or the predetermined threshold temperature does not reverse the appearance change. The exemplary indicator cannot change back from red to white. Rather, cooling causes the indicator material to solidify in place, for example, spread out along wick member 17, "locking in" the historical record of temperature exposure. If wick member 17 is porous, the indicator material can be impregnated into the pores in an effectively permanent manner.

If the temperature of the indicator material drops below the stop temperature before the indicator material progresses to the viewing window, the indicator material can solidify and cease to flow along the wick member 17 or other transport element. If the ambient temperature then returns to the predetermined threshold temperature, the indicator material again can melt and continue to advance along wick member 17 or other transport element, recording the new time-related exposure to the predetermined threshold temperature. In this way, the ascending time-temperature exposure indicator apparatus can record cumulative response time of the exposure to the predetermined threshold temperature.

Many variations of the structure of an ascending time-temperature exposure indicator apparatus embodiment of the present disclosure are possible, only some of which are described herein. For example, a transport element, if employed, can have an arcuate configuration, a convoluted configuration, or another shape. Two, or more than two, indicator material reservoirs can be employed, for example, three or four indicator material reservoirs. Furthermore, multiple indicator material reservoirs, if employed, can supply the indicator material, when liquid, to a single optical reading location. For this, or other purposes, the transport element, or transport elements can provide multiple pathways along which the indicator material can advance, for example, multiple pathways along the radii of a circle, or of a ring, or polygon, extending towards a viewing location at the center of the circle, or of the ring or the like. Such embodiments can provide a sharp end point at the viewing location as multiple indicator flows converge and fill the window.

Figure 4:
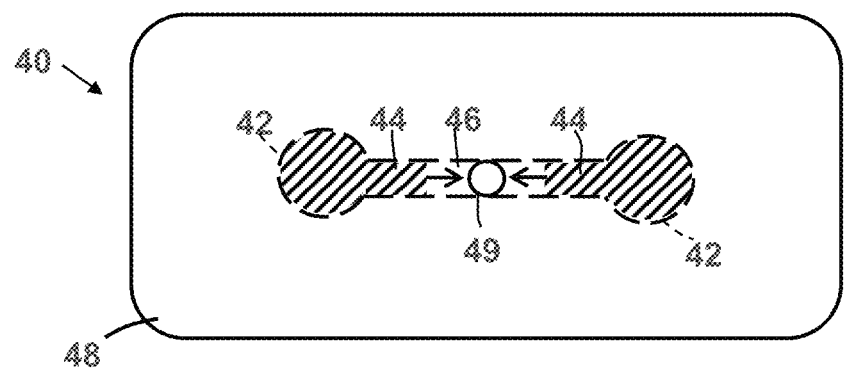
FIG. 4 is a top plan view of another embodiment of the ascending time-temperature exposure indicator apparatus according to the present disclosure, which employs two reservoirs of indicator material.

FIG. 4 illustrates an embodiment of an ascending time-temperature exposure indicator apparatus according to the present disclosure, referenced 40 in FIG. 4 that employs two indicator material reservoirs 42. Ascending time-temperature exposure indicator apparatus 40 includes an indicator element that comprises two reservoirs 42 of indicator material 44. Reservoirs 42 are located at the opposite ends of a light-colored, dogbone-shaped wick member 46 that is disposed beneath an opaque upper layer 48 of the indicator apparatus. Indicator material 44 is supported by wick member 46 and is in contact with it. In an embodiment, indicator material 44 comprises an optically distinctive material, such as a red dye, which is evenly mixed into indicator material 44.

A window 49 is formed in upper layer 48 and is located approximately equidistantly between reservoirs 42 to permit a central zone of wick member 46 to be viewed. Ascending time-temperature exposure indicator apparatus 40 has a stop temperature and a predetermined threshold temperature determined by the nature of indicator material 44. In use, when ascending time-temperature exposure indicator apparatus 40 is exposed to the predetermined threshold temperature, indicator material 44 melts and flows away from reservoirs 42 towards window 49, in two opposed, convergent streams moving in the direction of the arrows shown in the center of FIG. 4. Shortly after reaching the perimeter of window 49, the two streams of indicator material 44 can rapidly fill window 49 with indicator material 44, providing a sharp end point. For example, all or some of the flows can arrive at the window at about the same time, rapidly filling the window and providing a sharp end point wherein the time from the first appearance of indicator material at the viewing window to filling of the window area is short.

Instead of two reservoirs 42, other embodiments of ascending time-temperature exposure indicator apparatus 40 can have three, or four, or more, reservoirs of indicator material, each with its own flow pathway to a viewing window, provided by a wick member, or other suitable transport element. Each of the flow pathways can be essentially straight, as shown in FIG. 4, if desired. Alternatively, the flow pathways can be curved, or otherwise configured, to extend the distance between each respective reservoir and the viewing window thereby delaying the arrival of the indicator material at the viewing window. The flow paths can have equal flow lengths so that each flow arrives at the viewing window at about the same time.

Ascending time-temperature exposure indicator apparatus 40 is illustrative of some of the variations that can be made to ascending time-temperature exposure indicator apparatus 11 shown in FIGS. 1-3, and in the several elements of ascending time-temperature exposure indicator apparatus 11. Such variations can also be made to other embodiments of ascending time-temperature exposure indicator apparatus according to the present disclosure, if desired, unless they would appear to be impractical.

Figure 5:
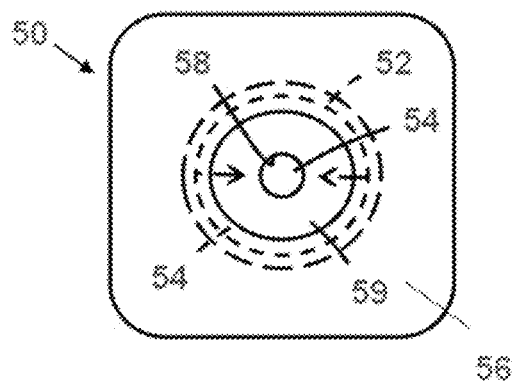
FIG. 5 is a top plan view of a further embodiment of the ascending time-temperature exposure indicator apparatus according to the present disclosure, which employs a ring of indicator material.

FIG. 5 illustrates a further embodiment of the ascending time-temperature exposure indicator apparatus according to the present disclosure, which is referenced 50 in FIG. 5, and which is configured to promote the display of a sharp end point signal. Ascending time-temperature exposure indicator apparatus 50 has an indicator element that comprises a ring of colored indicator material 52 that extends around the perimeter of a disc-shaped wick member 54, at or near the outer peripheral edge of wick member 54.

Wick member 54 supports indicator material 52 in contact with the wick material and is disposed beneath an opaque upper layer 56 of ascending time-temperature exposure indicator apparatus 50. A window 58 is provided in upper layer 56 approximately in the center of wick member 54. Window 58 is disposed approximately centrally of the ring of indicator material 52. Window 58 can permit a central zone of wick member 54 to be optically displayed externally of ascending time-temperature exposure indicator apparatus 50 for viewing by a human observer, or by a viewing device. Upper layer 56 can bear a reference ring 59, showing the end point appearance of the indicator material, to facilitate the reading of the signal given by ascending time-temperature exposure indicator apparatus 50, if desired.

At temperatures at or above the predetermined threshold temperature, the indicator material 52 melts and flows inwardly towards window 58, as shown by the arrows in FIG. 5. The configuration of indicator material 52 in a ring around wick member 54 can cause a front of molten indicator material 52, which front can be approximately ring-shaped, to converge on the center of wick member 54, providing a sharp end point as the indicator material 52, reaching window 58 from multiple directions, or as a continuous ring, quickly fills the viewing zone provided by window 58.

By disposing the ring of indicator material 52 at or near the outer periphery of the disc provided by wick member 54, the molten indicator material 52 is unable to flow outwardly and is thus constrained to flow inwardly towards the middle of the disc, toward the center of wick 54, i.e., in the case of a circular ring of indicator material 52, approximately radially.

Indicator material 52 can be configured as a circular ring, as shown or can have another shape that facilitates a convergent flow of the indicator material 52 toward a central location on wick member 54 for example a triangle, a square, a hexagon or another regular polygon. The ring can be continuous or can be formed by a number of ring portions separated by spaces, for example, discrete dots and/or dashes.

Wick member 54 can have an outer perimeter approximately conforming to the outer periphery of the indicator material, if desired. Modified wick shapes are possible. For example, wick member 54 can resemble a spoked wheel and comprise a number of spokes to support travel of liquid indicator material from ring 52 toward a central region viewable through window 58.

Ascending time-temperature exposure indicator apparatus 50 is also illustrative of variations that can be made to ascending time-temperature exposure indicator apparatus 11 shown in FIGS. 1-3, and in the several elements of ascending time-temperature exposure indicator apparatus 11. Such variations can be made to other embodiments of the ascending time-temperature exposure indicator apparatus according to the present disclosure, if desired, unless they would appear to be impractical.

Some embodiments of the ascending time-temperature exposure indicator apparatus according to the present disclosure can give a nuanced signal, indicating a number of stages of cumulative temperature exposure over time. The indications of the multiple stages can be displayed for reading by a human viewer or an optical device. For example, instead of, or in addition, to a window for viewing an end point event, such embodiments can include an elongated transport element along which an indicator material can flow and, optionally, graduations can be marked adjacent to the transport element, to quantify the advance of the indicator material along the transport element and relate specific displacements of the indicator material along the transport element to the likely condition of a host product experiencing the temperature exposure. In such embodiments, an upper layer of the ascending time-temperature exposure indicator apparatus, can be sufficiently transparent in a region or regions aligned with the transport element to permit progress of the indicator material along the transport element to be read optically through the upper layer.

Such a multi-stage ascending time-temperature exposure indicator apparatus can be quantitatively correlated with the temperature response characteristics of the host product to provide a suitable relationship between indicator material displacement and the likely condition of the host product. A suitable relationship can be provided by appropriate selection of indicator material, transport element and indicator geometry, including distances to be traveled by the indicator material along the scale, or other markings, referring to relevant teaching herein.

Figure 6:
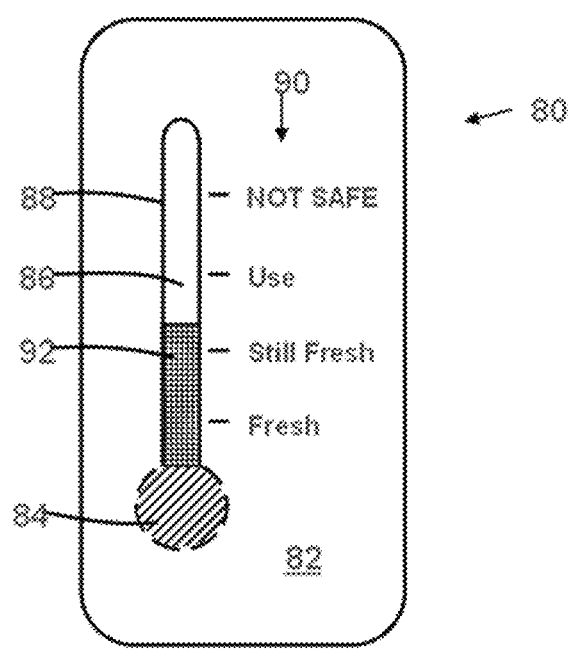
FIG. 6 is a top plan view of a still further embodiment of the ascending time-temperature exposure indicator apparatus according to the present disclosure, which employs a graduated flow of indicator material.

For example, FIG. 6 illustrates a further construction of an ascending time-temperature exposure indicator apparatus, referenced as 80 in FIG. 6, that can indicate a number of stages of the condition of a host product. Ascending time-temperature exposure indicator apparatus 80 has an indicator element that can display an extended flow of an indicator material along a linear flow path, for example, a rectilinear or curved flow path, in response to an appropriate temperature exposure over time. The indicator element can include multiple markings spaced along the flow path to indicate the progress of the indicator material along the flow path. For example a linear flow can be viewed against a graduated scale. The indicator material can comprise an optically distinctive material such as a regular dye that flows together with the indicator material along the transport element.

For this and other purposes, ascending time-temperature exposure indicator apparatus 80 includes an upper layer 82, a reservoir 84 of solid indicator material, and an elongated transport element 86 that is externally viewable for a substantial part of its length, or throughout its length.

As shown, upper layer 82 is opaque and conceals reservoir 84 from view. An elongated window 88 permits transport element 86 to be viewed. However, upper layer 82 can be transparent, or transparent in an appropriate region of transport element 86, so that transport element 86 is externally viewable, or optically readable, and no window 88 is required. Also, reservoir 84 can be exposed to view, if desired, by configuring upper layer 82 to be transparent over reservoir 84, or configuring window 88 to extend over reservoir 84, if desired.

Upper layer 82 bears markings, labeled generally by arrow 90 in FIG. 6, adjacent transport element 86 to demark the progress of the indicator material along transport element 86. Markings 90 are spaced at graduated intervals along transport element 86, corresponding with specific stages of cumulative temperature exposure, and each marking is labeled with a likely condition that a host product with which ascending time-temperature exposure indicator apparatus 80 is intended to be used will have as a result of the cumulative temperature exposure indicated. Four exemplary condition descriptions are shown in FIG. 6, namely, "Fresh", "Still Fresh", "Use", and "NOT SAFE", which condition descriptions are self-explanatory. Other conditions, and/or other labels can be employed, if desired.

Window 88 can be configured to extend only over the region of transport element 86 that is adjacent to markings 90, if desired, or can have any other suitable configuration. For example, instead of providing a continuous view of an extended region of transport element 86 in the vicinity of markings 90, as shown in FIG. 6 and described herein, window 88 can be configured with multiple ports, one for each marking 90 to provide an "on/off" indication for the temperature exposure stage represented by each marking.

Employing an indicator material that has predictable temperature-viscosity characteristics, such as described herein, the spacing's of markings 90 along transport element 86 can be determined to correspond approximately with particular cumulative time-temperature values. Markings 90 are shown with approximately regular spacing in FIG. 6, but other spacing can be employed, if desired.

Indicator materials with various temperature response characteristics can be employed to correlate with, or match, different host products having different time-temperature response characteristics to enable the same configuration of ascending time-temperature exposure indicator apparatus 80, with the same set of markings 90, to be employed with the different host products. Alternatively, different indicator materials can be employed with different indicator configurations having sets of markings 90 with different geometries, to provide a diversity of indicators useful for monitoring the same host product while providing different information.

In use, ascending time-temperature exposure indicator apparatus 80 can be associated with a host product, for example by being incorporated into a label that is adhered to the host product or to host product packaging. As the host product experiences an extended exposure, or repeated exposures to a predetermined threshold temperature or temperatures for ascending time-temperature exposure indicator apparatus 80, the indicator material advances along transport element 86 indicating the cumulative temperature exposure. A strip 92 of indicator material is shown in FIG. 6 as having advanced to a point between the "Still Fresh" marking and the "Use" marking.

Ascending time-temperature exposure indicator apparatus 80 is also illustrative of variations that can be made to ascending time-temperature exposure indicator apparatus 11 shown in FIGS. 1-3, and in the several elements of ascending time-temperature exposure indicator apparatus 11. Such variations can also be made to other embodiments of ascending time-temperature exposure indicator apparatus according to the present disclosure, if desired, unless they would appear to be impractical.

A reference marking can be provided, if desired, which has a similar appearance to the end point appearance of the indicator, to facilitate reading of the indicator signal. The reference marking can be, for example, a ring around the optical reading location, or another shaped marking on the indicator which is colored red or has another optical character similar to the optical characteristic or characteristics the indicator employs for signaling.

Further referring to FIG. 6, the ascending time-temperature exposure indicator apparatus 80 is configured to have viewable window 88 to extend from the reservoir 84 over the region of transport element 86 that is adjacent to markings 90 to the end viewable "NOT SAFE" point.

This ascending time-temperature exposure indicator apparatus 80 is desirable for certain retailers and suppliers to attach to a host product to continuously monitor the freshness or quality of the host product by checking the position of the appearance of the predetermined color along the viewable window 88.

Figure 7:
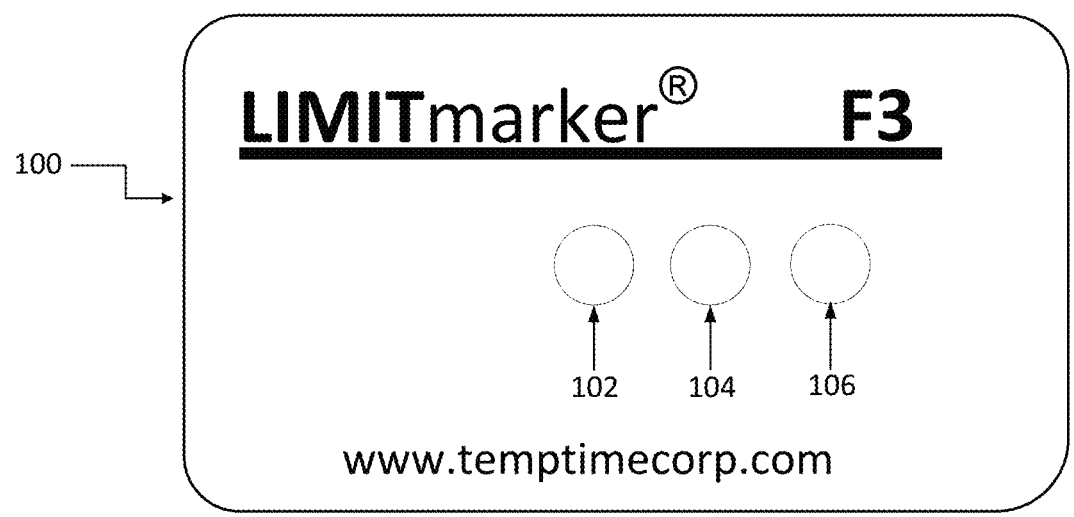
FIG. 7 is a top plan view of a still further embodiment of the ascending time-temperature exposure indicator apparatus according to the present disclosure, which employs a graduated flow of indicator material with three viewable windows.

Referring to FIG. 7, an example of ascending time-temperature exposure indicator apparatus 100 is provided which has a similar structure as ascending time-temperature exposure indicator apparatus 80 in FIG. 6, except that it has three viewable windows 102, 104, and 106 that are externally viewable as shown in FIG. 7 instead of a big elongated viewable window 88 as shown in FIG. 6. The operation mechanism of ascending time-temperature exposure indicator apparatus 100 is the same as that of ascending time-temperature exposure indicator apparatus 80 in FIG. 6.

The ascending time-temperature exposure indicator apparatus 100 is modified to have an opaque upper layer 82 which conceals the reservoir 84 and the elongated transport element 86 from view except for the three viewable windows 102, 104, and 106. The three viewable windows 102, 104, and 106 can be configured to correlate to different status of the host product, such as "Fresh", good to "use" and "not safe" to use respectively. The indicator material includes mixture of a SCC polymer and a wax material described herein above. The indicator material further includes an optically distinctive material such as a regular dye. The indicator material flows along the transport element 86 from the reservoir 84 to the three viewable windows in the order of the viewable windows 102, 104 and 106. The viewable window 106 is the end "NOT SAFE" point. The viewable windows 102, 104 and 106 change color when the indicator material fills these three viewable windows. When the indicator material flows to the last viewable window 106, the viewable window 106 change color indicating that the host product is perished or is not safe to be used. This ascending time-temperature exposure indicator apparatus can allow certain retailers or suppliers to attach the ascending time-temperature exposure indicator apparatus 100 to a host product to continuously monitor the freshness of the host product by checking the position of the color along the three viewable windows 102, 104 and 106.

The ascending time-temperature exposure indicator apparatus can respond continuously throughout any period or periods of exposure to temperatures at or above the predetermined threshold temperature, for example, with an ongoing displacement of an indicator material with respect to a transport element that is quantitatively related to cumulative time-temperature exposure and proceeds at different rates according to the prevailing temperature.

Predetermined threshold temperature. An ascending time-temperature exposure indicator apparatus according to the present disclosure can be configured to have an predetermined threshold temperature which is relevant to the temperature response characteristics of the host product, for example, by selection of a suitable indicator material. The predetermined threshold temperature can correspond with a threshold temperature at, or above, which the host product can deteriorate, or risks deterioration, or another suitable temperature.

Some examples of predetermined threshold temperatures for which a ascending time-temperature exposure indicator apparatus according to the present disclosure can be configured include an predetermined threshold temperature in a range of from about −20° C. to about 70° C. and, from about −10° C. to about 60° C., from about −10° C. to about 20° C., from about 0° C. to about 15° C., from about 5° C. to about 15° C., from about 8° C. to about 12° C., about 10° C., from about 10° C. to about 40° C., or from about 20° C. to about 30° C. Other predetermined threshold temperatures can be provided, if desired. For example, lower predetermined threshold temperatures, including sub-zero temperatures down to about −34° C. can be obtained using a suitable indicator material. One example of such an indicator material is a mixture of a wax material and a side-chain crystallizable polymer (SCC polymer) such as poly(dodecylmethacrylate).

Furthermore, the predetermined threshold temperature can be close to the stop temperature or can be somewhat above the stop temperature, if desired, depending upon the particular indicator material employed. For example, the predetermined threshold temperature can exceed the stop temperature by a temperature in a range of from about 0.1° C. to about 20° C.; in a range of from about 0.5° C. to about 10° C.; a range of from about 0.5° C. to about 5° C.; or a range of from about 1° C. to about 5° C.

Stop temperature. An ascending time-temperature exposure indicator apparatus according to the present disclosure can be configured to have a stop temperature which is relevant to the temperature response characteristics of the host product, for example, by selection of a suitable indicator material. The stop temperature can be a temperature below which the host product is unlikely to deteriorate during a period of possible usefulness of the ascending time-temperature exposure indicator apparatus or the host products, or another suitable temperature. The period of possible usefulness of the ascending time-temperature exposure indicator apparatus or the host product can be about one week, about one month, about one year, from about two years to about five years, or more, or another suitable period. Some examples of stop temperatures may include a stop temperature in a range of from about −10° C. to about 70° C.; from about −5° C. to about 40° C.; from about 0° C. to about 30° C.; from about 0° C. to about 15° C., from about 2° C. to about 10° C., from about 4° C. to about 9° C., or from about 6° C. to about 8° C.

Some host products can be stable at cool temperatures, such as when storing in a refrigerator having a temperature below about 8° C. or in a range of about 6° C. to about 8° C. Some host products can be stable at cool temperatures, for example, below a range of from about 0° C. to about 15° C., for extended periods, for example, for 20 days to 100 days or more. However, the host product can deteriorate rapidly at or above a predetermined threshold temperature, such as 0° C. or higher, 5° C. or higher, 10° C. or higher, or about 25° C. or higher, for example in a period of time from about 0.1 to about 72 hour or less, and can deteriorate even more rapidly at higher temperatures, of about 35° C. or higher, for example, in about 0.1 to about 4 hour or less. At intermediate temperatures between the stop temperature and the predetermined threshold temperature, the host product may deteriorate slowly, for example, in about 1 day to about 20 days, or more.

Using a suitable indicator material, an ascending time-temperature exposure indicator apparatus embodiment of the present disclosure can be designed to correlate with such host product temperature response characteristics by configuring the ascending time-temperature exposure indicator apparatus with a stop temperature in the range of from about −10° C. to about 70° C. and a predetermined threshold temperature of from about −10° C. to about 70° C. The predetermined threshold temperature is about 0.1 to 20° C. or about 0.5 to 10° C. higher than the stop temperature. For example, the ascending time-temperature exposure indicator apparatus can employ an indicator material having a melting onset temperature of about 1° C. to about 5° C. or about 2° C. to about 4° C.; a major peak melting temperature of about 8.0° C. to about 10° C., preferably about 8.0° C. to about 9.9° C., or about 8.1° C. to about 9.8° C.; and a viscosity, when liquid, that declines with increasing temperature. The stop temperature is about 0.1 to about 10° C., preferably 0.5 to 5° C. lower than the major melting peak temperature of the indicator material. The predetermined threshold temperature is 0.1 to 10° C., preferably 0.1 to 5° C. higher than the major melting peak temperature of the indicator material.

Below the stop temperature, the indicator material does not flow significantly. At intermediate temperatures above the stop temperature but below the predetermined threshold temperature, the indicator material can flow slowly and provide an end point after an appropriate number of days, for example, after about 1 day to about 20 days. At the predetermined threshold temperature, the indicator material can melt, and while the temperature remains at the predetermined threshold temperature, can flow predictably on or through the transport element, generating an end point signal in about 1 to about 10 hours, preferably in about 4 to 8 hours.

Transport element. The transport element can be porous and/or absorbent and the indicator material can be absorbable by the transport element, for example, by capillary attraction of the transport element material for the liquid indicator material. The indicator material, when in the liquid state, can contact the transport element. Desirably, the transport element has affinity for the indicator material. For example, some useful transport element materials can be wetted by the indicator material. Some examples of suitable materials that can be employed for the transport element, as sole or partial components of the transport element, include: Ahlstrom 601 and 631 paper (Ahlstrom Corp. at www.ahlstrom.com), Whatman grade 1 qualitative paper and chromatography paper 1 Chr, 2 Chr, and 3 Chr (Whatman Inc. of Clifton, N.J. and www.whatman.com). Other woven, non-woven, fibrous, non-fibrous reticulated, or non-reticulated, porous materials can be employed, if desired.

Alternatively the transport element can comprise or consist of a nonporous material. For example, the indicator material can be hydrophobic, so that the liquid indicator material can adhere to a surface of the transport element by hydrophobic-hydrophobic attraction and flow across the transport element surface toward a viewing location. Some examples of suitable hydrophobic transport element materials include hydrophobic polymers and copolymers of olefins, ethylene, propylene, vinyl chloride, carbonates, urethanes, acrylics, vinyls, vinyl chlorides, vinylidene chlorides, styrenes, amides, imides, esters, ethers, and fluorocarbons. If desired, the transport element can be hydrophilic, for example, for use with a hydrophilic indicator material.

The transport element can be configured with structures to guide and facilitate the indicator material flow, if desired, for example, matt surfacing, surface texturing or roughening, one or more surface grooves and/or capillary channels extending toward the viewing location or combinations of two or more of the foregoing structural features. Optionally, the transport element can be configured to provide multiple material flow paths. Multiple transport elements can be employed in a single ascending time-temperature exposure indicator apparatus, if desired.

Indicator Material. The indicator material may be a mixture of a synthetic polymeric material and a wax material and, optionally, an optically distinctive material such as a regular dye. The regular dye may have an intense color under normal lighting conditions, in comparison with the viewing background, such as transport element. The indicator material can consist solely of the mixture of the synthetic polymeric material and the wax material, or solely of the mixture of the synthetic polymeric material and the wax material and the optically distinctive material. The indicator material can include one or more other ingredients.

The optically distinctive material may be selected from the group consisting of colorants, dyes, pigments, fluorescent materials, optical phase modifying materials, liquid crystals, infrared-reflecting materials, ultraviolet-reflecting materials, infrared-absorbing materials, ultraviolet-absorbing materials, optically refractive materials, optically diffractive materials, holographic materials and mixtures thereof. The optically distinctive material can provide a contrasting appearance to that of the surrounding structure, optionally by providing an intense contrasting color under normal lighting conditions or when exposed to specific light wavelengths such as ultraviolet (UV) lights. For an indicator signal with good color intensity, the optically distinctive material such as a regular dye can be dissolved in the indicator material to saturation. The dye can have any suitable hue, for example, red or orange, or another hue, some of which are described elsewhere herein.

The indicator material has desired mechanical characteristics such as remaining solid at or below the stop temperature and melting or otherwise changing to a flowable phase of appropriate viscosity at or above the predetermined threshold temperature. The liquid indicator material viscosity can vary with temperature, decreasing with temperature increase, if desired. The optically distinctive material, if employed, can provide one or more useful optical characteristics which help the ascending time-temperature exposure indicator apparatus generate a distinct end point signal.

Indicator materials useful in the practice of the present disclosure, in which multiple ingredients are employed, can be formulated with any of a wide range of proportions of those ingredients. The indicator material can include a major proportion of the mixture of the polymeric material and the wax material, for example, a proportion of the mixture of at least about 60 wt. %, at least about 80 wt. %, at least about 90 wt. %, at least about 95 wt. %, at least about 98 wt. %, or at least about 99 wt. %, based on the weight of the indicator material.

Optionally, the indicator material can include from about 0.05 wt. % to about 50 wt. %, from about 0.05 wt. % to about 40 wt. %, from about 0.05 wt. % to about 10 wt. %, from about 1.0 wt. % to about 10 wt. %, or from about 10 wt. % to about 40 wt. % of the optically distinctive material, based on the weight of the indicator material. If desired, the proportion of the optically distinctive material can be from about 0.1 wt. % to about 5 wt. %, or from about 0.5 wt. % to about 2 wt. %, based on the weight of the indicator material.

Various materials can be employed as an indicator material. Optionally, the indicator material can be hydrophobic and have affinity for the transport element. For example, the indicator material and the transport element can both be hydrophobic. In this case, the indicator material, when liquid, can wet the transport element, if desired. The indicator material can form a suitable contact angle with the transport element, for example, a contact angle of less than 90°, less than 45°, or less than 30°. In some embodiments, the transport element and the indicator material can be hydrophilic or have some hydrophilic character.

The indicator material includes, a suitable synthetic polymeric material, if desired. The synthetic polymeric material can be solid when at or below the stop temperature and can be a viscous liquid when at or above the predetermined threshold temperature. The synthetic polymeric material can include one or more polymers, one or more copolymers or a mixture of one or more polymers with one or more copolymers. For example, the synthetic polymeric material can be or can include a side chain crystallizable (SCC) polymer.

Some side-chain crystallizable (SCC) polymers useful in the practice of the present disclosure, alone or in combination, and methods that can be employed for preparing them, are described in O'Leary et al. "Copolymers of poly(n-alkyl acrylates): synthesis, characterization, and monomer reactivity ratios" in *Polymer* 2004 45 pp 6575-6585 ("O'Leary et al." herein), and in Greenberg et al. "Side Chain Crystallization of n-Alkyl Polymethacrylates and Polyacrylates" *J. Am. Chem. Soc.,* 1954, 76 (24), pp 6280-6285 ("Greenberg et al." herein). The disclosure of each of O'Leary et al. and Greenberg et al. is incorporated by reference herein for all purposes.

Suitable side-chain crystallizable (SCC) polymers useful in the practice of the present disclosure are also described in U.S. Pat. No. 5,156,911 at column 5, lines 67 to column 7, line 13, which disclosure is incorporated by reference herein for all purposes. Some useful side-chain crystallizable polymers, and monomers for preparing side-chain crystallizable polymers, are also available from commercial suppliers, for example, Scientific Polymer Products, Inc., Ontario, N.Y., Sigma-Aldrich, Saint Louis, Mo., TCI America, Portland Oreg., Monomer-Polymer & Dajac Labs, Inc., Trevose, Pa., San Esters Corp., New York, N.Y., Sartomer USA, LLC, Exton Pa., and Polysciences, Inc.

EXAMPLES

Example 1

Experimental Details

Figure 8:
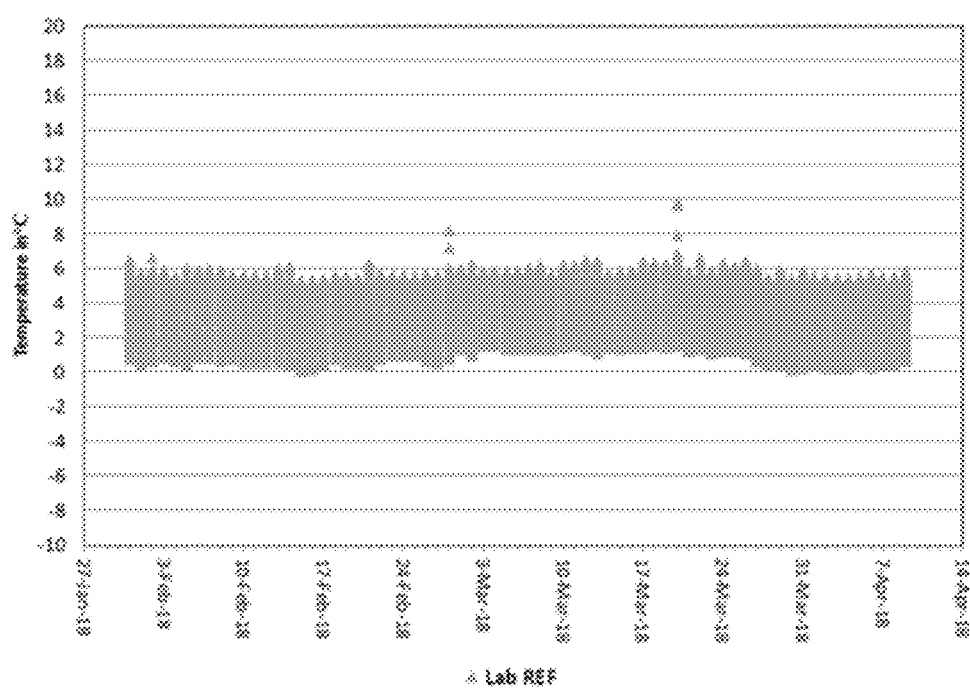
FIG. 8 shows a sample temperature profile for a medical grade refrigerator.

An initial experiment was performed to evaluate the refrigerator temperature cycles. FIG. 8 shows the temperature profile over time for a medical grade refrigerator. Typical and outlier variations are shown. Based on literature review these appear to be typical, with non-medical grade or poorly maintained refrigerators showing more variability.

Example 2

In this study, different indicator material compositions were evaluated to study the effects of the weight ratio of SCC polymer to alkane wax blend and the weight ratio of hexadecane to pentadecane on the response time when exposed to a predetermined threshold temperature using hand prototype indicator test samples.

Some host products are safe to be stored in typical refrigerators typically maintaining temperatures in a range of 0-6° C. However, these host products will frequently be exposed to a specific temperature of interest that is slightly higher than those of the typical refrigerators, such as a water bath at about 10° C. The host products will not lose their quality or freshness immediately when exposed to the specific temperature of interest, for example about 10° C. in this example. But the host products will lose its quality or freshness after a specific exposure time, such as about 4 to about 8 hours when exposed to about 10° C. in this example.

Therefore, an example time-temperature indicator needs to be configured to have: a predetermined threshold temperature at the same temperature as the specific temperature of interest, such as 10° C. in this example; a predetermined exposure time the same as the specific exposure time such as about 4-8 hours in this example; and a stop temperature the same as the upper limit of the refrigerator temperature such as about 6-8° C. in this example.

Such time-temperature indicator is able to provide the time-temperature exposure information that correlates with the deterioration characteristics of the host product to coordinate a change of indicator state appropriately with the likely condition of the host product. Specifically, the time-temperature indicator should be inactive at or below the refrigerator temperature. The indicator material of the time-temperature indicator is in a solid form and does not move or flow at or below the refrigerator temperature. The indicator material melts and moves along the transport element at the specific temperature of interest of about 10° C. The time-temperature indicator changes its indicator state at the specific exposure time when the host product loses its quality and freshness and should be discarded. The composition of the indicator material will be optimized in this study to ensure that the time-temperature response profile of the indicator correlates with the quality and freshness characteristics of the host product during the exposure to the specific temperature of interest of about 10° C. and further to indicate the end life of the host product.

Experimental Details

Different indicator material compositions were formulated and used to prepare hand prototype indicator test samples with a wick material as the transport element. The compositions and the test results are discussed in detail below. The manufactured indicators was stored in a refrigerator typically maintaining temperatures in a range of 0-6° C. A water bath was prepared to be at the temperature of about 10° C. The SCC polymer having a melting peak temperature of about 8.8° C. was used to prepare the indicator material compositions in this example.

Results and Observations

Observed Issues of Temperature Hysteresis:

An indicator material composition was prepared to have 50 wt. % of a SCC polymer and 50 wt. % of a blend of alkane wax based on the weight of the total composition. The blend of alkane wax included 40 wt. % of hexadecane (listed as Hexa or C16 in the figures or tables) and 60 wt. % of pentadecane (listed as Penta or C15 in the figures or tables) based on the weight of the total alkane wax blend. This indicator material composition was used to prepare 100 hand prototype indicator test samples. Fifty of the indicator test samples were taken from the refrigerator and directly put into a 10° C. water bath to test the time-temperature response profile when exposed to 10° C. The other fifty indicator test samples were first pre-exposed to a temperature of 40° C. for 20 seconds and then put into the 10° C. water bath to test whether the brief pre-exposure to 40° C. would change the time-temperature response profile when exposed to 10° C. The test results are shown in FIG. 9.

Figure 9:
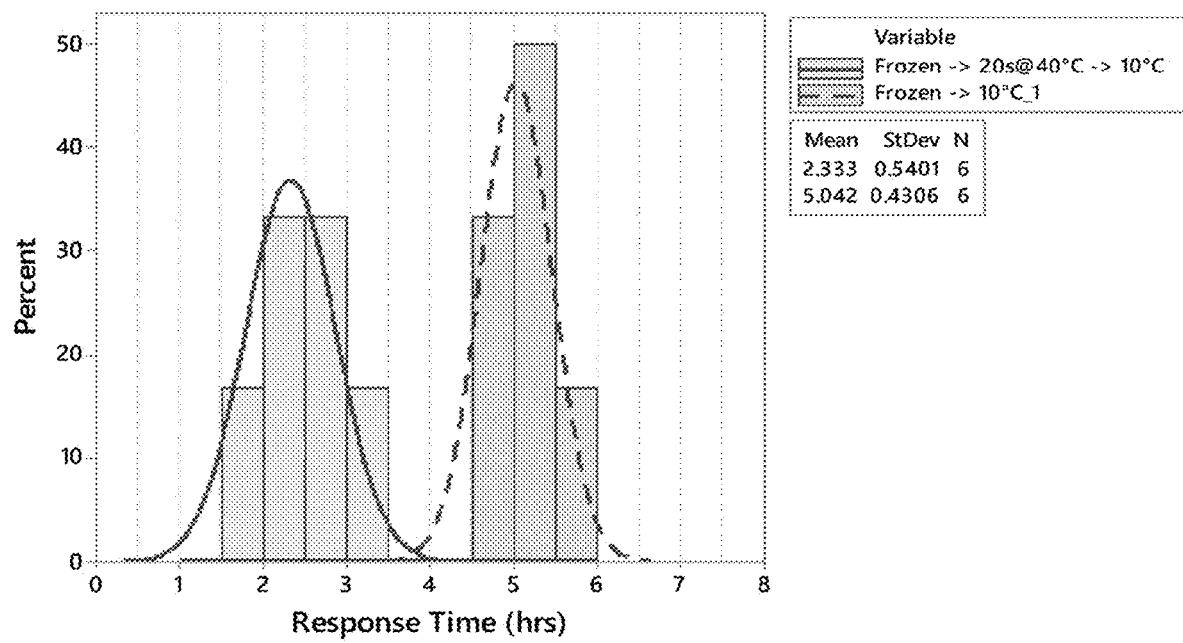
FIG. 9 shows the time-temperature response profiles of an ascending time-temperature indicators when exposed to 10° C. with and without a brief pre-exposure to 40° C. for 20 seconds.

The test results in FIG. 9 demonstrated that the indicator test samples prepared with this indicator material composition were sensitive to the pre-exposure to 40° C. for only a short time of 20 seconds and thus had suspected temperature hysteresis. The response time of the 50 test samples without pre-exposure was in the range of about 3-7 hours. However, with a brief pre-exposure to 40° C. for 20 seconds, the indicator material moves much earlier and much faster along the transport element; and reached the viewing window of the indicator test samples in much shorter time, as compared to the indicator test samples without the pre-exposure. The response time of the indicator test samples with the pre-exposure was reduced to about 0.5-4 hours. These results suggest that brief exposure to warm temperatures not only gives the exposed indicators a "head start", but also increases the rate at which the indicator material travels down the transport element.

Figure 10A:
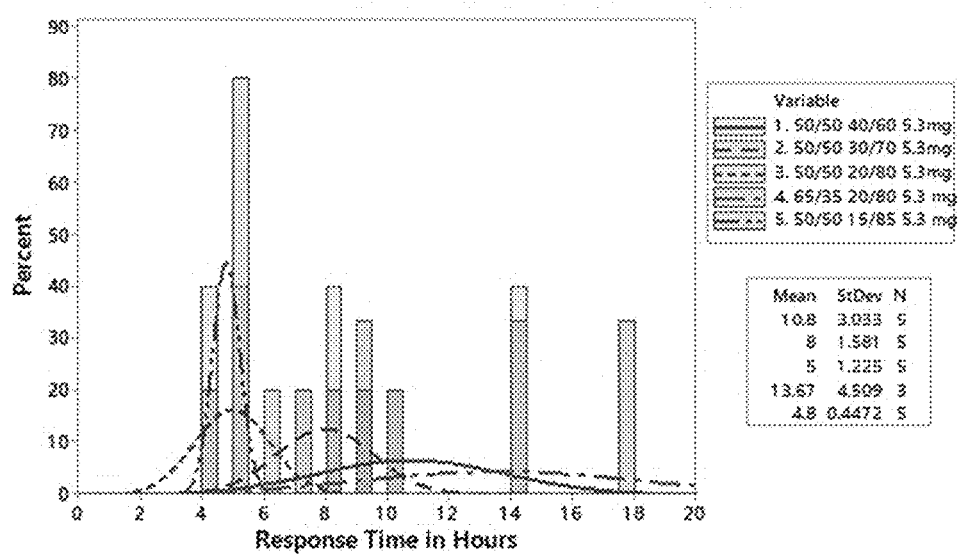
FIGS. 10A and 10B show the impact of the indicator material compositions on the time-temperature response profiles of the ascending time-temperature indicators when exposed to 10° C. with and without a brief pre-exposure to 25° C. for 1 minute respectively.
Figure 10B:
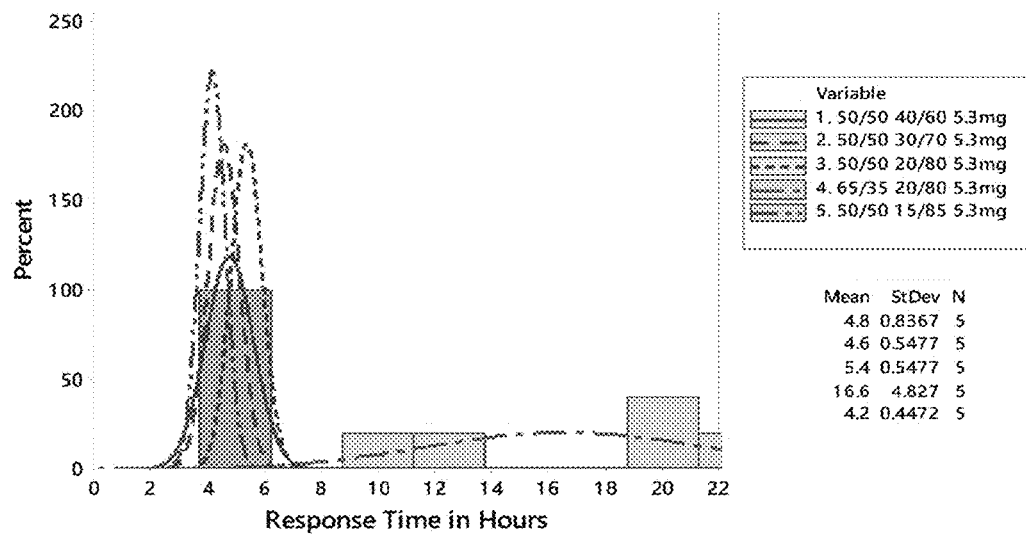

Impact of Alkane Wax Blend Ratio on Time-Temperature Response Profiles of Different Indicator Material Compositions:

Different indicator material compositions were analyzed to determine the impact of alkane wax blend ratios and whether temperature hysteresis was occurring in example indicators. Different prototype indicator test samples were prepared by hand with these different indicator material compositions respectively. The indicator test samples were tested for the time-temperature response profiles with or without a pre-exposure to 25° C. for 1 minute as shown in FIGS. 10A and 10B respectively. The different indicator material compositions are shown in Table 1 below. The test results are shown in Table 1 and FIGS. 10A and 10B.

TABLE 1

Performance summary of hand prototype indicator test samples made with different indicator material compositions.

| Composition | SCC Polymer/ Wax Blend Ratio | C16:C15 Ratio | Deposit Weight (mg) | Response time at 10° C., No pre-exposure | Response time at 10° C. Pre-exposure to 25° C. for 1 min | Sensitivity to Brief pre-exposure |
|---|---|---|---|---|---|---|
| 1 | 50/50 | 40/60 | 5.3 | Very broad distribution/ 2-18 hours | 2-7 hours | Sensitive/ Temperature hysteresis |
| 2 | 50/50 | 30/70 | 5.3 | Broad distribution/ 3-13 hours | 2-7 hours | Sensitive/ Temperature hysteresis |
| 3 | 50/50 | 20/80 | 5.3 | Broad distribution/ 1-9 hours | 4-7 hours | Sensitive/ Temperature hysteresis |

TABLE 1-continued

Performance summary of hand prototype indicator test samples made with different indicator material compositions.

| Composition | SCC Polymer/ Wax Blend Ratio | C16:C15 Ratio | Deposit Weight (mg) | Response time at 10° C., No pre-exposure | Response time at 10° C. Pre-exposure to 25° C. for 1 min | Sensitivity to Brief pre-exposure |
|---|---|---|---|---|---|---|
| 4 | 65/35 | 20/80 | 5.3 | Very Board distribution/ 3-20 hours | Very Board distribution/ 4-22 hours | Not sensitive |
| 5 | 50/50 | 15/85 | 5.3 | 3-7 hours | 2-6 hours | Sensitive/ Temperature hysteresis |

The test results in FIG. 10A demonstrated that indicator test samples with Compositions 1-4 had broad response time distribution. The indicator test samples made with Composition 5 had a narrow response time distribution, and the response time for the indicator material to move along the transport element to the viewing window of the indicator test samples was about 3-7 hours.

The test results in FIG. 10B demonstrated that the indicator test samples made with Composition 4 with the pre-exposure to 25° C. for 1 minute still had a very broad response time distribution. For the indicator test samples made with Compositions 1-3, the test results in FIG. 10B demonstrated that the pre-exposure of the indicator test samples to 25° C. for 1 minute significantly sped up the movement of the indicator material along the transport element and reached the viewing windows of the indicator test samples much faster than their corresponding indicator test samples without the pre-exposure (shown in FIG. 10A). This indicated that the indicator test samples made with Compositions 1-3 were sensitive to brief pre-exposure to warm temperatures and showed temperature hysteresis. For the indicator test samples made with Composition 5, brief pre-exposure to 25° C. for 1 minute also reduced the response time from about 3-7 hours to about 2-6 hours and thus also showed temperature hysteresis.

As summarized in Table 1, Applicants found that Composition 5 with the hexadecane:pentadecane ratio of 15/85 demonstrated overall the best performance among the five tested compositions, and thus the ratio of hexadecane to pentadecane at 15:85 was found to be preferable.

Example 3

Experimental Details

Figure 11:
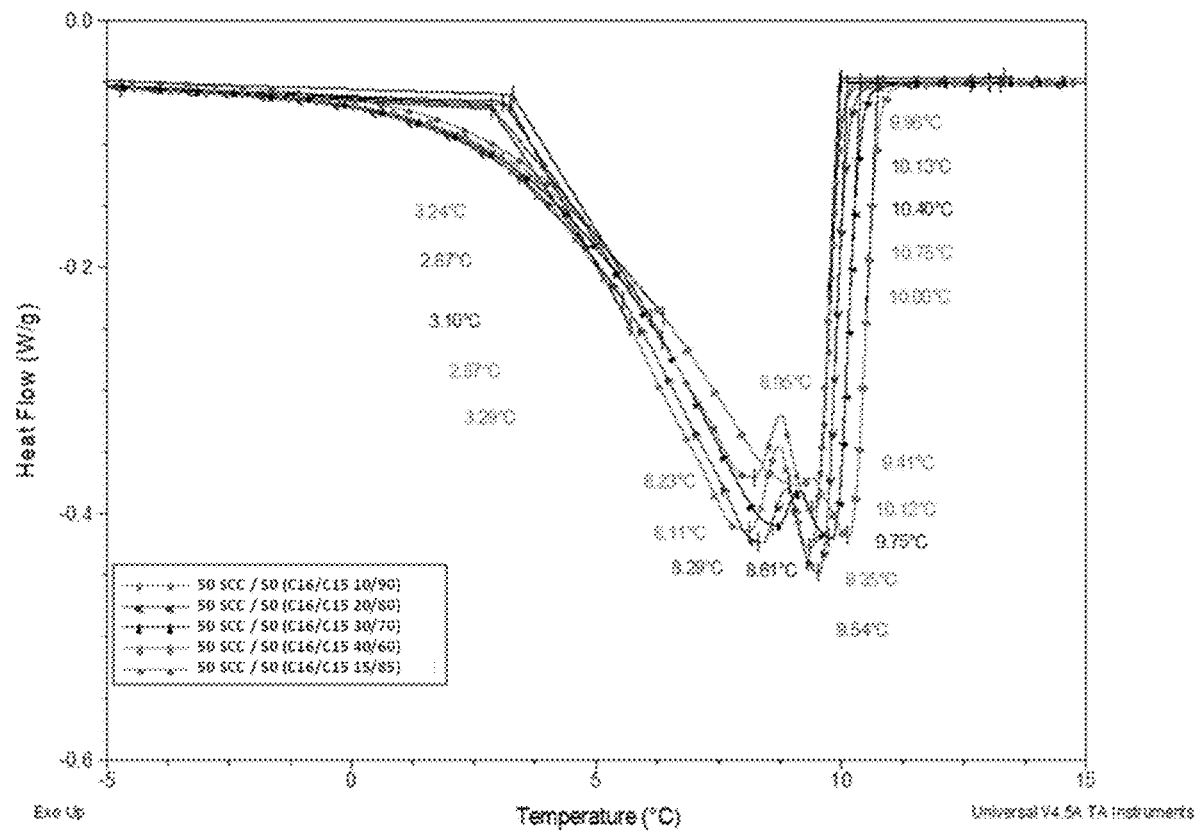
FIG. 11 shows the Differential Scanning Calorimetry (DSC) curves of the different indicator material compositions.

Impact of Alkane Wax Blend Ratio on the Melting Temperature of the Indicator Material Compositions:

A further study was performed to study the impact of the alkane wax blend ratio on the melting temperature of the indicator material compositions using differential scanning calorimetry (DSC). In this study, different indicator material compositions were prepared to have a SCC polymer and a blend of hexadecane and pentadecane. The ratio of SCC polymer to alkane wax blend of the indicator material compositions was fixed at 50:50. The hexadecane:pentadecane ratios for different compositions were set as 1:9, 2:8, 3:7, 4:6 and 15:85 respectively. The SCC polymer having a melting peak temperature of about 8.8° C. was used to prepare the indicator material compositions in this example. The DSC curves for the 5 indicator material compositions are shown in FIG. 11. The experimental results are summarized in Table 2 below.

Results and Observations

TABLE 2

Melting temperature of indicator material compositions with different hexadecane:pentadecane ratios.

| Composition | SCC Polymer Wax Blend Ratio | C16:C15 Ratio | Onset1 (° C.) | Peak 1 (° C.) | Onset 2 (° C.) | Peak 2 (° C.) | End Onset (° C.) |
|---|---|---|---|---|---|---|---|
| 1 | 50/50 | 1:9 | 3.24 | 8.11 | N/A | 9.35 | 9.96 |
| 5 | 50/50 | 15/85 | 3.29 | 8.23 | N/A | 9.41 | 10.00 |
| 2 | 50/50 | 2:8 | 2.87 | 8.29 | N/A | 9.54 | 10.13 |
| 3 | 50/50 | 3:7 | 3.10 | 8.61 | N/A | 9.75 | 10.40 |
| 4 | 50/50 | 4:6 | 2.87 | 8.95 | N/A | 10.12 | 10.75 |

The experimental results in FIG. 11 and Table 2 demonstrated that the higher the hexadecane:pentadecane ratios, the higher the melting peak temperatures and the melting end onset temperatures.

Example 4

Experimental Details

Figure 12A:
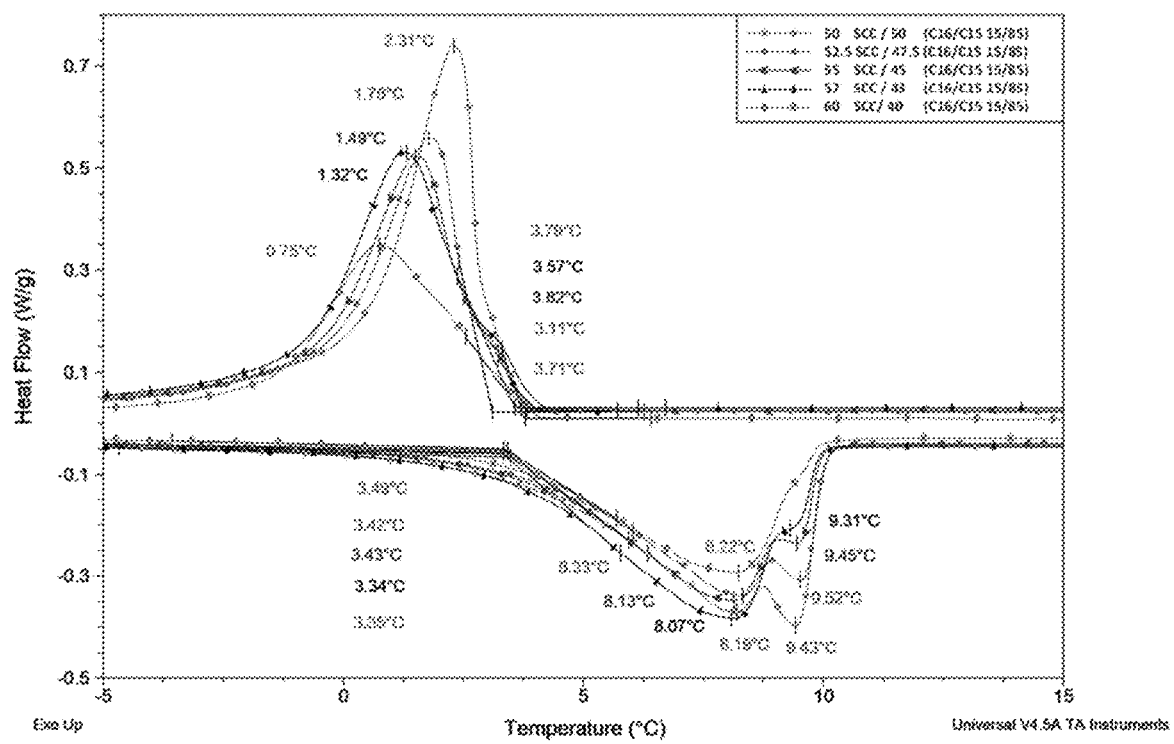
FIGS. 12A and 12B show the DSC curves of the different indicator material compositions with both the heating and the cooling cycles; and the viscosity of the different indicator material compositions.

Impact of Percentage of SCC Polymer on Melting Temperature of the Indicator Material Compositions:

A further study was performed to study the impact of the percentage of SCC polymer on the melting temperature of the indicator material compositions using differential scanning calorimetry (DSC). In this study, different indicator material compositions were prepared to have a SCC polymer and a blend of hexadecane and pentadecane. The ratio of SCC polymer to alkane wax blend of the indicator material compositions was set at 50:50, 52:48, 55:45, 57:43 and 50:40 respectively. The hexadecane:pentadecane weight ratio for different compositions was fixed at 15:85. The SCC polymer having a melting peak temperature of about 8.8° C. was used to prepare the indicator material compositions in this example. The DSC curves for the 5 indicator material compositions are shown in FIG. 12A. The experimental results are summarized in Table 3 below.

Results and Observations

TABLE 3

Melting temperature of indicator material compositions with different percentage of SCC polymer in both the heating and cooling cycle

| Composition | SCC Polymer/Wax Blend Ratio | C16:C15 Ratio | Onset1 (° C.) | $T_m$ Peak1 (° C.) | $T_m$ Peak2 (° C.) | $T_c$ Onset (° C.) Cooling cycle | $T_c$ Peak (° C.) Cooling Cycle |
|---|---|---|---|---|---|---|---|
| 1 | 50/50 | 15/85 | 3.49 | 8.19 | 9.43 | 3.71 | 2.31 |
| 2 | 52/48 | 15/85 | 3.42 | 8.33 | 9.52 | 3.11 | 1.78 |
| 3 | 55/45 | 15/85 | 3.43 | 813 | 9.45 | 3.82 | 1.49 |
| 4 | 57/43 | 15/85 | 3.34 | 8.07 | 9.31 | 3.57 | 1.32 |
| 5 | 60/40 | 15/85 | 3.35 | 8.22 | N/A | 3.79 | 0.75 |

The experimental results in FIG. 12A and Table 3 demonstrated that, at the same hexadecane:pentadecane ratio, the indicator material compositions with different percentages of SCC polymer showed similar melting temperatures during the heating cycle of the DSC tests. During the cooling cycle, all the indicator material compositions demonstrated a crystallization peak which corresponded to the crystallization temperature ($T_c$) of the side chain of the SCC polymer. The test results further showed that the higher the percentage of the SCC polymer, the lower the crystallization peak temperature ($T_c$).

Figure 12B:
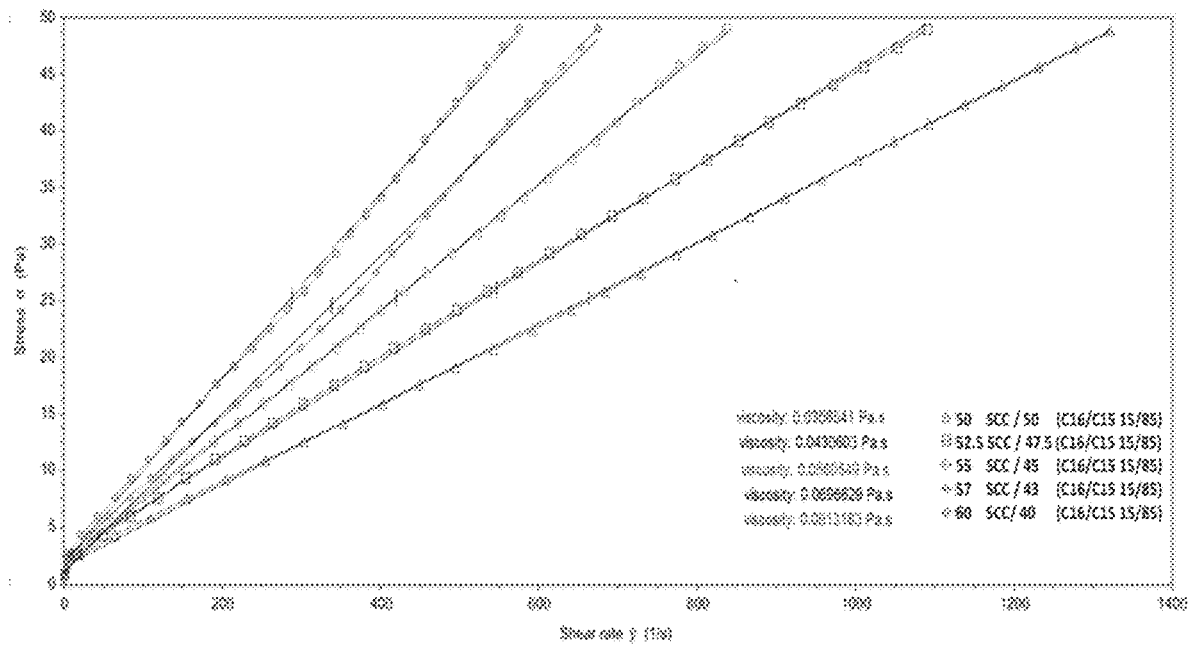

The viscosity of the different indicator material compositions was also tested. The test results were shown in FIG. 12B. The viscosity increases with the increase of the percentage of the SCC polymer.

Example 5

Impact of SCC Polymer on the Response Time

Experimental Details

A further study was performed to evaluate the impact of the type of the SCC polymer used to prepare the indicator material on the response time when exposed to 10° C. In this example, two sets of the hand dispensed prototype indicator test samples were prepared with a single SCC polymer and a blend of three SCC polymers respectively. The response times for the indicator material to reach the viewing window and change the indicator state were measured. The response time profiles of both sets of indicator test samples were shown in FIG. 13.

Results and Observations

Figure 13:
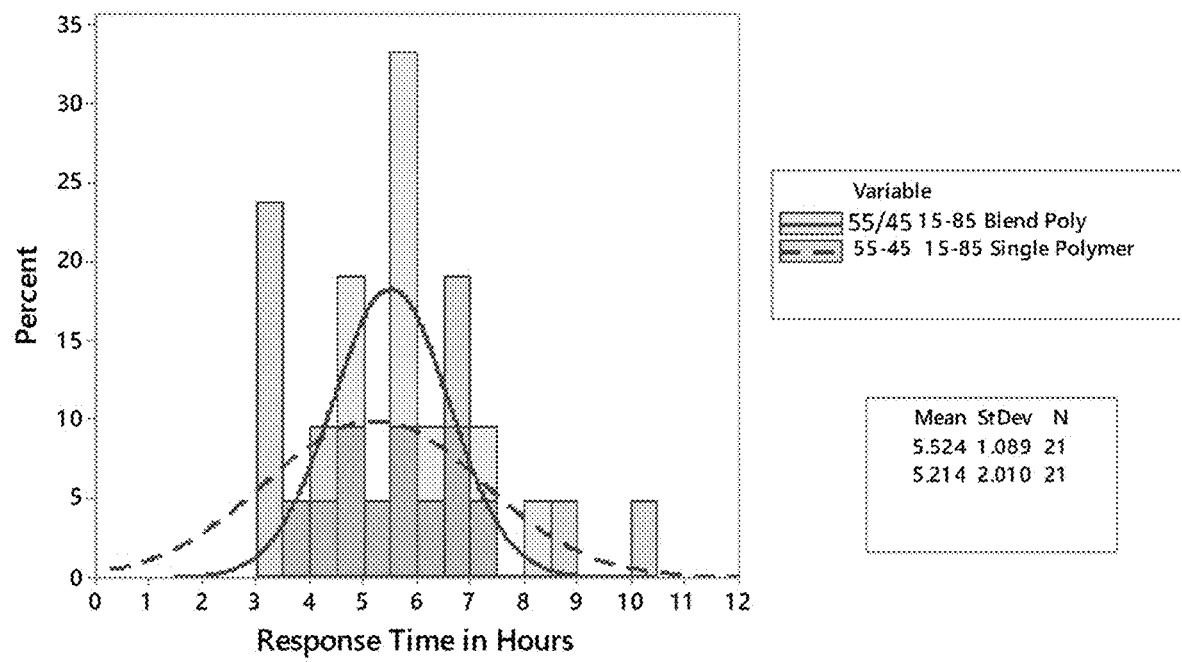
FIG. 13 shows the impact of the type of SCC polymers used to prepare the indicator test samples on the time-temperature response profiles of the indicator test samples when exposed to 10° C.

The experimental results in FIG. 13 demonstrated that the type of the SCC polymer significantly affected the response time distribution profile of the indicator test samples, although average response was approximately the same. When a single SCC polymer was used to make the indicator material, the response time distribution was much broader and ranged from 0.5 to 12 hours. However, when a blend of three SCC polymers was used to prepare the indicator material, the response time distribution was narrower and ranged from 2 to 9 hours which much closer the targeted response time requirement of 4 to 8 hours.

Example 6

Impact of Deposit Amount of Indicator Material Compositions on Response Time of Hand Prototype Indicator Test Samples:

Experimental Details

A further study was performed to evaluate the impact of the deposit amount of the indicator material on the response time of hand prototype indicator test samples when exposed to 10° C. In this example, the indicator material was deposited on the transport element for each time-temperature indicator test samples. The SCC polymer having a melting peak temperature of about 8.8° C. was used to prepare the indicator material compositions in this example. The indicator material compositions used in this example were summarized in Table 4 below. The test results were shown in FIGS. 14 and 15 and also in Table 4.

TABLE 4

Impact of deposit amount of the indicator material compositions on the response time

| Composition | SCC Polymer/Wax Blend Ratio | C16:C15 Ratio | Deposit Weight (mg) | Response Time (hours) |
|---|---|---|---|---|
| 1 | 55/45 | 15/85 | 5.5 | 2-9 |
| 2 | 55/45 | 15/85 | 6.0 | 2-10 |
| 3 | 55/45 | 20/80 | 5.5 | 5-15 |
| 4 | 55/45 | 20/80 | 6.0 | 2-14 |
| 5 | 58/42 | 15/85 | 6.0 | 3-12 |
| 6 | 58/42 | 15/85 | 6.5 | 1-7 |

Results and Observations

Figure 14:
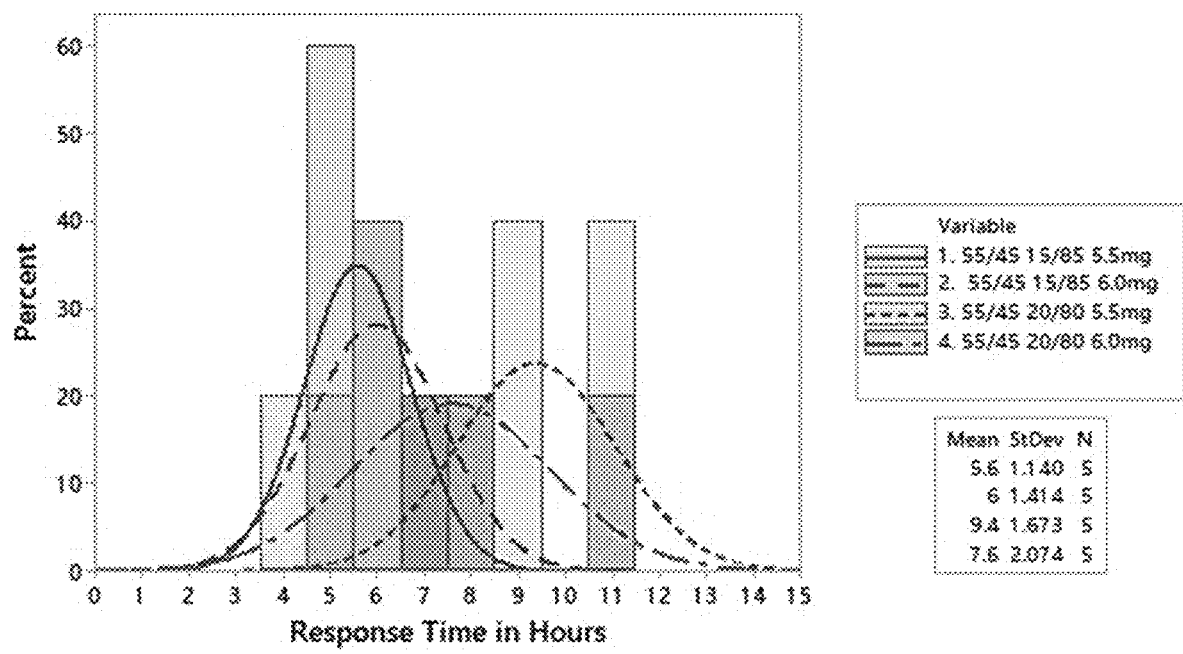
FIG. 14 shows the impact of the deposit weight of the indicator material on the time-temperature response profiles of the indicator test samples when exposed to 10° C.

As shown in FIG. 14, for the indicator material composition having a weight ratio SCC polymer to the alkane wax blend of 55/45 and the hexadecane:pentadecane weight ratio of 15/85, the increase of deposit amount from 5.5 mg to 6.0 mg slightly slowed the response time for the indicator material to move along the transport element and reach the viewing window of the indicator test samples, which changed from 2-9 hours to 2-10 hours. For the indicator material composition having a weight ratio SCC polymer to the alkane wax blend of 55/45 and the hexadecane:pentadecane wright ratio of 20/80, the increase of deposit amount from 5.5 mg to 6.0 mg instead sped up the response time from 5-15 hours to 2-14 hours. Applicants believe that hand prototypes will generally have more variation in response than machine manufactured ones such as press trial samples, but that this still provides general indication of performance.

Figure 15:
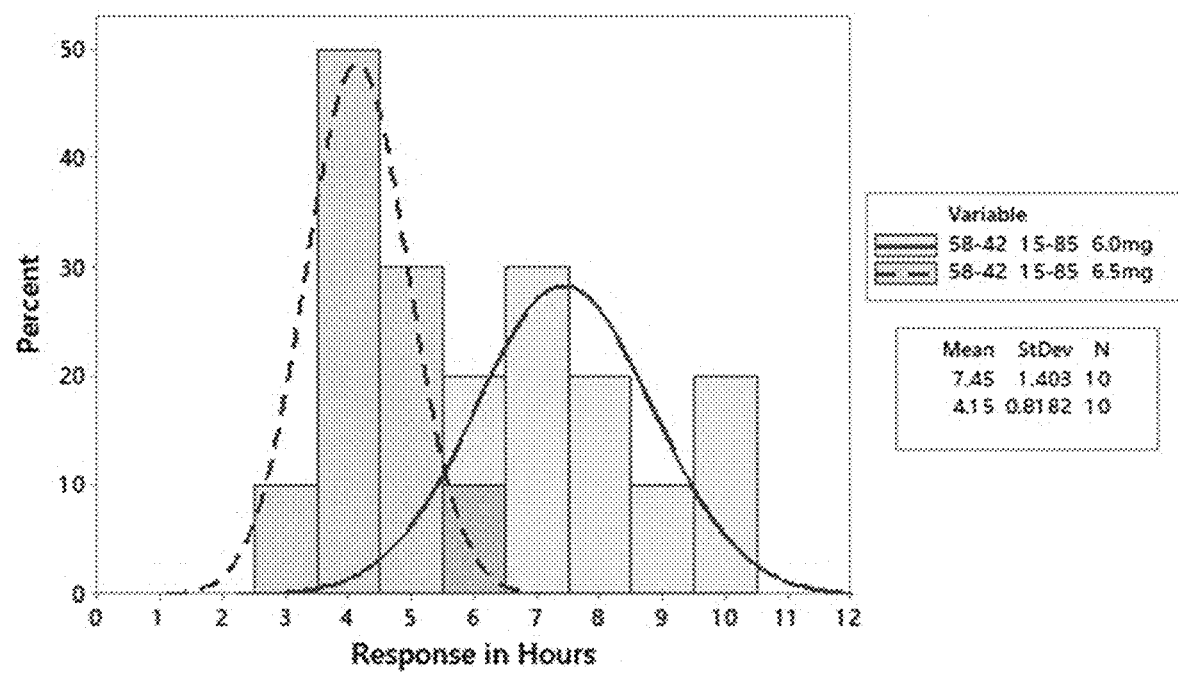
FIG. 15 shows the impact of the deposit weight of the indicator material on the time-temperature response profiles of the indicator test samples when exposed to 10° C.

As shown in FIG. 15, for the indicator material composition having a weight ratio SCC polymer to the alkane wax blend of 58/42 and the hexadecane:pentadecane ratio of 15/85, the increase of deposit amount from 6.0 mg to 6.5 mg significantly sped up the response time from 3-12 hours to 1-7 hours.

The experimental results in FIGS. 14 and 15 demonstrated that the increase of deposit amount of the indicator material sped up the movement of the indicator material along the transport element to reach the viewing window of the indicator test samples and thus the response time decreased with the increase of the deposit amount of the indicator material. While the exact results may vary, depending on the particular example, having more indicator material may slow response via one mechanism, namely the need to receive more heat to achieve melting. This may, for example, help control sensitivity to brief temperature exposures at elevated temperatures. At the same time, having more material speeds response, in that a larger volume of material moves the visible indicator more quickly along a transport element, such as a wick, thereby producing faster response to exposure at the threshold temperature.

Figure 16:
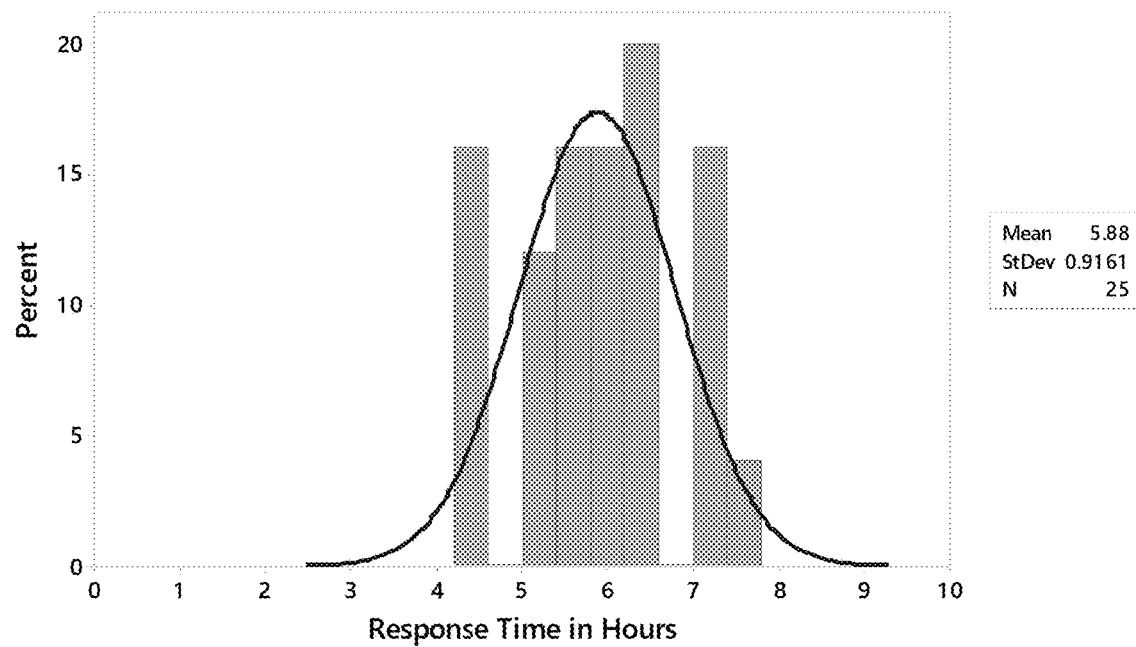
FIG. 16 shows an example of a hand prototype indicator test sample of the present disclosure having response time ranging from 3 to 9 hours.

FIG. 16 showed another example of the response time distribution profile for 25 hand dispensed prototype test indicator samples. The indicator material composition was made with 55 wt. % of a blend of three SCC polymers and 45 wt. % of alkane wax blend. The alkane wax blend was a blend of 15 wt. % of hexadecane and 85 wt. % of pentadecane. The deposit weight of the indicator material composition is about 5 to 5.5 mg.

Impact of Deposit Amount of Indicator Material Compositions on Response Time of Press Trial Indicator Test Samples:

A further study was performed to evaluate the impact of the deposit amount of the indicator material on the response time of press trial indicator test samples when exposed to 10° C. The formulation of the indicator material of the present disclosure allows for an acceptable amount of indicator material composition to be used during production of the indicator such that the indicator system is not starved of indicator material composition. As a result of being able to achieve the desired performance with a non-starved indicator material composition, the indicator response, such as a change of indicator state through a color change, is a clearly visible, vibrant and consistent in appearance.

In this example, three different SCC polymer Lots A, B and C were used to prepare indicator material compositions respectively. The weight ratio of the hexadecane to the pentadecane was fixed at 15/85 for all the indicator material compositions in this example. The melting temperatures of the indicator material compositions made from the three different SCC polymer Lots A, B and C were characterized using DSC, and the test results are shown in Table 5. As shown in Table 5, the indicator material made from SCC polymer Lot A had slightly lower melting temperature, followed by the indicator material made from the SCC polymer Lot B and then Lot C. The difference in the melting temperatures of the indicator materials made from the SCC polymer Lots A, B and C respectively might have just been experimental variations.

The indicator material compositions are shown in Tables 6 and 7.

Figure 17:
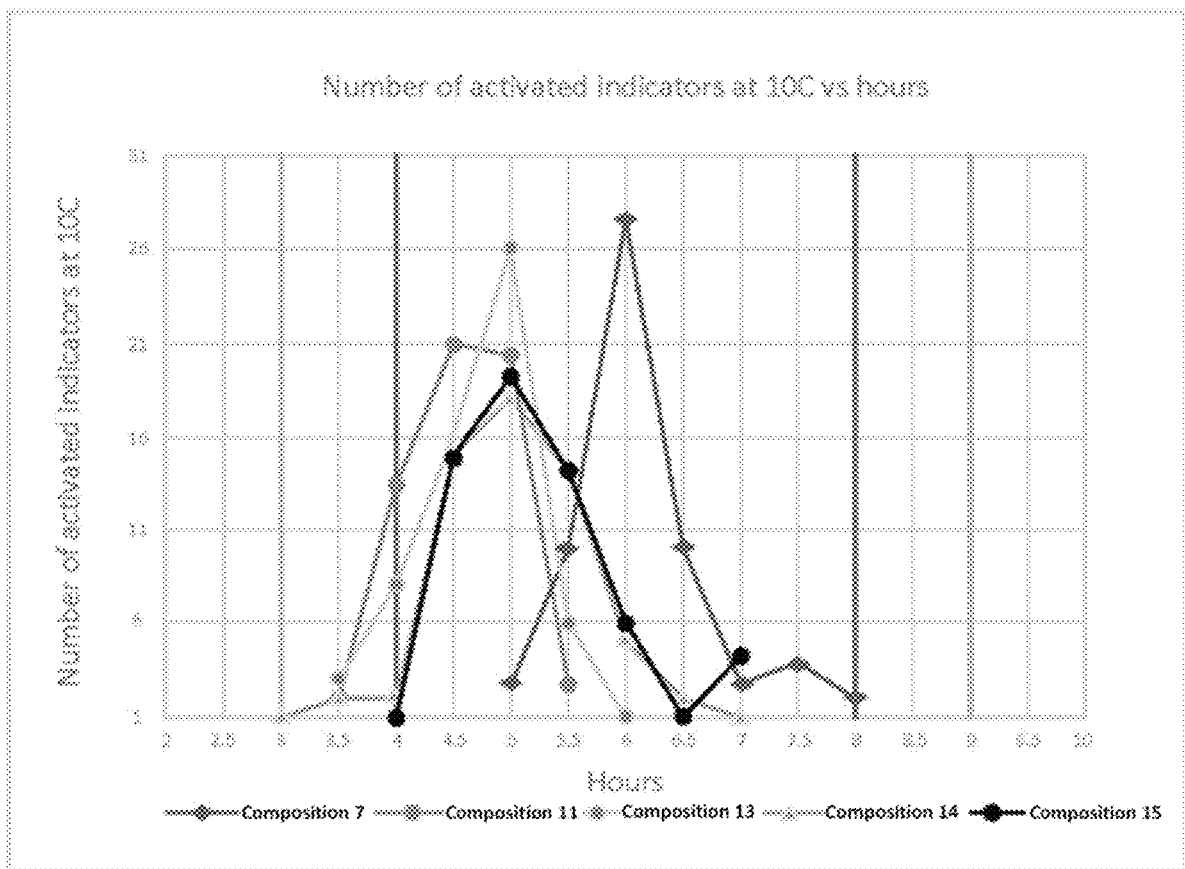
FIG. 17 shows the impact of deposit weight of the indicator material on the time-temperature response profiles of the indicator test samples when exposed to 10° C.

Different amounts of the indicator material compositions were then deposited on the transport element to prepare the press trial indicator test samples. Sixteen sets of press trail indicator test samples were prepared, and each set had five press trial indicator test samples as shown. The indicator material compositions and the deposit amounts of the 16 sets of indicator test samples are shown in Table 7 below. The indicator test samples were stored in the refrigerator for different days and then put into a 10° C. water bath to test the response time for the indicator test samples to change indicator state. The test results were shown in Tables 7, 8 and 9 below and in FIG. 17.

Results and Observations

TABLE 5

The melting temperatures of three indicator material compositions made with three different SCC polymer Lots A, B and C respectively.

10 grams lab samples

| 55% SCC Lot/45% C16/C15 (15/85) | Onset 1 | Peak 1 | Onset 2 | Peak 2 | End onset |
|---|---|---|---|---|---|
| Control | 3.27 | 8.13 | N/A | 9.50 | 9.95 |
| Lot A | 3.78 | 8.00 | N/A | 9.45 | 9.96 |
| Lot B | 3.64 | 8.07 | N/A | 9.47 | 9.98 |
| Lot C | 3.49 | 8.17 | N/A | 9.46 | 10.01 |

TABLE 6

The indicator material compositions.

| Press Trial/Indicator Material Composition | SCC Lot | % SCC | % C16/C15 (15/85) | Deposit Weight (mg) |
|---|---|---|---|---|
| 7 | Lot A | 55 | 45 | 5 |
| 11 | Lot B | 55 | 45 | 5 |
| 13 | Lot C | 55 | 45 | 5 |
| 14 | Lot A | 58 | 42 | 5.76 |
| 15 | Lot A | 58 | 42 | 6.2 |

TABLE 7

The impact of the deposit amount of the indicator material on the time-temperature response profile of the press trial indicator test samples after 12 days storage in a typical refrigerator.

Test: 12 days in freezer

| Press Trial Lot/ Composition | SCC Lot | % SCC | % C16/C15 (15/85) | Deposit weight (mg) | Number of indicators activated per hour at 10° C. (Total 5 indicators) | | | | | | | | | | | | | | | | | | | |
|---|---|---|---|---|---|---|---|---|---|---|---|---|---|---|---|---|---|---|---|---|---|---|---|---|
| | | | | | Initial | 1 | 1.5 | 2 | 2.5 | 3 | 3.5 | 4 | 4.5 | 5 | 5.5 | 6 | 6.5 | 7 | 7.5 | 8 | 8.5 | 9 | 9.5 | 10 | 11 | 11 |
| 1 | Lot A | 55 | 45 | 6.65 | 0 | 0 | 0 | 5 | | | | | | | | | | | | | | | | | | |
| 2 | Lot A | 55 | 45 | 6.2 | 0 | 0 | 2 | 5 | | | | | | | | | | | | | | | | | | |
| 3 | Lot A | 55 | 45 | 5.43 | 0 | 0 | 2 | 2 | 5 | | | | | | | | | | | | | | | | | |
| 3a | Lot A | 55 | 45 | 5.43 | 0 | 0 | 0 | 0 | 4 | 5 | | | | | same as lot 3 except moved further from the window | | | | | | | | | | |
| 4 | Lot A | 55 | 45 | 5.4 | 0 | 0 | 0 | 0 | 1 | 2 | 4 | 5 | | | | | | | | | | | | | | |
| 5 | Lot A | 55 | 45 | 5.47 | 0 | 0 | 0 | 0 | 0 | 0 | 3 | 5 | | | | | | | | | | | | | | |
| 6 | Lot A | 55 | 45 | 5.41 | 0 | 0 | 0 | 0 | 0 | 0 | 3 | 5 | | | | | | | | | | | | | | |
| 7 | Lot A | 55 | 45 | 5 | 0 | 0 | 0 | 0 | 0 | 0 | 0 | 0 | 0 | 0 | 2 | 4 | 5 | | | | | | | | | |
| 8 | Lot A | 55 | 45 | 4.56 | 0 | 0 | 0 | 0 | 0 | 0 | 0 | 0 | 0 | 0 | 1 | 1 | 1 | 2 | 4 | 4 | 5 | | | | | |
| 9 | Lot A | 55 | 45 | 4 | 0 | 0 | 0 | 0 | 0 | 0 | 0 | 0 | 0 | 0 | 0 | 0 | 0 | 0 | 0 | 0 | 1 | 3 | 4 | 5 | | |
| 10 | Lot B | 55 | 45 | 5.5 | 0 | 0 | 0 | 0 | 0 | 0 | 2 | 4 | 4 | 5 | | | | | | | | | | | | |
| 11 | Lot B | 55 | 45 | 5 | 0 | 0 | 0 | 0 | 0 | 0 | 0 | 2 | 3 | 5 | | | | | | | | | | | | |
| 12 | Lot C | 55 | 45 | 5.5 | 0 | 0 | 0 | 0 | 0 | 2 | 4 | 4 | 5 | | | | | | | | | | | | | | |
| 13 | Lot C | 55 | 45 | 5 | 0 | 0 | 0 | 0 | 0 | 0 | 1 | 3 | 3 | 5 | | | | | | | | | | | | |
| 14 | Lot A | 58 | 42 | 5.76 | 0 | 0 | 0 | 0 | 0 | 0 | 0 | 0 | 2 | 3 | 4 | 4 | 5 | | | | | | | | | |
| 15 | Lot A | 58 | 42 | 6.2 | 0 | 0 | 0 | 0 | 0 | 0 | 0 | 0 | 2 | 3 | 4 | 5 | | | | | | | | | | |
| 16 | Lot A | 58 | 42 | 6.86 | 0 | 0 | 0 | | | 0 | 2 | 2 | 4 | 5 | | | | | | | | | | | | |

The impact of the SCC polymer lots on the time-temperature response profile of the press trial indicator test samples after 13 days storage in a typical refrigerator.

Test: 13 days in freezer

| Press Trial Lot Composition | SCC Lot | % SCC | % C16/C15 (15/85) | Deposit weight (mg) | Number of indicators per hour at 10° C. (Total 60 indicators) | | | | | | | | | | | | | | | |
|---|---|---|---|---|---|---|---|---|---|---|---|---|---|---|---|---|---|---|---|---|
| | | | | | Initial | 1 | 1.5 | 2 | 2.5 | 3 | 3.5 | 4 | 4.5 | 5 | 5.5 | 6 | 6.5 | 7 | 7.5 | 8 |
| 7 | Lot A | 55 | 45 | 5 | 0 | 0 | 0 | 0 | 0 | 0 | 0 | 0 | 3 | 13 | 41 | 51 | 54 | 58 | 60 | |
| 11 | Lot B | 55 | 45 | 5 | 0 | 0 | 0 | 0 | 0 | 0 | 2 | 16 | 37 | 57 | 60 | | | | | |
| 13 | Lot C | 55 | 45 | 5 | 0 | 0 | 0 | 0 | 0 | 0 | 3 | 11 | 27 | 53 | 59 | 60 | | | | |

TABLE 9

The impact of the deposit amount of the indicator material on the time-temperature response profile of the press trial indicator test samples after 14 days storage in a typical refrigerator.

Test: 14 days in freezer

| Press Trial Lot Composition | SCC Lot | % SCC | % C16/C15 (15/85) | Deposit weight (mg) | Number of indicators activated per hour at 10° C. (Total 60 indicators) | | | | | | | | | | | | | |
|---|---|---|---|---|---|---|---|---|---|---|---|---|---|---|---|---|---|---|
| | | | | | Initial | 1 | 1.5 | 2 | 2.5 | 3 | 3.5 | 4 | 4.5 | 5 | 5.5 | 6 | 6.5 | 7 |
| 14 | Lot A | 58 | 42 | 5.76 | 0 | 0 | 0 | 0 | 0 | 1 | 3 | 5 | 20 | 38 | 52 | 57 | 59 | 60 |
| 15 | Lot A | 58 | 42 | 6.2 | 0 | 0 | 0 | 0 | 0 | 0 | 0 | 1 | 16 | 35 | 49 | 55 | 56 | 60 |

The experimental results in Table 7 demonstrated that for the same indicator material composition, the higher deposit amount of the indicator material led to earlier and faster movement of the indicator material along the transport element and thus the response time for the indicator test samples to change indicator state was shorter. For the set of indicator test samples made from the indicator material Composition 7, 11 and 13 (the weight ratio of SCC polymer to the wax blend of 55/45 and the hexadecane:pentadecane weight ratio of 15/85) with different SCC polymer lots, the deposit amount of 5.0 mg provided the best performance. The response time for the set of five indicator test samples made from Composition 7 with 5.0 mg deposit amount was about 6 to 7 hours which fell within the predetermined exposure time requirement of 4-8 hours. Further, for the two sets of indicator test samples made from the indicator material Compositions 11 and 13 having different SCC polymer lots, the response times for these two sets of indicator test samples to change indicator state were 4.5-5.5 hours and 4-5.5 hours respectively, both of which fell within the predetermined exposure time requirement of 4-8 hours.

Based on the test results shown in Table 7, Compositions 7, 11 and 13 were used to make another three sets of indicator test samples, each of which had 60 indicator test samples. These three sets of indicator test samples were stored in the typical refrigerator for 13 days and then put into a 10° C. water bath to measure the response times for the indicator test samples to change indicator state. The experimental results are shown in Table 8. As shown in Table 8, the SCC polymer lot had some slight impact on the response time; and the storage time in the refrigerator also changed the response time slightly. The indicator test samples made from Composition 7 still fell within the predetermined exposure time requirement of 4-8 hours after 14 days storage in the typical refrigerator. The impact of the SCC polymer lots on the response time for the test indicator to change indicator state may have just been experimental variation.

As shown in Table 5 and discussed above, the indicator test samples made from Compositions 14, 15 and 16 (weight ratio of SCC polymer to the wax blend at 58/42), both of the deposit amounts of 5.76 and 6.2 mg led to the response time fell within the predetermined exposure time requirement of 4-8 hours after 12 days storage in the refrigerator. As shown in Table 7, two more days of storage in the refrigerator changed the response time of the indicator test samples to be slightly shorter, although this may have just been experimental variation, and the results are still in the desired range.

In summary, the deposit amount of the indicator material significantly impacted the response time of the indicator test samples, and the higher the deposit amount, the shorter the response time for the indicator test samples to change indicator state at the temperature threshold. The different SCC polymer lots also impacted the response time of the indicator test samples.

Figure 18:
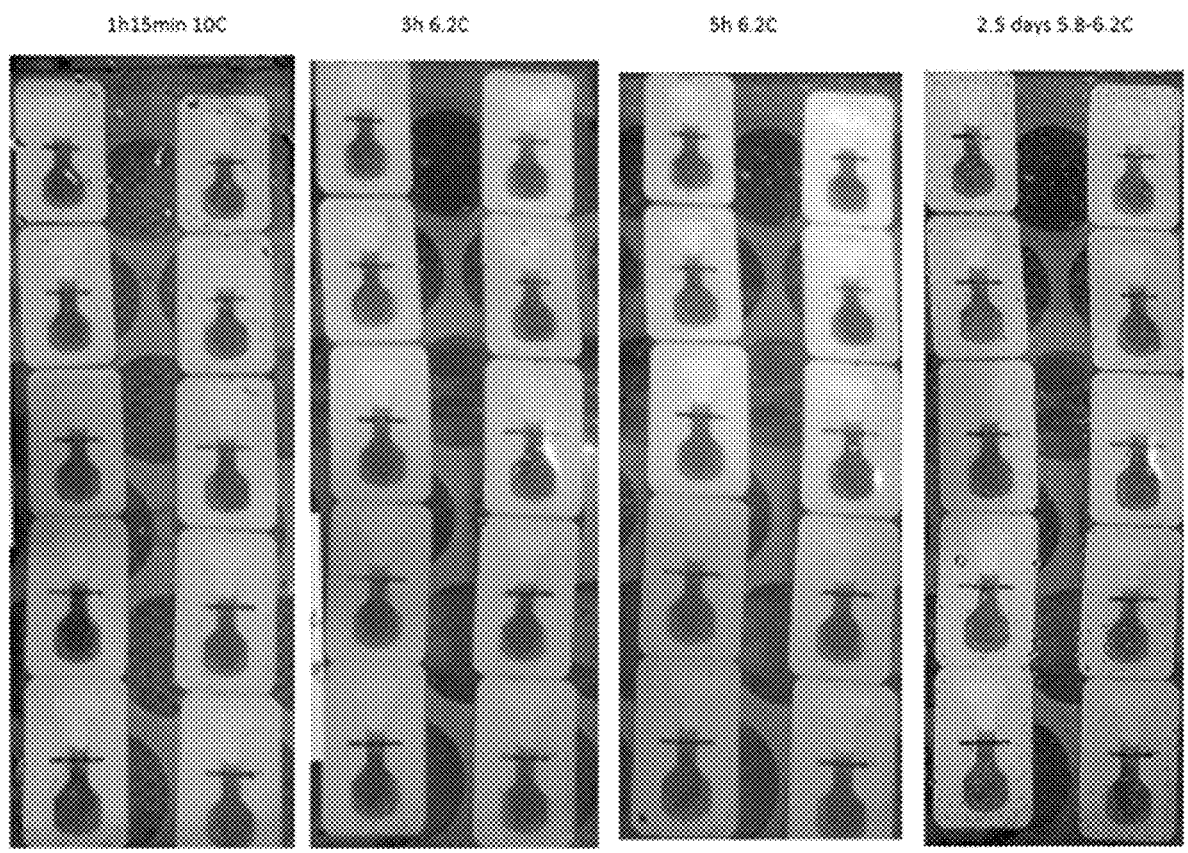
FIG. 18 shows the images of the moving positions of the indicator material as a function of time along the transport element of the indicator test samples to test the temperature cycle properties of the different indicator material compositions after exposure to 10° C. for 1.25 hours and then being transferred to 5.8-6.2° C. and held.
Figure 19:
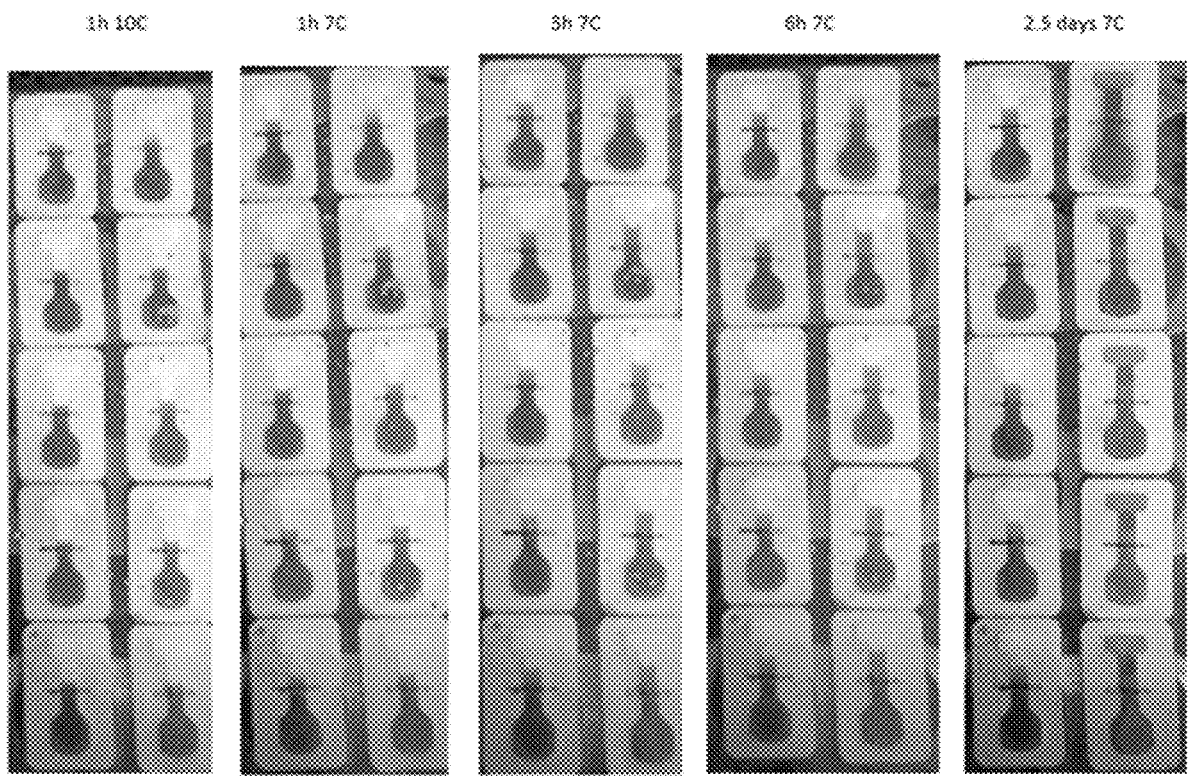
FIG. 19 shows the images of the moving positions of the indicator material as a function of time along the transport element of the indicator test samples to test the temperature cycle properties of the different indicator material compositions after exposure to 10° C. for 1 hour and then being transferred to 7° C. and held.

Evaluation of the Temperature Cycle. Stability and Temperature Hysteresis Properties of Indicator Test Samples Made from Compositions 11 and 15:

A further study was performed to evaluate the temperature cycle properties of the two sets of indicator test samples made from the indicator material Compositions 11 and 15 discussed above respectively. The indicator test samples were exposed to 10° C. water bath for about 1 to 1.25 hours first, and the indicator material began to flow along the transport element during this exposure to 10° C. The indicator test samples were then transferred from the 10° C. water bath to media having temperatures of about 6° C. and 7° C. respectively and held in the media for 2.5 days to test the temperature cycle properties. The experimental results are shown in FIGS. 18 and 19 and Table 10 below. Similarly, the temperature cycle properties of the indicator test samples at 8° C. were also tested. However, the indicator material did not stop moving along the transport element after being held in the 8° C. medium for 3 hours, and the test results were not shown.

As shown in FIG. 18 and Table 10, the indicator test samples made from both Compositions 11 (left column) and 15 (right column) immediately stopped moving when transferred from the 10° C. water bath to the medium having the temperature of 6.2° C. None of the indicator test samples changed indicator state after exposure to 5.8-6.2° C. for 2.5 days.

As shown in FIG. 19 and Table 10, the indicator material Composition 11 (left column) completely stopped moving after 3 hours exposure to 7° C.; and the indicator test samples made from Composition 11 did not change indicator state after being held at 7° C. for 2.5 days. However, the indicator material Composition 15 (right column) failed the temperature cycle test. Specifically, the indicator material Composition 15 did not stop moving even after 6 hours exposure to 7° C.; and the indicator test samples made from Composition 15 changed indicator state within 2.5 days of exposure to 7° C.

A stability test at 8° C. of the indicator test samples made from Compositions 11 and 15 was also performed. The indicator test samples were transferred directly from the refrigerator to a 8° C. water bath without any pre-exposure to temperatures higher than the typical refrigerator temperatures. The indicator test samples made from both Compositions 11 and 15 were stable and did not change indicator state after 3 days of being held in the 8° C. water bath.

A temperature hysteresis test of the indicator test samples was also performed. The indicator test samples made from both Compositions 11 and 15 were pre-exposed to room temperature of 25° C. from 1 minute and then transferred to 10° C. water bath. Both Compositions 11 and 15 performs well and the pre-exposure of the indicator test samples to 25° C. did not change the response time distribution.

In summary, as set forth above, the indicator test samples made with indicator material Compositions 11 and 15 having a mixture of SCC polymer and an alkane wax blend (a weight ratio of SCC polymer to the alkane wax blend at 55/45 to 58/42, and a weight ratio hexadecane to pentadecane at 15/85) performed well when exposed to 10° C.; had good stability at 8° C. without pre-exposure to temperatures higher than the typical refrigerator temperatures of 0-8° C.; and were insensitive to brief pre-exposure to warm temperature and did not show temperature hysteresis with a pre-exposure to 25° C. for 1 minute. These indicator test samples further showed good temperature cycle properties after being exposed to 10° C. for 1 h and then transferred to about 6° C. and held. However, these indicator test samples showed poor temperature cycle after being exposed to 10° C. for 1 h and then transferred to about 8° C. and held; and borderline temperature cycle properties at about 7° C.

TABLE 10

The temperature cycle properties of the indicator test samples made from Compositions 11 and 15.

| Press Trial Lot/ Composition | SCC Lot | % SCC | % C16/C15 (15/85) | Deposit weight (mg) | Performance at 10° C. (h) | Stability at 8° C. | Time stop at 7° C. (h) | Time stop at 6° C. (h) |
|---|---|---|---|---|---|---|---|---|
| 11 | Lot B | 55 | 45 | 5 | 3.5-5.5 | Good | 3 | Pass |
| 15 | Lot A | 58 | 42 | 6.2 | 4.0-7.0 | Good | Failed | Pass |

Example 7

Impact of Melting Peak Temperature of the SCC Polymer on the Response Time

A further study was performed to evaluate the impact of the melting peak temperature of the SCC polymer on the time-temperature response profiles at 10° C., the stop temperature and the temperature cycle properties of the indicator test samples. As reported in Example 6 above, the indicator test samples made with Composition 11 and 15 failed the 8° C. temperature cycle test. This may be due to that the SCC polymer used in the indicator material composition had a low melting peak temperature of 8.8° C.

Experimental Details

To improve the temperature cycle properties of the indicator test samples, two SCC polymer Lots D and E with higher melting peak temperatures of 9.1° C. and 9.4° C. respectively were used. The SCC polymers from Lots D and E were used to prepare hand prototype indicator test samples respectively to test time-temperature response profiles and the temperature cycle properties at 6° C., 7° C. and 8° C. respectively. Details of the samples are listed in Table 11 below. The press trial indicator test samples made from SCC polymer Lot A having a melting peak temperature of 8.8° C. were used as control samples.

TABLE 11

Indicator test samples information

| SCC Lot | SCC Polymer Tm (° C.) | % SCC | % C16/C15 (15/85) | Deposit Weight (mg) | |
|---|---|---|---|---|---|
| Lot A | 8.8 | Press trial retained ink | | 5 | 5.5 | N/A |
| Lot D | 9.1 | 55 | 45 | 5 | 5.5 | 6 |
| Lot E | 9.4 | 55 | 45 | 5 | 5.5 | 6 |

The hand prototype indicator test samples were subjected to the following tests: 1) the response time when exposed to 10° C.; and 2) the temperature cycle tests when exposed to 10° C. for 1 hour and then transferred to 6° C. and held, 7° C. and held, and 8° C. and held respectively. The test results were shown in Tables 12-14 and FIGS. 20-23.

Results and Observations

Response Time of Indicator Test Samples when Exposed to 10° C.:

The response time distribution of five hand prototype indicator test samples with deposit weight of 5 and 5.5 mg for each of the compositions listed in Table 11 were measured when exposed to 10° C., and the test results were summarized in Table 12.

TABLE 12

Test: overnight in freezer

| SCC Polymer Tm (° C.) | SCC Lot | % SCC | % C16/C15 (15/85) | Deposit weight (mg) | Hand prototypes, Number of indicators activated per hour at 10° C. (Total 5 indicaors) | | | | | | | | | | | | | | |
|---|---|---|---|---|---|---|---|---|---|---|---|---|---|---|---|---|---|---|---|
| | | | | | 4 | 4.5 | 5 | 5.5 | 6 | 6.5 | 7 | 7.5 | 8 | 8.5 | 9 | 9.5 | 10 | 10.5 | 11 |
| 8.8 | Lot A | Composition 7 | | 5 | 0 | 0 | 0 | 0 | 2 | 4 | 5 | | | | | | | | |
| 8.8 | Lot A | Press trial retained ink | | 5 | | | | | | 1 | 1 | | 2 | 4 | 4 | 4 | 4 | 4 | 4 |
| 9.1 | Lot D | 55 | 45 | | | | | | | | | | | 1 | 1 | 1 | 2 | 4 | 3 |
| 9.4 | Lot E | 55 | 45 | | | | | | | 1 | 1 | | 2 | 2 | 2 | 2 | 3 | 3 | 4 |
| 8.8 | Lot A | 55 | 45 | 5 | | | 1 | 1 | 1 | 1 | 2 | | 2 | 3 | 3 | 3 | 3 | 3 | 3 |
| 9.1 | Lot D | 55 | 45 | | | | | | | | 1 | | 2 | 3 | 3 | 3 | 3 | 3 | 3 |
| 9.4 | Lot E | 55 | 45 | | | | | 1 | 1 | 1 | 1 | | 2 | 3 | 3 | 3 | 3 | 3 | 3 |

As expected, the hand prototypes showed broader and slower response than the press trial control samples (samples prepared from press trial retained ink, Composition 7 in Example 6).

However, all hand prototypes behaved similarly, the higher deposit weight (5.5 mg) matched the control best.

Figure 20:
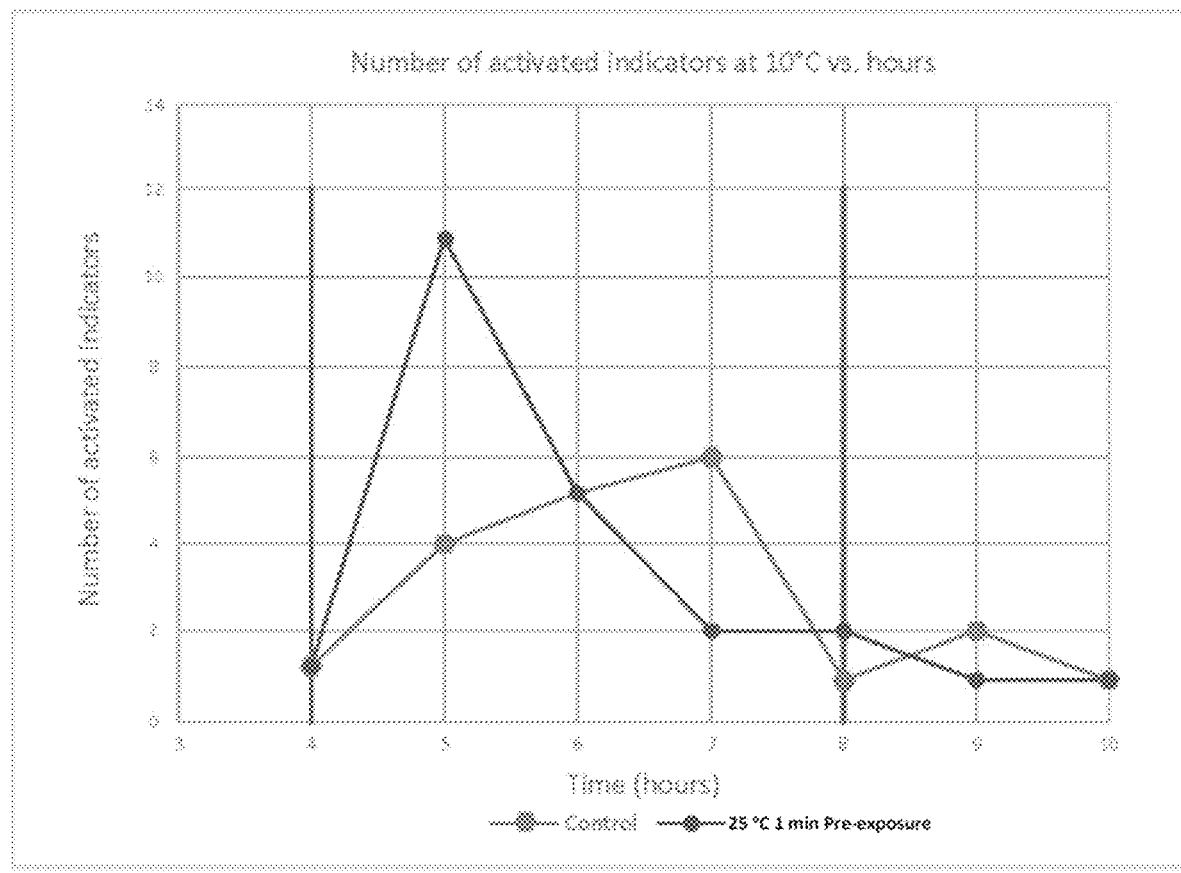
FIG. 20 shows the time-temperature response profiles for indicator test samples made with SCC polymers having melting peak temperatures of 9.1 and 9.4° C. respectively.

Based on this preliminary result, two sets of 21 handmade prototypes were prepared using SCC polymer Lot D having a melting peak temperature of 9.1° C. with a deposit weight of 6 mg and tested at 10° C. versus response time in hours. Two test conditions were performed: 1) Samples were transferred directly from refrigerator to 10° C.; and 2) Samples from refrigerator were pre-exposed to 25° C. for 1 minute first and then to 10° C. The overall response time distribution (number of activated indicators) at 10° C. versus every hour is shown in FIG. 20 and Table 13.

TABLE 13

Test results of test samples made from SCC polymer Lot D having a melting peak temperature of 9.1° C.

Test: overnight in freezer

| SCC Polymer Tm (°C.) | SCC Lot | % SCC | % C16/C15 (15/85) | Deposit weight (mg) | Condition | \multicolumn{13}{c|}{Hand prototypes. Number of indicators activated per hour at 10° C. (Total 21 indicators)} |
|---|---|---|---|---|---|---|---|---|---|---|---|---|---|---|---|---|---|---|
| | | | | | | 4 | 4.5 | 5 | 5.5 | 6 | 6.5 | 7 | 7.5 | 8 | 8.5 | 9 | 9.5 | 10 |
| 9.1 | Lot D | 55 | 45 | 6 | freezer to 10° C. | 1 | 2 | 5 | 8 | 10 | 15 | 16 | 16 | 17 | 19 | 19 | 19 | 20 |
| | | | | | 25° C. 1 mm then 10° C. | 1 | 6 | 12 | 16 | 17 | 18 | 19 | 19 | 19 | 20 | 20 | 20 | 20 |

The indicators that were conditioned at 25° C. activated slightly earlier than the control without the pre-exposure to 25° C. for 1 minute; as expected, but were not drastically faster. Overall, the number of activated indicators from both test conditions fell within 4-8 hours if one ignores the stragglers (stragglers likely due to lower volume from hand prototype). Applicants saw earlier that if formulations were sensitive to short temperature exposures that the response time were cut in half. The performance above is a positive result since it was only slightly faster, which was similar to what was experienced with the last production made samples.

Temperature Cycle Tests:

The hand prototype indicator test samples were subjected to the temperature cycle test by exposing the indicator test samples 10° C. for 1 hour and then transferring to 6° C. and held, 7° C. and held and 8° C. and held, respectively. The test results are summarized in Table 14 and FIG. 21, and compared with those of the press trail indicator control samples made from Compositions 11 and 15 in Examples 6 discussed above. The test sample layout in FIG. 21 is shown Table 15 below.

Figure 21:
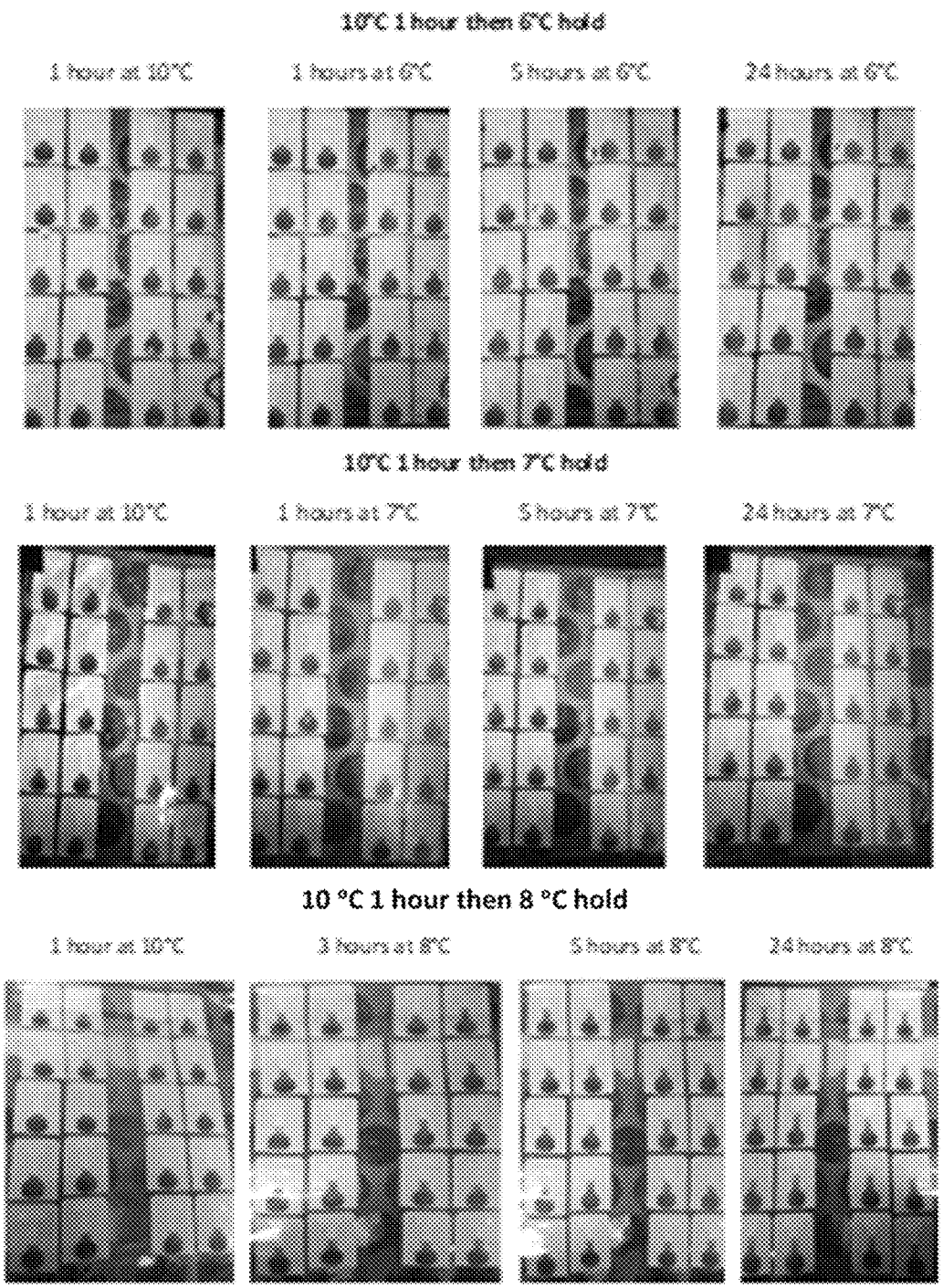
FIG. 21 shows the temperature cycle properties of the indicator test samples after exposure to 10° C. for 1 hour first, and then being transferred to 6° C., 7° C. and 8° C. and held respectively.

As shown in Table 14 and FIG. 21, all the indicator test samples made the SCC polymer Lot D and E having melting peak temperatures of 9.1° C. and 9.4° C. respectively passed the 6° C. temperature cycle test, so did the indicator control samples made from Compositions 11 and 15 in Example 6 discussed above. The experiment results in Table 14 also showed improvement in temperature cycle properties at 7° C. for the indicator test samples made the SCC polymer Lots D and E having higher melting peak temperatures of 9.1° C. and 9.4° C. respectively, as compared to the control samples made from SCC polymer Lot A having a lower melting peak temperature of 8.8° C.

TABLE 14

Temperature cycle test results.

Press Trail Samples: SCC Polymer Tm = 8.8° C.

| Press Trial Composition | SCC Lot | % SCC | Deposit % C16/ C15 (15/85) | Deposit weight (mg) | Cycle Test Time stop advancing at 7° C. (h) | Cycle Test Time stop advancing at 6° C. (h) |
|---|---|---|---|---|---|---|
| 11 | Lot B | 55 | 45 | 5 | 3 | Pass |
| 15 | Lot A | 58 | 42 | 6.2 | Failed | Pass |

TABLE 14-continued

Temperature cycle test results.

Hand Prototype Samples

| SCC Lot | SCC Polymer Tm (° C.) | % SCC | % C16/ C15 (15/85) | Deposit weight (mg) | Cycle Test Time stop advancing at 7° C. (h) | Cycle Test Time stop advancing at 6° C. (h) |
|---|---|---|---|---|---|---|
| Lot D | 9.1 | 55 | 45 | 5 | 1 | Pass |
| Lot E | 9.4 | | | | 1 | Pass |
| Lot D | 9.1 | | | 5.5 | 1 | Pass |
| Lot E | 9.4 | | | | 1 | Pass |

TABLE 15

Test sample layout for each picture in FIG. 21.
Test Samples Layout

| | Left side | | Right side | |
|---|---|---|---|---|
| SCC Lot | Lot D | | Lot E | |
| SCC Polymer Tm (° C.) | 9.1 | | 9.4 | |
| Deposit weight (mg) | 5 | 5.5 | 5 | 5.5 |

Additional temperature cycle tests were performed at 8° C. for all the test samples and the control samples. The test results were shown in FIG. 21. The test results demonstrated that the indicator test samples made from the SCC polymer Lots D and E having higher melting peak temperatures also failed the temperature cycle test at 8° C., but showed significant improvement as compared to the control samples made from SCC polymer Lot A having a lower melting peak temperature.

CONCLUSION

The environmental indicators of the present disclosure may usefully be employed to indicate the condition of any of a wide range of heat-sensitive host products. Host products that may be monitored include, in addition to vaccines: temperature-sensitive health care products, for example, drugs, medicaments, pharmaceuticals, pharmaceuticals incorporating a polypeptide, a nucleic acid or cellular material, temperature-sensitive medical devices, temperature-sensitive prophylactics and the like; biological materials for industrial or therapeutic uses, for example cultures, organs, and other human or animal body parts, blood, and perishable blood products; diagnostic devices, diagnostic kits containing perishable products, and perishable diagnostic ingredients; batteries, battery-containing devices, battery-containing appliances; fresh or prepared foodstuffs, including fish, meats, dairy products, fruits, vegetables, baked goods, desserts, and the like; food service products, including restaurant service foods; gourmet food products; perishable animal foods; cut and uncut flowers; plants; cosmetics, for example cosmetics containing biologicals or other labile or perishable ingredients; beauty aids; perishable industrial products; paint; solder; perishable munitions and ordnance; and perishable decontamination packs and products.

The environmental indicators of the present disclosure may be a small, flexible, low-cost temperature event recorder capable of being manufactured easily such as by printing and suitable for attachment to small items such as vaccine vials or bottles. For example, the environmental indicator can be capable of being printed directly on product labels or packaging. Environmental indicators of the present disclosure may be associated with a host product in a variety of ways, for example by adhering, tying, looping, stapling or otherwise affixing the dual-function exposure indicator, or a label or tag embodying the dual-function exposure indicator, to a desired host product, either directly to a host product, or to a package containing the host product, or to a package, carton, box or other container containing a number of host product items. Also, the environmental indicator, label, or tag, may be inserted in a host product package, carton, or other container for one or more host product items.

The term "a change of color state" of a material as used herein means that material has a change of reflectivity, a change in transparency, a change in hue, a change in apparent color, and combinations thereof.

The term "a change of indicator state" of an indicator as used herein means that the indicator has a change of reflectivity, a change in transparency, a change in hue, a change in apparent color, and combinations thereof in the viewing window.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

The terms "a," "an," "the," and similar referents used in the context of describing the embodiments of the present disclosure (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of the present disclosure are described herein, including the best mode known to the inventor for carrying out the embodiments of the present disclosure. Of course, variations on these described embodiments will become apparent to those of ordinary skill in the art upon reading the foregoing description. The inventor expects skilled artisans to employ such variations as appropriate, and the inventor intends for the embodiments of the present disclosure to be practiced otherwise than specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

Specific embodiments of the present disclosure disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of this disclosure so claimed are inherently or expressly described and enabled herein.

Furthermore, if any references have been made to patents and printed publications throughout this disclosure, each of these references and printed publications are individually incorporated herein by reference in their entirety for all purposes.

In closing, it is to be understood that the embodiments disclosed herein are illustrative of the principles of the present disclosure. Other modifications that may be employed are within the scope of this disclosure. Thus, by way of example, but not of limitation, alternative configurations of the embodiments of the present disclosure may be utilized in accordance with the teachings herein. Accordingly, the present disclosure is not limited to that precisely as shown and described.

The invention is claimed as follows:

1. An ascending time-temperature exposure indicator apparatus, comprising:
   a substrate;
   a transport element supported by the substrate, the transport element having a wick member; and
   a thermally sensitive indicator element supported by the substrate, the indicator element comprising a solid indicator material, the indicator material further comprising a mixture of a synthetic polymeric material having side chain crystallinity (SCC) and a wax material, the indicator material configured to move along the transport element when melted; wherein
   the indicator material is configured to melt in response to exposure to temperatures at or above a predetermined threshold temperature;
   the predetermined threshold temperature is in a range of from about −10° C. to about 70° C.;
   a ratio of the synthetic polymeric material to the wax material is in a range from 50:50-90:10 by weight;
   the transport element and the indicator element are configured so that exposure to at least the predetermined threshold temperature for at least a predetermined exposure time results in at least a predetermined amount of movement of the indicator material along the transport element by diffusing along the wick member; and
   the synthetic polymeric material having side chain crystallinity (SCC) is a polymer or a copolymer of $C_{10}$-$C_{22}$ acrylate or $C_{10}$-$C_{22}$ methacrylate.

2. The time-temperature exposure indicator apparatus of claim 1, wherein the indicator material comprises a blend of two or more polymers having side chain crystallinity (SCC).

3. The time-temperature exposure indicator apparatus of claim 1, wherein the polymer having side chain crystallinity (SCC) is a polymer or a copolymer having at least one crystallizable side chain wherein the side chain includes a linear aliphatic group having at least 10 carbon atoms.

4. The time-temperature exposure indicator apparatus of claim 1, wherein the wax material comprises an alkane wax.

5. The time-temperature exposure indicator apparatus of claim 4, wherein the wax material comprises an alkane wax selected from the group consisting of an undecane, a dodecane, a tridecane, a tetradecane, a pentadecane, a hexadecane, a heptadecane, an octadecane, a nonadecane, an eicosane, and a heneicosane, and combinations thereof.

6. The time-temperature indicator apparatus of claim 5, wherein the wax material is a blend of two alkane waxes.

7. The time-temperature exposure indicator apparatus of claim 6, wherein the wax material is a blend of hexadecane and pentadecane in a weight ratio of hexadecane to pentadecane from 40:60 to 1:95.

8. The time-temperature exposure indicator apparatus of claim 7, wherein the weight ratio of hexadecane to pentadecane is about 15:85.

9. The time-temperature exposure indicator apparatus of claim 1, wherein the ratio of the synthetic polymeric material to the wax material is in the range from 50:50 to 60:40.

10. The time-temperature exposure indicator apparatus of claim 1, wherein the ratio of the synthetic polymeric material to the wax material is in the range from 52:48 to 58:42.

11. The time-temperature exposure indicator apparatus of claim 1, wherein the predetermined threshold temperature is in a range of from about 0° C. to about 40° C., or in the range from about 0° C. to about 60° C.

12. The time-temperature exposure indicator apparatus of claim 1, wherein the predetermined threshold temperature is about 10° C.

13. The time-temperature exposure indicator apparatus of claim 1, wherein the predetermined exposure time for the indicator material to reach the predetermined amount of movement along the transport element at the predetermined threshold temperature is in a range of about 0.1-20 hours.

14. The time-temperature exposure indicator apparatus of claim 12, wherein the predetermined threshold temperature is about 10° C., and the predetermined exposure time for the indicator material to reach the predetermined amount of movement along the transport element at the predetermined threshold temperature is in a range of about 4-8 hours.

15. The time-temperature exposure indicator apparatus of claim 1, wherein the indicator material further comprises an optically distinctive material, so that movement of the indicator material along the transport element can be determined by observing the optically distinctive material.

16. The time-temperature exposure indicator apparatus of claim 14, wherein the optically distinctive material is selected from the group consisting of colorants, dyes, pigments, fluorescent materials, optical phase modifying materials, liquid crystals, infrared-reflecting materials, ultraviolet-reflecting materials, infrared-absorbing materials, ultraviolet-absorbing materials, optically refractive materials, optically diffractive materials, holographic materials and mixtures thereof.

17. The time-temperature exposure indicator apparatus of claim 1, wherein the apparatus has a stop temperature threshold, which when the indicator material returns to or falls below the stop temperature threshold after being exposed to a temperature at or above the predetermined threshold temperature, movement of the indicator material along the transport element stops, and wherein the stop temperature threshold is in a range of about 0.5 to 10° C. lower than the predetermined threshold temperature.

18. The time-temperature exposure indicator apparatus of claim 17, wherein the predetermined threshold temperature is about 10° C. and the stop temperature threshold is in the range of about 6-8° C.

19. The time-temperature exposure indicator apparatus of claim 17, wherein the stop temperature threshold is about 7° C.

20. The time-temperature exposure indicator apparatus of claim 1, wherein the mixture of the synthetic polymeric material and the wax material is a homogenous mixture having a major melting peak temperature, and the major melting peak temperature is of about 0.1-6° C. lower than the predetermined threshold temperature.

21. The time-temperature exposure indicator of claim 20, wherein the synthetic polymeric material and wax material are miscible.

22. The time-temperature exposure indicator apparatus of claim 20, wherein the predetermined threshold temperature is about 10° C. and the major melting peak temperature of the homogeneous mixture is in the range of from about 8.0° C. to about 9.9° C.

23. The time-temperature exposure indicator apparatus of claim 21, wherein the major melting peak temperature of the homogenous mixture is in the range of from about 8.1° C. to about 9.8° C.

24. The time-temperature exposure indicator apparatus of claim 1, wherein the polymer having SCC has a melting peak temperature of about 0.1-10° C. lower than the predetermined threshold temperature.

25. The time-temperature exposure indicator apparatus of claim 24, wherein the predetermined threshold temperature is about 10° C. and the polymer having SCC has a melting peak temperature of about 8.0-9.6° C.

26. The time-temperature exposure indicator apparatus of claim 1, wherein a total weight of the indicator material is in a range of from about 3.0 to about 8.0 mg.

27. The time-temperature exposure indicator apparatus of claim 26, wherein the total weight of the indicator material is in the range of from about 4.0 to about 5.5 mg.

28. The time-temperature exposure indicator apparatus of claim 1, wherein the time-temperature indicator material is formulated such that the time-temperature indicator material, when not previously exposed to a temperature above the predetermined threshold temperature, does not reach the predetermined amount of movement when exposed to a high temperature of up to about 30° C. higher than the predetermined threshold temperature for up to 20 minutes.

29. The time-temperature indicator apparatus of claim 1, wherein the predetermined threshold temperature is about 10° C., and the indicator material is formulated such that the indicator material, when not previously exposed to a temperature above the predetermined threshold temperature, does not reach the predetermined amount of movement when exposed to a high temperature of about 25° C. for up to about 30 minutes.

30. The time-temperature indicator apparatus of claim 1, wherein the indicator material is formulated such that the indicator material does not traverse the predetermined amount of movement along the transport element at a temperature of about 2° C. below the predetermined threshold temperature absent a pre-exposure of the time-temperature indicator apparatus to a temperature at or above the predetermined threshold temperature.

31. The time-temperature exposure indicator apparatus of claim 1, wherein the wick member is made from a material selected from the group consisting of filter paper; pulverized filter paper; fine silica gel; porous films containing polytetrafluoroethylene resin or silica gel; TESLIN® microporous synthetic sheet; non-woven, spun bonded materials including non-woven, spun-bonded high-density-polyethylene, polypropylene and polyester; and non-woven, spun-bonded blends of any two or more such polymers.

32. An ascending time-temperature exposure indicator device, comprising:
a substrate;
a transport element supported by the substrate, the transport element having a wick member; and
a thermally sensitive indicator element supported by the substrate, the indicator element comprising a solid indicator material, the indicator material comprising a synthetic polymeric material having side chain crystallinity (SCC) mixed with a wax material which is configured to move along the transport element when melted, wherein
a ratio of the synthetic polymeric material to the wax material is in a range from 50:50 to 90:10 by weight,
the indicator material is configured to be a solid below a predetermined threshold temperature of about 10° C.,
the indicator material is configured to melt and move along the transport element in response to exposure to a temperature at or above the predetermined threshold temperature,
the transport element and the indicator element are configured so that exposure to at least the predetermined threshold temperature for a predetermined exposure time in a range of about 4-8 hours results in at least a predetermined amount of movement of the indicator material along the transport element by diffusing along the wick member, and exposure of the melted indicator material to a temperature at or below a stop temperature threshold in a range of 6-8° C. causes the indicator material to stop moving along the transport element; and
the synthetic polymeric material having SCC is a polymer or a copolymer of $C_{10}$-$C_{22}$ acrylate or $C_{10}$-$C_{22}$ methacrylate.

33. The time-temperature exposure indicator device of claim 32, wherein the transport element and the indicator element are configured so that exposure of the time-temperature exposure indicator device to the predetermined threshold temperature for the predetermined exposure time results in the predetermined amount of movement of the indicator material along the transport element.

34. The time-temperature exposure indicator device of claim 33, wherein a pre-exposure of the time-temperature indicator device to a high temperature of 25° C. for up to about 5 minutes, does not change the response time for the indicator material to reach the predetermined amount of movement along the transport element at the predetermined threshold temperature, wherein the response time is the same as the predetermined exposure time of about 4-8 hours.

35. A time-temperature exposure indicator label for monitoring time exposure of a host product to a predetermined threshold temperature, the time-temperature exposure indicator label comprising:
a substrate;
a human or machine-readable dataform on the substrate;
a transport element supported by the substrate; and
a thermally sensitive indicator element supported by the substrate, the indicator element comprising a solid indicator material, the indicator material configured to move along the transport element when melted, wherein
the indicator material is configured to melt in response to exposure to a temperature at or above the predetermined threshold temperature,
the predetermined threshold temperature is in a range of from about −10° C. to about 70° C.,
the indicator material further comprises a mixture of a synthetic polymeric material having side chain crystallinity (SCC) and a wax material, wherein a ratio of the synthetic polymeric material to the wax material is in a range from 50:50 to 90:10 by weight;
the transport element and the indicator element are configured so that exposure of the host product to the predetermined threshold temperature for the predetermined exposure time results in at least a predetermined amount of movement of the melted indicator material along the transport element;
the dataform provides information to interpret the degree of heat exposure to the host product based on the movement of indicator material along the transport element; and
the synthetic polymeric material having SCC is a polymer or a copolymer of $C_{10}$-$C_{22}$ acrylate or $C_{10}$-$C_{22}$ methacrylate.

36. The time-temperature indicator label of claim 35, further comprising an adhesive backing layer contacting the substrate on a side opposite the transport element and the indicator element.

37. The time-temperature indicator label of claim 36, further comprising a protective liner positioned against the adhesive backing layer on a side opposite the substrate.

38. A batch of ascending time-temperature exposure indicators, comprising:
- a unifying container,
- a plurality of at least 50 time-temperature exposures indicators physically coupled to the unifying container, wherein each time-temperature exposure indicator comprises, respectively:
  - a substrate;
  - a transport element supported by the substrate; and
  - a thermally sensitive indicator element supported by the substrate, the indicator element comprising a solid indicator material, the indicator material configured to move along the transport element when melted, wherein
- the indicator material comprises a synthetic polymeric material having side chain crystallinity (SCC) mixed with a wax material, and is configured to melt and move along the transport element in response to exposure to the predetermined threshold temperature, a ratio of the synthetic polymeric material to the wax material is in a range from 50:50 to 90:10 by weight,
- the transport element and the indicator element are configured so that exposure to the predetermined threshold temperature for the predetermined exposure time results in a change of indicator state by exhibiting a predetermined amount of movement of the indicator material along the transport element,
- in response to exposure at the predetermined temperature, at least 90% of the plurality of indicators change indicator state at the predetermined exposure time; and
- the synthetic polymeric material having SCC is a polymer or a copolymer of $C_{10}$-$C_{22}$ acrylate or $C_{10}$-$C_{22}$ methacrylate.

39. The batch of the time-temperature exposure indicators of claim 38, wherein the predetermined temperature is 10° C. and the predetermined exposure time is in a range of 4 to 8 hours, and wherein in response to exposure to the predetermined temperature of 10° C., at least 90% of the batch of the time-temperature exposure indicators change indicator state within the predetermined exposure time in a range of 4 to 8 hours.

40. A method of manufacturing time-temperature exposure indicators, comprising:
- producing a batch of at least 50 indicators, by
  - providing a substrate for each indicator,
  - providing a transport element on the substrate, and
  - providing an indicator element on the substrate, the indicator element comprising an indicator material in solid form, the indicator material comprising a synthetic polymeric material having side chain crystallinity (SCC) mixed with a wax material which is configured to melt and move along the transport element in response to exposure to a temperature at or above a predetermined threshold temperature, wherein a ratio of the synthetic polymeric material to the wax material is in a range from 50:50 to 90:10 by weight, wherein the transport element and the indicator element are configured so that exposure to the predetermined threshold temperature for a predetermined exposure time ranging from 4 to 8 hours results in a change of indicator state by exhibiting a predetermined amount of movement of the indicator material along the transport element,
- wherein for each batch of time-temperature exposure indicators, at least 90% of the time-temperature exposure indicators change indicator state during the predetermined exposure time range when exposed to the predetermined threshold temperature; and
- wherein the synthetic polymeric material having SCC is a polymer or a copolymer of $C_{10}$-$C_{22}$ acrylate or $C_{10}$-$C_{22}$ methacrylate.

41. The method of claim 40, wherein providing the indicator element on the substrate further comprises providing the indicator material in melted form and allowing it to cool and solidify on the substrate to form the solid indicator material.

* * * * *